United States Patent [19]

Smith

[11] Patent Number: 4,513,175

[45] Date of Patent: Apr. 23, 1985

[54] AUTOMATIC CALLING SYSTEMS FOR ACCESSING COMMUNICATIONS NETWORKS

[75] Inventor: Fred J. Smith, Plantation, Fla.

[73] Assignee: Jayem Dialer Corp., Westfield, N.J.

[21] Appl. No.: 370,605

[22] Filed: Apr. 21, 1982

[51] Int. Cl.³ .................... H04M 1/274; H04M 3/44; H04M 15/10

[52] U.S. Cl. .................... 179/18 BA; 179/7.1 R; 179/84 VF

[58] Field of Search .......... 179/18 BA, 90 BD, 90 B, 179/18 J, 99 M, 7.1 R, 84 VF

[56] References Cited

U.S. PATENT DOCUMENTS

| | | | |
|---|---|---|---|
| 3,334,190 | 8/1967 | Jenkins et al. | 179/18 BA |
| 3,600,522 | 8/1971 | Benson | 179/18 BA |
| 3,694,583 | 9/1972 | Budrys et al. | 179/18 BA |
| 3,702,905 | 11/1972 | Gil | 179/90 BD |
| 3,993,877 | 11/1976 | Sendyk et al. | 179/90 B |
| 4,092,501 | 5/1978 | Suzuki et al. | 179/99 M |
| 4,119,810 | 10/1978 | Marin et al. | 179/90 K |
| 4,160,124 | 7/1979 | Law | 179/2 DP |
| 4,171,469 | 10/1979 | Brooks | 179/18 BA |
| 4,188,511 | 2/1980 | Smith et al. | 179/99 A |
| 4,232,200 | 11/1980 | Hestad et al. | 179/90 K |
| 4,277,648 | 7/1981 | Glassman | 179/7.1 R |
| 4,332,985 | 6/1982 | Samuel | 179/90 BD |

FOREIGN PATENT DOCUMENTS

| | | | |
|---|---|---|---|
| 1057862 | 2/1967 | United Kingdom | 179/18 BA |
| 2030423 | 4/1980 | United Kingdom | 179/90 B |

Primary Examiner—Thomas W. Brown
Attorney, Agent, or Firm—Lerner, David, Littenberg, Krumholz & Mentlik

[57] ABSTRACT

A processor-controlled automatic calling system is provided in accordance with the teachings of the present invention. The automatic calling system is connected to a plurality of telephone lines within a subscriber's telephone system and all telephone sets within the subscriber's telephone system are monitored for the occurrence of an off hook condition. Upon the occurrence of an off hook condition, a user is permitted a predetermined interval for initiating operation of the automatic calling system through entry of a service code to cause an accessed telephone number and billing code to be outpulsed. In certain embodiments of the invention, an accessing telephone set is muted while the automatic calling system is performing outpulsing functions. Outpulsing functions are preferably performed under the control of a hardware timer to allow additional functions to be performed by a processor on a time-shared basis, and multiple telephone numbers and billing codes may be automatically accessed.

29 Claims, 16 Drawing Figures

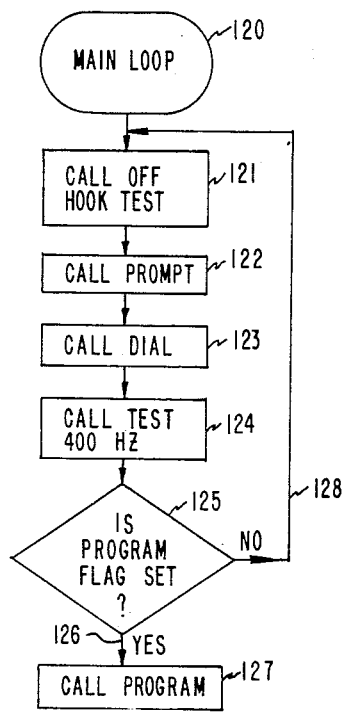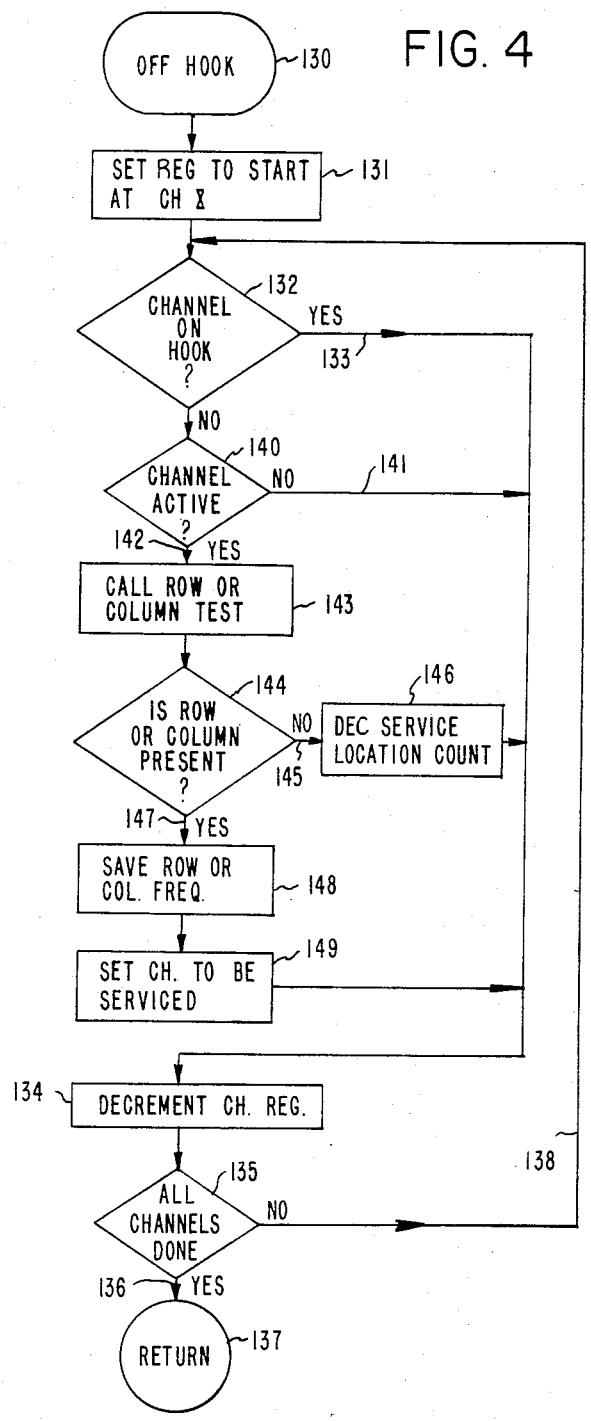
FIG. 3
FIG. 4

AUTOMATIC CALLING SYSTEMS FOR ACCESSING COMMUNICATIONS NETWORKS

BACKGROUND OF THE INVENTION

This invention relates to improvements in automatic calling systems and more particularly to apparatus and methods for automatically accessing subscriber line systems through a switched telephone network and providing subscriber code information thereto wherein both the subscriber line system accessed and the code information provided are selectable at the option of the user. This application is related to U.S. application Ser. No. 370,604 entitled "Automatic Calling Systems", filed on equal date herewith and assigned to the same assignee.

In U.S. Pat. No. 4,332,985 which is entitled "Automatic Calling Methods and Apparatus" and issued in the name of Richard I. Samuel on June 1, 1982, there are disclosed various embodiments of automatic calling systems for conveniently accessing a long-distance subscriber system through the automatic dialing of the telephone number therefor and providing the subscriber's billing code information thereto once the subscriber system has been contacted. This greatly facilitates use of such systems while avoiding the laborious task associated with a user first dialing a local telephone number to reach the computer associated with the switched subscriber system and entering the numerous digits associated with the subscriber's billing code once the computer controlling the system has been contacted. Thus, through reliance upon such apparatus and methods, a user may, in effect, employ such subscriber systems by doing little more than entering the area code and local telephone number of the ultimate destination to be contacted.

Automatic calling systems, as disclosed in the aforesaid patent, thus enable a subscriber to employ a particular long-distance subscriber system in a manner wherein all preliminary information for accessing such system is automatically produced by the automatic calling system to enable the long-distance subscriber systems to be utilized with much the same convenience as associated with the use of established telephone companies' long-distance services. Furthermore, such automatic calling systems as are described in U.S. Pat. No. 4,332,985 are otherwise highly advantageous since not only do they provide convenient use characteristics, which otherwise might preclude full utilization, but in addition thereto, access telephone numbers and billing codes need not be provided to the users. This insures that possible abuse of such systems by employees who might utilize such information outside of the work environment for personal ends is avoided.

Long-distance subscriber systems competing with established telephone company long-distance service have gained wide acceptance and the number of such services which are currently available have proliferated to a wide degree. Typically, each subscriber system employs the local switched telephone lines of the established telephone company to connect a subscriber to a computer which then acts to convey the subscriber's telephone call over privately owned, long-distance microwave networks or the like to a local area where the call is again reintroduced into the local switched telephone network where the same is completed to the location dialed. In many areas today, several long-distance subscriber systems are available to prospective users and it is not unusual for each system to offer particular advantages which vary as a function of communication patterns of the user. Thus, it is not unusual for a relatively small business organization to subscribe to more than one service or for such organizations to change services from time to time. In fact, differing cost patterns among such long-distance subscriber systems as are available in particular areas have, in fact, spawned a new service industry wherein, in effect, a local subscriber system itself subscribes to a plurality of long-distance subscriber systems and a computer located at the local subscriber system is employed for the purpose of switching communications from subscribers over the various long-distance subscriber systems available on a least cost routing basis.

Regardless of the subscriber system or systems selected, the user is generally required to enter a seven digit local telephone number to gain access to such system over local switched telephone networks to a computer which controls the long-distance network or networks to be employed. The computer answers the lines and indicates that access has been gained by placing a tone or the like on the line. Upon hearing the tone, the user then enters an assigned billing code which currently may comprise from five to twelve digits, and thereafter the user typically dials the area code and telephone number of the remote location which is to be contacted through the subscriber system. Thus, it is not unusual in order to complete a call over such a computer-controlled long-distance subscriber system that a user at the subscriber rate must input twenty-two or more digits in a manner timed to accommodate necessary handshaking with the computer controlling the long-distance system.

Obviously, where more than one long-distance subscriber system has been selected, each system would have a different telephone number and billing code which would be required to be input for the system selected, and it is not atypical for a subscriber to secure more than one billing code for a given location so that telephone charges may be properly relegated among different departments using common telephone lines at a given site. Under such circumstances, it will be apparent that if the convenience of automatic calling systems of the type set forth in U.S. Pat. No. 4,332,985 (Ser. No. 134,951) are to be retained at users locations having access to a plurality of subscriber systems, such automatic calling systems must be sufficiently flexible to accommodate an accessing of more than one long-distance subscriber system and to provide billing code information of the type required by a given system for each system accessed. Furthermore, it would be highly desirable to provide automatic calling systems wherein a number of specifically configured billing codes may be provided on a selectable basis for each subscriber system accessed and the accessed telephone numbers, billing code configurations and actual billing codes employed could be readily changed by a user to accommodate changes in the long-distance subscriber systems selected. Additionally, such systems should give the appearance of performing multiple service functions on a concurrent basis to effect service for a substantial number of users located at the subscriber's site. Further, such systems must be configured to readily accommodate the various handshaking requirements of the various long-distance subscriber systems which might be selected by a user.

Therefore, it is an object of the present invention to provide improved automatic calling systems and methods for implementing the same.

A further object of the present invention is to provide automatic calling systems wherein telephone numbers and billing codes outpulsed by the system may be readily modified at the user's site.

Another object of the present invention is to provide an automatic calling system readily accommodating various handshaking functions established for various computer controlled subscriber systems.

An additional object of the present invention is to provide automatic calling systems for selectively generating a plurality of billing codes for each telephone number automatically outpulsed.

A further object of the present invention is to provide an automatic calling system for selectively outpulsing a plurality of telephone numbers and associated billing codes for accessing a plurality of subscriber systems.

Another object of the present invention is to provide a processor-controlled automatic calling system wherein outpulsing functions performed by the processor are implemented on a time-shared basis with other system functions.

An additional object of the present invention is to provide automatic calling systems which are programmable at the user's site.

A further object of the present invention is to provide automatic calling systems which, when accessed, mute the telephone extension accessing the same until outpulsing functions are completed.

Another object of the present invention is to provide automatic calling systems wherein a muting function is employed to disable outpulsing functions of an accessing telephone set until outpulsing by said automatic calling system has been completed.

An additional object of the present invention is to provide automatic calling systems displaying improved off hook detection and billing code information outpulsing characteristics.

Various other objects and advantages of the present invention will become clear from the following detailed description of several exemplary embodiments thereof and the novel features will be particularly pointed out in conjunction with the claims appended hereto.

SUMMARY OF THE INVENTION

In accordance with the teachings of the present invention, a processor-controlled automatic calling system is connected to a plurality of telephone lines within a subscriber's telephone system; all telephone sets within said subscriber's telephone system are monitored for the occurrence of an off hook condition and upon the occurrence of an off hook condition, are permitted a predetermined interval for initiating operation of said automatic calling system through entry of a service code to cause an accessed telephone number and billing code to be outpulsed. In certain embodiments an accessing telephone set is muted while the automatic calling system is performing outpulsing functions. Outpulsing functions are preferably performed under the control of a hardware timer to allow additional functions to be performed by a processor on a time-shared basis and multiple telephone numbers and billing codes may be automatically accessed.

BRIEF DESCRIPTION OF THE DRAWINGS

The invention will be more clearly understood by reference to the following detailed descriptions of several exemplary embodiments thereof in connection with the accompanying drawings in which:

FIG. 3 is a functional flow diagram illustrating the operation of the embodiment of this invention shown in FIG. 1, under program control, according to an exemplary Main program routine;

FIG. 4 is a functional flow diagram illustrating the details of an exemplary Off Hook Test subroutine called by the Main program routine illustrated in FIG. 3;

DETAILED DESCRIPTION

Figure 1A:
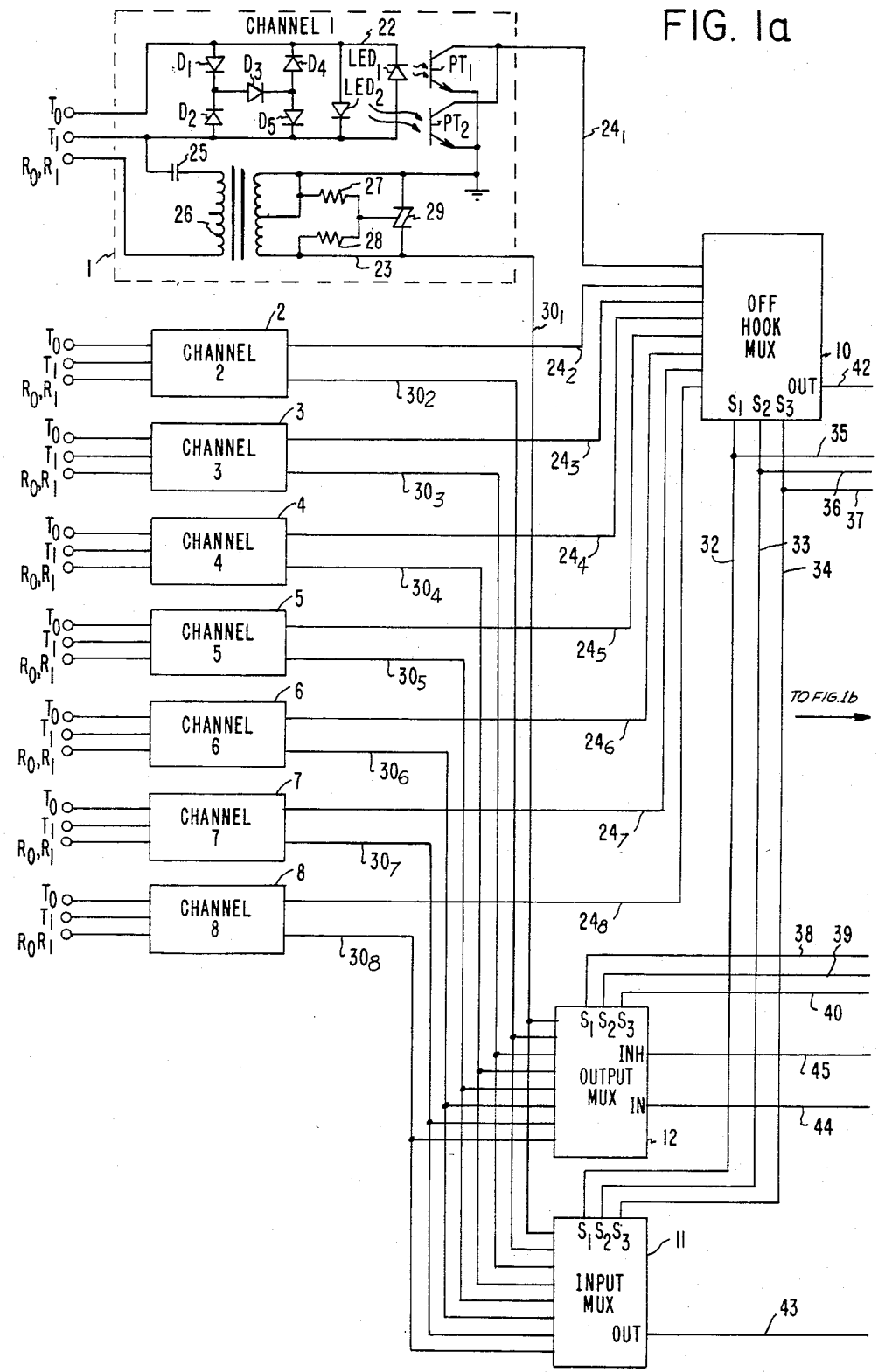
FIGS. 1a and 1b, viewed together in the order recited, form FIG. 1 which is a block diagram serving to schematically illustrate one embodiment of a processor-controlled automatic calling system according to the present invention.

While the present invention is of general application and is useful in conjunction with any telephone service employing one or more telephone lines, as well as one or more extensions thereto, the instant disclosure shall assume, for purposes of describing the preferred embodiment set forth herein, an environment wherein it is desired to access a plurality of conventional, separately owned, long-distance subscriber services from a subscriber's offices wherein a plurality of telephone lines, as well as a plurality of extension telephones, each extension telephone having access to each telephone line, are employed. Furthermore, conventional access requirements to each separately owned long-distance leased line subscriber system will be assumed in that a user at the subscriber's office desiring access thereto is normally required to input a seven digit telephone number for purposes of contacting each subscriber service, await a response by the answering computer, as indicated by receipt of a dial tone, pure tone or the like, being placed on the line by such computer, and thereafter input a multi-digit billing code to the computer which may typically vary from five to twelve digits.

Subsequent to the entry of the billing code, the area code and local telephone number of the location to which a telephone call is to be placed is then entered by the user, whereupon this call employs local telephone lines for purposes of reaching the computer switching system, the long-distance microwave links or the like associated with each long-distance subscriber service are employed to transmit the telephone call being placed to the area indicated by the user upon entry of an area code, and thereafter local telephone networks are employed to complete the telephone call to the site being contacted. A plurality of long-distance subscriber services would typically be employed since it may be assumed that each service provides certain advantages for long-distance telephone calls placed to selected locations and standard instructions are provided to each user at the subscriber's offices designating which service or enabling routine is to be employed for calls to particular locations. Furthermore, for purposes of describing the flexibility associated with the instant invention, it will additionally be assumed that the user's location has provided for up to three billing codes for each long-distance subscriber service selected and that the response tone employed by the answering computer for each long-distance subscriber system is different in that one subscriber system employs dial tone as a response, while the second acts to return a pure tone to acknowledge successful contacting of the long-distance subscriber service involved.

The automatic calling system herein described is actuated by a user at the subscriber site by lifting the receiver of the telephone set and depressing a pair of buttons in a common row or column at the DTMF pad thereon to cause the generation of only a single one of the DTMF tone pair frequencies normally produced by a conventional DTMF pad. This angle frequency is employed for both the purposes of signalling the instant invention that service is being requested and, in addition, to define the local telephone number, response tone and one of up to three related billing code sequences associated with that number for the long-distance subscriber service desired. Though arbitrarily selected, tones associated with rows 2, 3 and 4 are utilized to define a first telephone number and up to three billing codes which may be associated therewith. Similarly column tones 1, 2 and 3 are employed to define a second telephone number and up to three billing codes which may be associated therewith. Row 1 tones as shall be seen below, are employed for programming. It should be noted that the use of discrete row or column tones in this manner is highly advantageous as they may be directly generated at a telephone set by the simultaneous depression of a pair of keys at a DTMF pad and are transparent to the connected telephone system in that no loss of dial tone occurs.

A separate actuating button is provided in association with the device per se so that the device may be programmed by supervisory personnel, when necessary, with local telephone numbers for each subscriber service to be contacted, the response or acknowledgement tone which is to be recognized from that subscriber service and the various billing codes which are to be supplied, on a selected basis, to each individual subscriber service. Thus, actual users of the device are not made aware of either the access codes for long-distance subscriber service or the billing codes used in association therewith, and hence, may not appropriate these services to their own use access through the use of the instant invention within an environment controlled by the subscriber.

The actual structure and methods employed within the instant invention will be best appreciated from the following description of the drawings set forth; however, it should be readily appreciated, that while the preferred embodiments set forth herein have been selected to demonstrate the flexibility of the instant invention, simplified versions of the invention suited to applications wherein it is desired to communicate with only a single long-distance subscriber service and/or to provide only a single user's billing code thereto, are readily available. Therefore, the adoption of such limited applications would act to somewhat simplify the particular embodiment per se, as well as to simplify the access requirements mandated of a user.

Figure 1B:
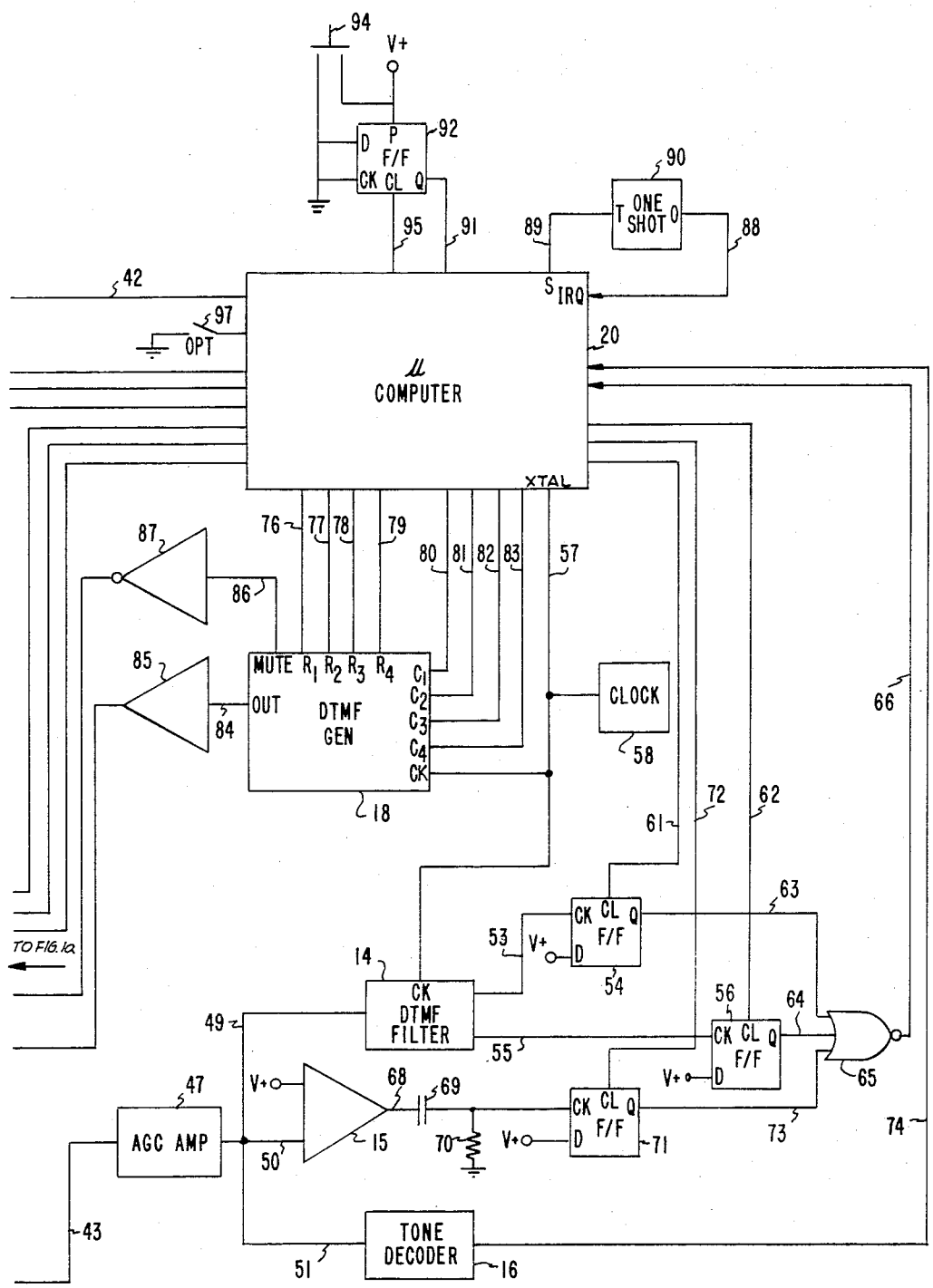

Referring now to the drawings, and more particularly to FIG. 1 thereof, there is shown a block diagram which schematically illustrates one embodiment of a processor-controlled automatic calling system according to the present invention. The processor-controlled automatic calling system illustrated in FIG. 1 comprises a plurality of channel connector circuits 1–8, a plurality of multiplexer means 10–12, detector means including filter means 14, comparitor means 15, and tone decoder means 16, an audio output circuit including audio generator means 18 and a processor means which here has been illustrated as taking the form of a microcomputer 20, having RAM and ROM present therein.

The eight channel connector circuits 1–8 illustrated in FIG. 1, each take precisely the same form and hence only the channel connector circuit 1 has been illustrated in detail within the dashed block indicated. Each channel connector circuit 1–8 is connected to an individual telephone line through the terminals $T_0$-$R_0$, and to a plurality of telephone sets, i.e., all sets serving as extensions to that telephone line through the terminals indicated as $T_1$-$R_1$. Thus, the embodiment of the invention illustrated in FIG. 1 contemplates connection within an office having up to eight telephone lines as inputs thereto, and any number of extensions connected to each of said telephone lines. It should be further noted that each extension would be connected in parallel to the terminals annotated $T_1$-$R_1$ and typically, if extensions were of the type wherein a plurality of telephone line selection buttons were provided thereon, each such button would place that telephone set in parallel with the terminals $T_1$-$R_1$ for the channel to which that telephone line was connected at terminals $T_0$-$R_0$. Accordingly, as shall be seen below, the embodiment of the invention illustrated in FIG. 1 is connected in cascade between each telephone line provided to a subscriber site and each of the sets which may obtain access as an extension to that telephone line.

More particularly, as will be apparent to those of ordinary skill in the art, the terminals $T_0$-$R_0$ indicated as connections to each of the channel connectors 1–8 are conventional telephone company tip and ring connections with the terminals annotated $T_1$-$R_1$ being provided from the embodiment of the invention illustrated in FIG. 1 as tip and ring signals to the telephone sets connected as extensions thereto. The connection to the telephone line enabling the embodiment of the invention illustrated in FIG. 1 to be connected may be made through a conventional MCJ84-A2 connector, it being noted that the ring lines $R_0$, $R_1$ would be commonly connected therein.

Each of the plurality of channel connector circuits 1-8, as shown in detail within the dashed block 1, may conveniently take the form of an off hook detection circuit means 22 and AC coupling circuit means 23 where the off hook detection circuit means 22 acts to detect an off hook condition for any of the telephone sets connected to terminals $T_1$ and $R_1$, while the AC coupling circuit means acts to forward any AC signals in the form of tones or the like generated at either the set connected to terminals $T_1$ and $R_1$, or the telephone line connected to terminals $T_0$-$R_0$ to the remaining portions of the embodiment of the invention illustrated in FIG. 1. Additionally, tones generated by the instant invention are applied to the telephone line and an off hook set through the AC coupling circuit means 23.

The off hook detection circuit means 22 comprises a plurality of diodes $D_1$-$D_5$ connected in a bridge arrangement and a pair of optical couplers formed by the oppositely poled light-emitting diodes $LED_1$ and $LED_2$ and the phototransistors $PT_1$ and $PT_2$. The off hook detection circuit means is responsive to the DC path which is created through the telephone set when the receiver is placed off hook to provide an output level on conductor $24_1$ indicative that a telephone set connected to the channel 1 inputs annotated $T_1$ and $R_1$ has gone off hook.

To this purpose, the plurality of diodes $D_1$-$D_5$ are arranged in a bridge configuration for purposes of providing three diode drops in the DC path established between the inputs $T_0$ and $T_1$, regardless of the polarity of the DC level applied thereacross. Three diode drops are necessary since normal diodes of the type illustrated typically will drop 0.7 volts thereacross, while the voltage required across the light-emitting diodes $LED_1$ and $LED_2$ is typically 1.8 volts for purposes of activation. The four diodes annotated $D_1$, $D_2$, $D_4$ and $D_5$ make take the form of a conventional VM8 rectifier bridge such as is available as an off-the-shelf item from General Electric, Motorola or Varo Corporations, and the five diode bridge may simply be formed by connecting an additional diode $D_3$ thereacross in the manner shown. The use of a diode bridge such as formed by the plurality of diodes $D_1$-$D_5$ to sense the creation of a DC path through a telephone set which has gone off hook is highly advantageous for purposes of activating the optical isolation devices associated with the light-emitting diodes $LED_1$ and $LED_2$ as the same acts to render the resulting circuit independent of both the impedance of the telephone sets which may connected as extensions to the telephone line associated with channel 1, as well as the telephone line per se. Thus, while no rectification purpose is provided by the resulting diode bridge formed, it will be seen by those of ordinary skill in the art that regardless of the polarity of the applied DC signal, three voltage drops will be provided through appropriate ones of diodes $D_1$-$D_5$ to insure that a voltage having a magnitude of approximately 2.1 volts and of the requisite polarity to activate one of the light-emitting diodes $LED_1$ and $LED_2$ will occur whenever any telephone extension connected to the terminal $T_1$ is placed in an off hook condition.

The optical couplers formed by the light-emitting diodes $LED_1$ and $LED_2$ and their associated phototransistors $PT_1$ and $PT_2$ may take any of the well-known forms of this conventional class of device which act in the well-known manner to provide electrical isolation between the components thereof while coupling an active condition in the circuit being monitored. Thus, it will be appreciated that when any telephone set connected to conductors $T_1$ and $R_1$ is placed in an off hook condition, the DC path between $T_0$ and $T_1$ provided through the set will also involve three of the diodes present in the bridge circuit formed by the diodes $D_1$-$D_5$, and hence, will cause a voltage drop of at least 2.1 volts across the light-emitting diodes $LED_1$ and $LED_2$. Depending upon the polarity of such voltage drop, one of the light-emitting diodes $LED_1$ and $LED_2$ will be activated and the light emitted thereby will be coupled to the base of its associated photoconductive transistor $PT_1$ and $PT_2$. Thus, when the same is rendered conductive, a low level will be placed on conductor $24_1$ to apply an appropriate indication of an off hook condition on channel 1 to the multiplexer means 10.

The AC coupling circuit means 23 comprises a capacitor 25, a center tapped transformer 26, a pair of resistors 27 and 28 and a bilateral silicon switch 29. The AC coupling circuit means 23 provides two essential functions in the instant circuit. The first is that the capacitor 25 and the primary of the center tapped transformer 26 form a parallel connection with tip and ring so that, in essence, it is poised like a ringer on the telephone line in providing DC isolation to an AC load to enable the ring signal to pass through the telephone set. The second function of the AC coupling circuit means 23 is to AC couple and conform within predetermined metes and bounds all signal information being conveyed between the telephone set and the telephone line so that the same may be monitored by the processor means 20. Additionally, as shall be seen below, signal information generated under the control of the processor means 20 may be applied through the transformer 26 to both the telephone line and any telephone set which is coupled thereto.

To this end, the capacitor 25 and the primary of the center tapped transformer 26 are connected across the $T_1$ terminal which forms the tip signal returned to a telephone set connected to this channel and the $R_0$, $R_1$ terminal which is commonly connected to the ring conductor associated with the telephone line, as well as the ring conductor returned to the set. The capacitor 25 thus acts, as will readily be appreciated by those of ordinary skill in the art, to form a DC block as to any signals which appear across the conductors $T_1$ and $R_0$, $R_1$, while the remaining AC signals applied thereto are supplied from the primary of the transformer 26 to the secondary thereof. The signals thus coupled to the secondary of the transformer 26 are supplied from one-half of the center tapped winding thereof to the conductor $30_1$ across the circuit formed by the pair of resistors 27 and 28 and the bilateral silicon switch 29. As will be readily appreciated by those of ordinary skill in the art, the bilateral silicon switch 29 is a conventional device marketed by both G.E. and Motorola under the product designation TN4991 or MPS4991 and acts, essentially, in the same manner as a pair of back-to-back zener diodes in establishing a voltage window regarding the magnitude of AC signals coupled thereacross. More particularly, signals of an acceptable magnitude are applied directly from the half of the secondary of the transformer 26 which is being utilized to the conductor $30_1$ for application to the processor 20 through the multiplexer means 12. Any signals exceeding a desired magnitude are effectively clamped to the value selected for the circuit formed by the resistors 27 and 28 and the bilateral silicon switch 29, in that whenever a desired signal level of either polarity exceeds the determined threshhold, signals exceeding such peak-to-peak values will cause the bilateral silicon switch to conduct and apply the excessive portions of such signals to ground. The resistors 27 and 28 function with the bilateral silicon switch 29 to enable an adjustment in the peak-to-peak voltage value of the window established, and for purposes of the instant discussion, it may be assumed that an 8 volt peak-to-peak window forms a suitable design parameter therefor. Thus, any AC signals being coupled between a telephone set and the telephone line connected to channel 1 are AC coupled through the AC coupling circuit means 23 to the conductor $30_1$, and conversely, any input signals which are generated by the embodiment of the invention illustrated in FIG. 1 and are to be supplied to the telephone line or a set connected to channel 1 are supplied through the conductor $30_1$ and the AC coupling circuit means 23 to the telephone sets and telephone lines connected to channel 1.

Since each of the plurality of channel connector circuits 1–8 each take precisely the form described in detail in connection with channel connector circuit 1 shown in detail in FIG. 1, it will be readily appreciated by those of ordinary skill in the art that any time any telephone set connected as an extension to any of the telephone lines connected to channels 1 through channel 8 goes off hook, the channel connector circuit 1–8 associated therewith will indicate an off hook condition on a respective one of the output lines $24_1$–$24_8$. Similarly, signal information in the form of tones or the like being coupled from an activated telephone set to the telephone line or the processor 20 connected to a particular channel, will be AC coupled through a respective one of conductors $30_1$–$30_8$ to the processor 20 as will signal information being coupled from the respective telephone line to a set. Conversely, signal information may be supplied from the processor 20 to the telephone line and any activated set connected to that line through a particular channel connector 1–8 through respective ones of the conductors $30_1$–$30_8$.

All of the conductors $24_1$–$24_8$ associated with the off hook information generated at each of the plurality of channel connector circuits 1–8 are connected, as aforesaid, to the off hook multiplexer means 10, while each of the conductors $30_1$–$30_8$ which function, as aforesaid, as AC signal coupling conductors for each of the respective channel connector circuits 1–8 are connected both to the input multiplexer means 11 and the output multiplexer means 12. Each of the plurality of multiplexer means 10–12 may take any of the conventional forms of this well-known class of device and act in response to a select input defined at the inputs thereto annotated $S_1$–$S_3$ to convey an input present at one of the eight inputs thereto to a single output conductor, or conversely, to convey an input present at a single input thereto to the one of the eight outputs thereof which has been selected at the select inputs $S_1$–$S_3$. For instance, CD4051BM/CD4051BC single 8-channel analog multiplexer/demultiplexer devices, such as are available from National Semiconductor, may be employed for this function wherein a single pair of bits define the input/output function of the device to cause the same to act as either a multiplexer device or a demultiplexer device. The multiplexer means 10 and 11, as will be apparent to those of ordinary skill in the art, are connected in FIG. 1 in a demultiplexing mode wherein a selected one of the eight inputs thereto is applied to the output thereof, while the multiplexer means 12 is connected as a multiplexing device wherein the input thereto is selectively applied to one of the eight outputs thereof.

The select inputs $S_1$–$S_3$ of each of the multiplexer means 10 and 11 are commonly connected through the conductors 32–34 to the outputs of the processor means 20 connected to the conductors 35–37. Similarly, the select inputs $S_1$–$S_3$ of the output multiplexer means 12 are connected to the outputs of the microprocessor 20 connected to the conductors 38–40. Thus, as will be readily appreciated by those of ordinary skill in the art, the common outputs of the processor 20 connected on conductors 35–37 will allow a common channel to be monitored for an off hook condition as supplied through the multiplexer means to the output conductor 42 while AC information being conveyed on this same channel between a telephone set and the telephone line, or the reverse thereof, is monitored at the output of the multiplexer means 11 on the conductor 43. The provision of separate select outputs from the processor 20 on conductors 38–40 for the output multiplexer means 12 will enable input information such as dialing tones or the like to be applied, under program control, to the telephone lines and sets connected to different channels so that, in effect, while a dialing or prompting function is being conducted on one channel by the processor 20, the processor can also be listening for events which may be occurring on other channels.

The output of the multiplexer means 10 is connected directly to the processor 20 through the conductor 42 so that the off hook or on hook condition of any channel can be monitored on a periodic basis, and additionally, can be ascertained whenever the same is required within a step of a program in progress, as shall be described in greater detail below. Here, it is sufficient to appreciate that a service location comprising a register within the processor 20 is maintained for each channel, and each time the initiation of an off hook condition is ascertained, this service location is set with a count which determines the number of times the channel which has gone off hook will be inspected by the processor to ascertain if the same is requesting service. Conversely, each time an on hook condition for a particular channel is ascertained, the status location within the register is reset to zero so that an inactive state is indicated. Thus, it will be seen that through an application of eight different select states applied to the multiplexer means 10 by the processor 20 through the conductors 32–37, the off hook condition of each of channels 1–8 may be periodically sampled and applied through the output of the multiplexer means 10 connected to conductor 42 directly to the processor 20.

In a corresponding manner, the multiplexer means 11 acts in response to the select inputs present on conductors 32–34 to selectively gate an input present on one of the conductors $30_1$–$30_8$ to the output of the multiplexer connected to conductor 43. Multiplexer means 11 may take precisely the same form and functions in precisely the same manner as was described for the multiplexer means 10, except the eight inputs applied thereto on conductors $30_1$–$30_8$ result from the AC coupling means 23 within each of the plurality of channel connector circuits 1–8. Thus, the inputs which are applied to multiplexer means 11 will generally represent AC information generated at the telephone set or on the telephone line associated with a particular channel, and thereby serves as an input through which the processor 20 may monitor each channel for various tone information indicating that a particular service is being requested, a particular event has occurred or a requisite event has not occurred within an alloted interval.

By way of relevant example, the instant invention contemplates an automatic calling system wherein a subscriber may program the system to respond to predetermined user request signals to automatically outpulse one of two telephone numbers calculated to contact a leased line subscriber service, to recognize response tones therefrom, and upon recognition of such response tones, to automatically outpulse a selected one of three billing codes for each telephone number which is outpulsed. The programming feature, as shall be seen in greater detail below, envisions control personnel at the user's site depressing a program button on the console and thereafter placing a telephone connected to any channel in the off hook condition. The programmer thereafter enters a row 1 tone from the DTMF pad at the activated telephone set, which can be accomplished, as will readily be appreciated by those of ordinary skill in the art, by the simultaneous depression of any two keys in row 1 of the DTMF pad which contains the digits 1, 2 and 3. Thus, a row 1 tone may be entered by the programmer by the simultaneous depression of the 1 and 2 keys, the 1 and 3 keys, or the 2 and 3 keys. Thereafter, the key on the DTMF pad having the # thereon is depressed followed by a 1 or 2, assuming a two number service, to define which telephone number is to be programmed.

Once this has been done, one of keys 1–8 is depressed to specify the frequency of the answer-back tone to be received from a contacted site wherein a depression of the line 1 key corresponds to a frequency of 360 Hz and the remaining keys specify increased values therefrom in increments of 20 Hz. The phone number is then entered from the DTMF pad by a depression of the digits therein wherein up to eleven digits may be entered. The programmer than may again depress the # and the remaining 1 or 2 followed by a digit between 1 and 8 to define a second response tone. This is followed by the entry of a second telephone number.

When entry of telephone numbers and response tone information is completed, billing code information may be entered. This is done by a depression of the * key followed by a number key from 1 to 6 to define which billing code of six is to be involved. Thereafter, the appropriate billing code may be entered and this may be continued until up to six billing codes are entered. All of this information, as received during the program mode will be supplied through the appropriate AC coupling circuit means 23 within the activated channel connector circuit 1–8 and applied through one of the conductors $30_1$–$30_8$ to the input multiplexer 11 where the same is further applied on conductor 43 for purposes of interpretation and subsequent storage and use by the processor means 20.

Conversely, once the system has been appropriately programmed by supervisory personnel, as aforesaid, a system of usage is envisioned wherein a user may lift the receiver of any set connected to any channel whereupon an off hook condition is indicated to the processor 20 through an appropriate one of the conductors $24_1$–$24_8$, the off hook multiplexer 10 and the output thereof on conductor 42. If the user is desirous of actuating the instant invention, the system must be signalled within a predetermined interval or it is assumed that a normal telephone call is being made from the set, and the system is not to be actuated. If the system is to be actuated, the user must insert a row tone associated with rows 2–4 or a column tone associated with columns 1–3 within the predetermined interval wherein the entry of a row tone from rows 2, 3 or 4 would define automatic outpulsing of the first telephone number stored, together with the outpulsing of the first, second, or third billing code stored, depending on whether row tone 2, 3 or 4, respectively, was entered. Conversely, entry of column tones 1, 2 or 3 would define outpulsing of the second telephone number, together with either the fourth, fifth or sixth billing code stored, depending upon whether column tone 1, column tone 2 or column tone 3 were entered.

It will be appreciated by those of ordinary skill in the art that individual row and column tones are entered by the simultaneous depression of two appropriate keys on the DTMF pad at the actuated telephone set. Once entered, such tones are applied through an appropriate one of conductors $30_1$–$30_8$ to the input multiplexer means 11 and thereafter output on the conductor 43 thereof so that the same may be examined by the processor 20 in a manner to be described hereinafter. Once an appropriate activation tone is ascertained by the processor 20, the system will apply, in a manner to be described below, a series of beep tones to the appropriate conductor $30_1$–$30_8$ for the activated channel by outputting the same thereon through the output multiplexer means 12. The purpose of such beep tones is to signal the operator to release the pair of keys at the DTMF pad which have been depressed. Thereafter, the system will automatically outpulse the designated telephone number which has been defined by the activation tone and cause the same to be applied through the output multiplexer means 12 to the appropriate one of conductors $30_1$–$30_8$ whereupon the same is applied to the telephone line connected to that channel.

The system then acts to automatically monitor, on a periodic basis, the telephone line connected to the activated channel in order to determine the presence of the response tone which was programmed for the telephone number defined to the system. This occurs, in a manner to be described in greater detail below, through a monitoring of events transpiring on the telephone line as coupled to the system through an appropriate one of the conductor means $30_1$–$30_8$ and applied through the input multiplexer means 11 to the system for analysis.

If an appropriate response tone is ascertained, the system will then cause outpulsing of the designated billing code number and the same will be applied through the output multiplexer means 12 through an appropriate one of the conductors 30$_1$–30$_8$ to the telephone line connected to the channel which has been activated. Once this occurs, the user may then enter the final destination telephone number comprising an area code and a local telephone number on to the telephone line by depressing appropriate keys at the DTMF pad located at his set. The leased line subscriber system thus completes the call through its own long-distance transmission network to the area defined by the area code, whereupon the final call to the ultimate destination is completed on the local telephone links. Thus, through the manipulation of the select inputs for the input multiplexer means 11 and the output multiplexer 12, predetermined events which condition the system for the next segment of operation may be monitored through the input multiplexer means 11, while tones which are to be automatically generated and applied to telephone lines connected to activated channels may be generated by the system and applied thereto through the output multiplexer means 12 in such manner that generation functions and monitoring functions may be conducted on a time-shared basis.

Accordingly, it will be appreciated by those of ordinary skill in the art that all AC coupled inputs to the system are applied thereto through the input multiplexer means 11 and the output conductor 43 therefor, regardless of whether the same originate on the telephone line associated with an activated channel or at the DTMF pad associated with an activated telephone set. Conversely, all tone information generated by the system is supplied to the output multiplexer means 12 and selectively conducted to an enabled channel through the output multiplexer means 12 and an appropriate one of the conductor means 30$_1$–30$_8$.

The output multiplexer means 12 is provided, as indicated in FIG. 1, with an input from the system on conductor 44, as well as a connection to the inhibit input thereof on conductor 45. The operation of the output multiplexer means 12 is such that whenever the inhibit input on conductor 45 is absent, inputs thereto on conductor 44 will be applied to the one of the selected outputs thereof defined by the select inputs S$_1$–S$_3$ applied thereto from the processor means 20 on conductors 38–40. However, when an inhibit input is present on conductor 45, no information will be conveyed through the output multiplexer means 12, regardless of what is present at the input thereof. As will be appreciated by those of ordinary skill in the art, when the system is not outputting tone information, the output multiplexer means 12 is normally held inhibited, and conversely, the inhibit feature is removed when tone information is being supplied to the input of the output multiplexer on conductor 44.

The output of the input multiplexer means 11 is connected through the conductor 43 to an automatic gain control amplifier 47 which acts in the conventional manner to control the gain inserted into an input signal as a function of the magnitude of the output signal produced thereby. While any of the well-known forms of this conventional class of device may be employed, an automatic gain control amplifier which was employed in embodiments of this invention which have been built and tested is the Model AF105 AGC amplifier commercially available from the National Semiconductor Corporation. This particular form of AGC amplifier has proven to be highly advantageous in use as the same was designed for telephony applications, and as such is highly independent of noise. Furthermore, as the gain control feedback system employed therein is AC coupled, DC signals do not effect the gain thereof.

The output of the automatic gain control amplifier means 47 is applied through the conductors 49–51 to the DTMF filter means 14, the comparitor means 15 and the tone decoder means 16, respectively, so that various signals applied to the system from either the telephone line or set connected to an active channel may be further analyzed by the processor 20. More particularly, the DTMF filter means 14 may take the form of a dual output filter which is responsive to DTMF tone pairs to produce the high frequency tone on a first output thereof, and a low frequency tone of the pair on a second output thereof. Additionally, this device is characterized by a well-defined notch filter characteristic causing dial tone frequencies to be substantially attenuated. While any of the conventional DTMF filters currently available in the marketplace may be employed to perform the function of the DTMF filter means 14 illustrated in FIG. 1, the MT8865 DTMF filter, as sold by Mitel Semiconductor Corporation, is viewed as highly advantageous for this purpose in that the same acts to separate each of the DTMF frequencies which may be applied to the input thereof on conductor 49, to square each of them, and thereafter to provide a low frequency square wave and a high frequency square wave at each of the outputs thereof while dial tone is virtually ignored. The high level output of the DTMF filter means 14 is supplied through the conductor 53 to the input of a first flip-flop means 54, while the low frequency output of the DTMF filter means 14 is supplied through conductor 55 to the clock input of a second flip-flop means 56. Additionally, the DTMF filter means 14 is supplied through the conductor 57 with a clock signal provided by the clocking source 58 which here may take the conventional form of a 3.58 MHz crystal oscillator such as conventionally employed as a colorburst oscillator for video applications.

The first and second flip-flop means 54 and 56 make take the conventional form of D type flip-flops which act, in a manner well known to those of ordinary skill in the art, to be set to the condition of the D input thereof whenever a clocking signal is applied thereto. In the case of the flip-flops 54 and 56, the D input to each flip-flop is tied high in the manner indicated in FIG. 1, while the clock input is connected respectively to the high and low outputs of the DTMF filter means 14 on the conductors 53 and 55. The clear inputs to each of these flip-flops are connected through the conductors 61 and 62 to the processor means 20 while the Q output of each of these flip-flops is connected through conductors 63 and 64 to individual inputs of a NOR gate 65.

In operation of the flip-flops 54 and 56, it will be appreciated by those of ordinary skill in the art that the same are normally held in a clear condition by a level placed on conductors 61 and 62 by the processor means 20, except during such intervals as the processor means 20 seeks to ascertain if high and/or low frequency DTMF tones are being applied to the system from an activated telephone set or the like. Under these conditions, the clear line for the desired flip-flop 54 or 56 is released so that any output of the DTMF filter means 14 on an appropriate one of conductors 53 or 55 will cause the respective flip-flop to be set due to the high level present at the D input thereof. This high level will be applied through a respective one of the conductors 63 and 64 to the individual inputs of the NOR gate 65.

The NOR gate 65 may take any of the well-known forms of this conventional class of device and acts to produce a low at the output thereof when any of the inputs thereto go high. As shall be seen below, only one input to the NOR gate 65 will be active at a given time, and hence, capable of producing a high during this interval due to the manner in which the processor 20 acts to hold the flip-flops generating each input thereto in a clear condition unless it is desired to sample the output thereof to detect a particular tone presence on the line. Thus, whenever the output of the NOR gate means 65 goes low, it will be indicative that a selected tone is being applied to the circuit, and it will be appreciated that in the case of the DTMF filter means 14, whenever the processor 20 seeks to ascertain if high frequency DTMF tones are present on the line, the clear will be removed from conductor 61 to enable the flip-flop means 54 to be placed in a set state at a rate corresponding to the frequency of any high frequency DTMF tone provided to the DTMF filter 14. Furthermore, as shall be seen below, since the flip-flop means 54 is subsequently cleared each time the flip-flop is set by a clock signal on conductor 53, it will be appreciated by those of ordinary skill in the art that the output of the NOR gate 65 will go low at a rate corresponding to the rate of the high frequency DTMF tone being provided at the output of the DTMF filter means.

Conversely, should the processor means 20 seek to ascertain the presence of low frequency DTMF tones being applied to an appropriate one of the conductors $30_1$–$30_8$, the clear signal will be removed from the flip-flop means 56 while it is maintained to the flip-flop means 54 so that the flip-flop means 56 will be placed in a set condition to produce a high at the Q output thereof connected to conductor 64 at a rate corresponding to the period of low frequency DTMF tones being received. Furthermore, as the clear signal will be applied to the flip-flop 56 each time the same is placed in the set state, and thereafter removed to continue sampling, it will be seen that the high level on conductor 64 will cause the output of NOR gate 65 to go low at a periodic rate corresponding to the low frequency tones being received by the DTMF filter means 14.

The output of the NOR gate 65 is connected through a conductor 66 to an input of the microprocessor means 29 so that, as shall be seen in greater detail below, the processor may determine the precise period of any tone information which it is currently testing. Thus, for instance, if the processor is desirous of ascertaining whether high frequency DTMF tones are being applied to a selected one of conductors $30_1$–$30_8$, the flip-flop 54 will be placed in an enabled condition by the removal of the clear input on conductor 61. Under these circumstances, the flip-flop 54 will be placed in the set state and cleared at a rate corresponding to the high frequency tone being received by the DTMF filter means 14. This will cause the output of the NOR gate 65 to go low at a corresponding rate, and this output will be applied to the processor 20 through conductor 66 where the same will be further analyzed as to the presence of a precise frequency or period present in a manner to be described below.

The detection circuits associated with the DTMF filter means 14 are here employed only for purposes of determining the presence of DTMF tones, it being appreciated by those of ordinary skill in the art that high frequency column tones corresponding to 1209 Hz for column 1, 1336 Hz for column 2, 1477 Hz for column 3, and 1633 Hz for column 4, if the same is present, will be produced at the output of the DTMF filter means 14 connected to conductor 53, while low frequency row tones corresponding to 697 Hz for row 1, 770 Hz for row 2, 852 Hz for row 3, and 941 Hz for row 4, will be produced at the low frequency output of the DTMF filter means connected to conductor 55. The high frequency tones provided at the output of the DTMF filter means 14 are controlled by the selective enabling and setting of the flip-flop means 54, while the low frequency tones produced at the output of the DTMF filter means 14 on conductor 55 are controlled by the selective enabling of the flip-flop means 56. All DTMF tone detection, as employed herein, will take place under the auspices of the DTMF filter means 14.

The output of the automatic gain control amplifier 47 is also supplied through the conductor 50 to the comparitor means 15. The comparitor means 15, as plainly indicated in FIG. 1, may take the conventional form of a threshhold detector which acts in the well-known manner to compare an input being received on the conductor 50 with a predetermined threshhold level applied to a second input thereto, as indicated by the terminal annotated V+, and to provide an output on conductor 50 only when the level of the input on conductor 50 exceeds the predetermined threshhold as set by V+, thereof. The output of the comparitor means 15 is supplied through the conductor 68 to a shaping network formed by the capacitor 69 and the resistor 70. Thereafter, this output is applied to the clock input of the flip-flop means 71.

The flip-flop means 71 may take precisely the same form as the flip-flop means 54 and 56 described above, and it is connected in precisely the same manner as the flip-flops 54 and 56. More particularly, the D input to the flip-flop means 71 is tied to a source of potential V+ while the clear input thereto is connected through conductor 72 to the processor means 20. The Q output of the flip-flop means 71 is also connected through conductor 73 to one input of the NOR gate 65. Thus, whenever the processor means 20 is desirous of detecting tone information being applied to the AGC amplifier means 47, as the same is detected by the comparitor means 15, the clear input to the flip-flop means 71 is released whereupon the Q output of this flip-flop is set and reset at a rate whose period corresponds to the rate of incoming tone information on conductor 50.

The periodic setting and resetting of the flip-flop means 71 will result in the application of high level signals on conductor 73 at a rate corresponding to the period of the tone information being monitored, and hence, the output of the NOR gate 65 will go low at a corresponding rate. This information is then applied through the conductor 66 to the processor means 20. The tone information detected as a function of the shaped output of the comparitor means 15, as shall be seen in greater detail below, corresponds essentially to response tone or acknowledgement information of the type with which a contacted computer would respond as an indication that billing code information should now be generated.

These responses are programmable within the instant system, as aforesaid, and may vary from a frequency of 360 Hz in 20 Hz intervals up to a frequency of 500 Hz, depending upon which of keys 1–8 are employed to define the response tone of an answering computer or the like for a particular telephone number which has been defined to the system. However, since the DTMF filter means 14 has a precisely defined notch characteristic calculated to remove dial tone, or at least the portion thereof associated with the 400 Hz frequency, it will be seen that this entire range of frequencies will be rejected by the DTMF filter means 14. In actuality, the notch associated with the DTMF filter means 14 is centered at 440 Hz and has such a steep characteristic that the entire response range which may be programmed herein will be attenuated throughout most of the range by at least 30 db. Thus, the comparitor means 15, together with the shaping network formed by the capacitor 69 and the resistor 70, are employed for the detection of discrete tone information being applied to the AGC amplifier means 47 when such tone information may not be suitably detected by the DTMF filter means 14. Most response tone information generated by a contacted leased line system properly qualifies for detection by the comparitor means 15.

The tone decoder means 16 is additionally connected to the output of the automatic gain control amplifier 47 through the conductor 51. The function of the tone decoder means 16 is to monitor the output of the AGC amplifier means 47 for response tones from an answering computer at a contacted subscriber system site which does not take the form of a pure response tone of the type discussed in association with the tone detection techniques for which the comparitor means 15 is employed.

More particularly, there are certain subscriber systems which instead of returning a pure tone response as a signal for the provision of billing code information, return dial tone which is generally a combination of a 350 Hz and a 440 Hz tone. The tone decoder means 16 may take the conventional form of tone decoder circuit in the form of a phase-locked loop or the like which is responsive to dual tones centered at the dial tone frequencies, plus or minus 10 Hz, to put out a low level signal when such tones are present. In essence, a typical off-the-shelf tone decoder such as available from National Semiconductor or Motorola as a type 567C tone decoder, may be employed for this purpose and it will be appreciated by those of ordinary skill in the art that whenever a particular telephone line is being sampled subsequent to an outpulsing of a telephone number thereon, a dial tone response from a remotely contacted computer will cause the output of the tone decoder means 16 to go low and stay low for as long as the received dial tone information is sampled. The output of the tone decoder means 16 is supplied directly through a conductor 74 to an input of the processor means 20 and, as shall be readily appreciated by those of ordinary skill in the art, this input to the processor means 20 is monitored during portions of a program loop wherein a response from a contacted computer location is being sought, and if the output thereof as applied through conductor 74 to the processor means 20 goes low and stays low for 100 milliseconds, an appropriate response tone is assumed.

The audio generator means 18 may take the form of a conventional DTMF generator chip such as is available from National Semiconductor Corporation in the form of an MM5395N generator chip. As is well known to those of ordinary skill in the art, the DTMF generator means 18 accepts four row inputs $R_1$–$R_4$ and four column inputs $C_1$–$C_4$ on conductors 76–83, respectively, and in effect responds to a 2/8 code as received thereon to provide the DTMF frequency thus defined. More particularly, if a conventional DTMF telephone pad is considered, it will be seen that the row of buttons having digits 1–3 thereon is viewed as row 1, the row of buttons having digits 4–6 thereon is viewed as row 2, the row of buttons having digits 7–9 thereon is viewed as row 3, while the row of buttons having the *, 0 and # is viewed as row 4. Conversely, the column of buttons having digits 1, 4, 7 and * thereon is viewed as column 1, the column of buttons having digits 2, 5, 8 and 0 thereon is viewed as column 2, the column of buttons having digits 3, 6, 9 and the # is viewed as column 3, and while not generally available, a fourth column is sometimes provided having the letters A, B, C and D thereon.

At any rate, to specify any given digit on a conventional DTMF pad, the row and column coordinates therefor must be defined and this is precisely the manner in which the DTMF generator means 18 is addressed in that the row and column in which a desired digit resides on a telephone pad are grounded to thus define the appropriate 2/8 code for generation of the digit. The input conductors 76–83 for the DTMF generator means 18 are directly connected to the processor means 20, and the appropriate 2/8 code for generating an appropriate digit is directly generated by the processor means 20 by a grounding of the two desired conductors required for the DTMF code sought to be generated.

As shall be seen below, the duration of the 2/8 address generated by the processor means is hardware controlled so that the same persists for an interval which is adjustable but may be viewed as comprising an interval of approximately 75 milliseconds. The DTMF generator means will produce the requisite DTMF tone pair for the entire interval during which one of its row and column conductors are grounded and this is the mode of code generation employed thereby. The output of the DTMF generator means 18 is supplied through a conductor 84 and the amplifier means 85 to the input of the output multiplexer means 12. Thus, in this manner, a desired tone pair as defined by the two of eight code placed on the conductors 76–83 by the processor means 20, may be generated by the DTMF generator means 18 and applied through the conductors 84 and 44 to the input of the output multiplexer means 12. Additionally, an appropriate one of eight addresses is produced at the outputs of the processor means 20 on conductors 38–40 so that the DTMF tone pairs generated by the DTMF generator means 18 will be supplied to a defined one of the conductors $30_1$–$30_8$ for application to a telephone line or set coupled to a selected channel.

An additional characteristic of the DTMF generator means 18 here being discussed is that whenever an appropriate 2/8 address is supplied thereto on conductors 76–83, a muting level is produced thereby at the output thereof connected to conductor 86. This output is applied through a conventional inverter 87 so that, whenever the DTMF generator means 18 is not enabled, an inhibit level is applied to the output multiplexer means 12 on conductor 45, while when tone generation is taking place, the inhibit level on conductor 45 is removed. Additionally, as indicated in FIG. 1, the DTMF generator means 18 receives clocking information from the clock 58 through the conductor 57 at the input terminal annotated CK and this occurs, as was described above, at the 3.58 Mz rate provided by a conventional colorburst oscillator chip.

The processor means 20 may take any of the conventional forms of microprocessors currently available in the marketplace and is provided with appropriate ROM and RAM so as to enable the program set forth herein to be stored on a permanent basis in ROM. Additionally, approximately 64 bytes of RAM provided would preferably be configured to have the contents therein maintainable upon a power-down condition through the use of a battery backup therefor so that information programmed into the system by a user, such as telephone numbers to be automatically outpulsed, reply tones to be accepted and billing codes to be outpulsed would not be lost should a power failure occur at the user site. As it is viewed as unnecessary to illustrate separate ROM and RAM for the processor 20 illustrated in FIG. 1, the same has been indicated as taking the form of a microcomputer which, as well known to those of ordinary skill in the art, is provided with appropriate amounts of ROM and RAM already on the chip configured. In fact, in actual embodiments of the instant invention which were built and tested, Motorola MC6801 and MC68701 microcomputer chips were employed as the same proved to provide a highly convenient configuration and format for implementing the objectives of the instant invention.

Both versions of this microcomputer system are provided with 2K bytes of ROM, 128 bytes of RAM and 64 bytes of the RAM provided are retainable upon a power-down condition through the provision of a conventional battery backup configuration. Additionally, this particular form of microcomputer chip is also advantageous in that the same is a 4 port device having a maskable interrupt capability and is provided with divide-by-four circuitry for purposes of accepting an inexpensive 3.58 MHz clock in the form of a conventional colorburst oscillator crystal. The MC6801 and MC68701 microcomputers are also provided with a 16 bit free running counter on board, a 16 bit read/write output compare register, and a 16 bit read-only capture register which readily facilitates many of the frequency determining operations conducted herein under program control. In addition, this particular microcomputer readily facilitates the latching of many input conditions which occur so that in conjunction with the operation of the output compare register and the input capture register, various timing operations necessary to the appropriate operation of the instant invention, may be readily performed. The maskable interrupt feature provided also readily enables outpulsing operations conducted herein under the auspices of the DTMF generator means 18 to be controlled by hardware so that the microcomputer employed to function as the processor means 20 need not be tied down while the same is conducting outpulsing operations.

A clocking input in the form of a 3.58 MHz signal is provided to the processor means 20 through the conductor 57 whereupon the same is divided by four so that the microcomputer is running at a frequency of approximately 900 KHz. In addition to the various inputs and outputs to the processor means 20 which have already been discussed herein, the processor means 20 is provided with a maskable interrupt input on the conductor 88 and a strobe output thereof, as indicated by the terminal annotated S, is provided on the conductor 89. The strobe output of the processor 20 is connected through the conductor 89 to the trigger input (T) of a one shot or monostable flip-flop 90 which here serves to perform the function of appropriately timing the outpulsing functions conducted by the DTMF generator means 18.

The monostable flip-flop 90 may take any of the well-known forms of this conventional class of device which acts upon the application of a strobe input to the trigger input thereof to assume a predetermined state for an interval defined by the duty cycle thereof and to thereafter return to a reset condition. The output of the monostable flip-flop 90 is applied through the conductor 88 to the interrupt or IRQ port of the processor means 20 and the positive to negative transition thereof upon the completion of the duty cycle of the monostable flip-flop 90 serves to generate an interrupt for the microprocessor 20 when the same is not masked. The duty cycle of the monostable flip-flop 90 may be assumed to be approximately 75 milliseconds for purposes of the instant invention; however, a conventional monostable circuit chip wherein the duty cycle thereof may be adjustable through the provision of external resistors is preferred in order to allow an appropriate range of adjustment of such duty cycle. Thus, for instance, a National Semiconductor 555C one shot may be employed for this purpose wherein a resistor having a value of 560K is employed to establish the 75 millisecond duty cycle.

The manner in which the monostable 90 controls the timing for the DTMF generator means 18 is such that whenever the microprocessor 20 applies a two of eight code to the conductors 76–83 for purposes of generating a DTMF tone pair, and similarly causes the same to be output on a particular one of the conductors $30_1$–$30_8$ through the application of appropriate select inputs to the conductors 38–40, a strobe is also applied to the conductor 89 to thereby trigger the one shot 90. The 2/8 code applied to the conductors 76–83 will thus be maintained by the processor until an interrupt is generated on the conductor 88 upon the completion of the duty cycle of the one shot 90, it being noted that the interrupt input of the microprocessor 20 has the mask removed therefrom during such outpulsing operations. Thereafter, the processor will provide the next 2/8 code to the DTMF generator means 18 and initiate a new strobe on conductor 89 for the one shot 90 until such time as a particular phase of the dialing function is completed. In this regard, it should be further noted that the dialing function implemented by the processor through the DTMF generator means 18 is such that actual pauses and DTMF tone pairs are interleaved in sequence to provide appropriate timing intervals between digits on the line. Additionally, for purposes of allowing an adequate interval for the computer at the leased line subscriber site to respond to billing code information being placed on the line, several pauses or blanks are dialed prior to the actual initiation of DTMF tone pairs representing billing code information. This is done since it was determined that the automatic calling system according to the present invention is too fast in responding to acknowledgement tones and has a tendency to respond to a reply tone from an answering computer before the replying computer is in condition to receive such information. Thus, by initiating outpulsing of billing code information with a series of pauses or blanks, an additional period, normally corresponding to three outpulsing intervals, may be provided to allow the responding computer sufficient time to acquire DTMF tone pair information representing the first digit of the billing code.

The processor 20 is also provided with a program condition input at an input connected to the conductor 91. The conductor 91 is connected as indicated in FIG.

1 to the Q output of a flip-flop 92 which may take precisely the same form as the flip-flops 54, 56 and 71 described above. Here, however, the clock and the D inputs are commonly connected to one pole of a switch 94, while the preset input (P) is connected to the other pole of the switch 94 and to a source of potential V+. The clear line to the flip-flop 92 is connected through a conductor 95 to the processor means 20 so that the flip-flop 92 may be selectively cleared. The purpose of the flip-flop 92 and the switch 94 is to provide a latched signal to the processor means 20 indicating that supervisory personnel are desirous of initiating a programming operation wherein new telephone numbers, billing codes and/or response tones are to be defined to the processor means 20 under program control. Thus, as will be appreciated by those of ordinary skill in the art, whenever the switch 94 is depressed, the flip-flop 92 is placed in a set condition whereupon a high is generated on conductor 91. This high stays latched by the flip-flop 92 until the programming request is acknowledged and serviced whereupon the processor will clear the condition by resetting the flip-flop 92 through the application of a reset pulse to the conductor 95.

A remaining input to the microcomputer is provided from the switch 97 annotated Option (OPT). As aforesaid, the instant invention has the ability to outpulse more than one telephone number should a particular application so require, and distribute up to six billing codes among the two telephone numbers which can be accommodated through outpulsing functions. However, the provision of more than one telephone number for outpulsing purposes is not always required, and hence, the systems are configurable through a jumper indicated by the switch 97 to provide a hardwired indication as to whether or not a single number or multiple number configuration is present. This may be readily done with the microcomputer here being employed by simply grounding a terminal to indicate the presence of a multiple phone number configuration and by removing the ground therefrom, in the manner indicated in FIG. 1 to indicate that only a single phone number is to be outpulsed thereby. When the software employed within the instant system ascertains whether or not an option condition is present by ascertaining the presence of a ground or floating level on the conductor associated with the switch 97, multiple phone number detection sequences employed in both programming the device and in ascertaining the nature of service signals being requested, will be automatically avoided within the program being initiated. If the presence of the option is indicated by a ground level on the conductor associated with the switch 97, a multiple phone number outpulsing configuration is assumed and all determinations associated therewith within the program routines initiated will be followed.

GENERALIZED SYSTEM OPERATION

While the detailed modes of operation of the instant invention will best be understood in conjunction with the detailed functional flow diagrams set forth in conjunction with FIGS. 3–15, a brief description of the apparatus illustrated in FIG. 1 will here be set forth to apprise the reader as to the overall functions thereof during both a programming mode of operation and a service mode wherein billing code and telephone number information are outpulsed. In a program mode of operation, the system is to receive and store the phone number information to be outpulsed, a designation of response tone information to be acknowledged as a valid response from an answering computer requesting the outpulsing of a billing code, and up to three billing codes for each telephone number which has been inserted.

To initiate a programming operation, the programming switch 94 is initially depressed to cause the flip-flop 92 to be set and apply a high level at the input of the processor connected to conductor 91. The programming button 94 is preferably located within a locked housing containing the electronics for the instant invention so that only supervisory personnel will have the key therefor, and hence, the capability of accessing this function through a depression of the switch 94. As a practical matter, however, only supervisory personnel will be in possession of appropriate and valid telephone number and billing code information for purposes of contacting a designated subscriber service, and hence, the placement of the programming switch 94 within a locked environment is not an absolute necessity except to avoid tampering with the system.

When the input to the processor 20 goes high in response to a depression of the program switch 94, the same will be detected by the processor as it periodically cycles through the various portions of its main or executive routine in a manner to be described in detail in connection with FIG. 3. After this condition is detected, the processor will periodically cycle through the eight inputs of the off hook multiplexer means 10 and the input multiplexer means 11 looking for a selected channel to go off hook. This will be achieved as will be readily appreciated by those of ordinary skill in the art, by applying select input conditions on each of the conductors 35–37 which vary from 000–111 so that each of the eight channel connector means 1–8 is monitored as to the off hook condition thereof, as will be signaled on an appropriate one of the conductors $24_1$–$24_8$ and subsequently directly to the processor means 20 on the conductor 42. After the supervisor has depressed the program button 94, that individual will accordingly remove a handset on one of channels 1–8 and thereafter enter a row 1 tone at the telephone set to indicate to the system a continuation of the programming mode. As the system will have already determined which channel has gone off hook through the monitoring operation conducted by the off hook multiplexer means 10, and its receipt of an output generated by one of the optically coupled LED devices within each channel conductor, the channel which has gone off hook will be monitored on a periodic basis for the receipt of a row 1 tone through the appropriate gating of select inputs to the input multiplexer means 11.

A row 1 tone is inserted at the DTMF pad by the operator depressing any pair of buttons in row 1 which is comprised of keys having the digits 1, 2 and 3 thereon. As the row 1 tone comprises a 697 Hz signal, the same will be produced at the low output of the DTMF filter means 14 as produced on conductor 55 after the same has been detected at the output of the input multiplexer means 43 and operated upon by the automatic gain control amplifier 47. Since the system will only be looking for a row 1 tone under these conditions, the clear provided on conductor 62 to the flip-flop 56 will have been removed whenever such tone is ascertained, and cleared each time an output is received from the output of the NOR gate 65 on conductor 66 so that, in effect, a series of lows will be received on the input to the processor 20 applied on conductor 66. As shall be seen in greater detail below, whenever the microprocessor 20, which here may be assumed to take the form of a Motorola 6801 or 68701 microcomputer unit, seeks to determine the presence of a frequency from any of the flip-flops 54, 56 or 71 being coupled to the NOR gate 65, the processor will cause the state of the count in the free running counter therein to be loaded into the output compare register which, as aforesaid, is also a 16 bit read/write register.

When a low level subsequently appears at the output of the NOR gate 65 on conductor 66, the same will cause the count of the input capture register which corresponds to that of the free running counter to be latched, whereupon the count associated with each negative to positive transition of the tone being received may be calculated by merely subtracting the values in the two registers. This value will correspond to the period of the tone being received and this procedure is continued until 16 such count values are obtained and stored. Thereafter, the last 12 of the 16 counts obtained and stored are compared to the corresponding count value of the 697 Hz signal being sought, and if the same is indeed present, a determination that a row 1 signal has been inserted is made by the processor means 20.

Thereafter, the processor will output a row or column coordinate on one of the conductors 76–83 and appropriately define the select inputs on conductors 38–44 of the output multiplexer means 12 to cause a beep tone to be applied to the conductor $30_1$–$30_8$ for the channel which has gone off hook. After the beep tone interval has been completed, a blank or pause will be addressed at the DTMF generator means 18 and this will be followed in sequence by the application of a new beep tone. This continues until eight distinct beeps have been applied to an appropriate one of the conductors $30_1$–$30_8$ to apprise the operator that additional information should be furnished.

Upon receipt of the beep tone information, the operator will depress the # followed by a 1 or 2 key to define which telephone number is to be inserted. Thereafter, the operator will depress a key between 1 and 8 to define the frequency of the answer back tone for the telephone number to be inserted, it being noted that a depression of key 1 defines a 360 Hz answer back tone, while a depression of key 8 defines a 500 Hz answer back tone, with the keys therebetween defining intermediate frequencies in 20 Hz steps.

As the operator performs each entry sequence, the same is applied through an appropriate one of conductors $30_1$–$30_8$ and through the input multiplexer means 11 to the DTMF filter means 14 where each digit inserted will cause the generation of an appropriate DTMF high and low tone pair on each of conductors 53 and 55. These outputs will be selectively sampled by the processor means 20 through selective enabling of each of flip-flops 54 and 55 in sequence, whereupon a determination of the periods present, and hence, the keys depressed on the basis of the 2/8 code received, will be made and employed by the program to identify which telephone number is to be inserted and the response frequency which is to be assigned as a response tone for that telephone number. This information is appropriately stored within RAM.

After defining the appropriate response tone for the telephone number about to be entered, the supervisor programming the automatic calling system illustrated in FIG. 1 will then enter the first or second telephone number, depending upon whether a 1 or 2 digit was initially entered, as aforesaid. This is done by depressing in sequence the appropriate ones of the keys at the DTMF pad at the telephone set which has been activated for this purpose. While the phone number will normally include only seven digits as local calls to a subscriber system are usually envisioned, the phone number to be entered may include up to eleven digits so as to accommodate any conditions which are encountered. When the telephone number involves less than eleven digits, the system will automatically write blanks into digit positions for which no entry is present.

As each digit is entered at the telephone set by the programmer, signals corresponding to the DTMF tone pairs generated upon entry will be conveyed through an appropriate one of conductors $30_1$–$30_8$ and through the input multiplexer means 11 to the DTMF filter means 14. The high frequency and low frequency components of the tone pair will be applied through conductors 53 and 55 whereupon the same may be selectively sampled by the processor means 20 at the output of the NOR gate 65 in the manner described above. Thereafter, this high and low frequency information is analyzed by the processor means 20 through the period calculation techniques described above. Once the individual components of the tone pair have been analyzed, the tone pair is stored as a 2/8 code by the processor means 20 and this will continue until each digit of the telephone number being entered by the programmer is received. Upon completion of entry of the initial telephone number, the processor will store both the number received and the number of digits associated therewith for subsequent use in outpulsing operations which will be subsequently described.

If it is assumed that the option switch for the embodiment of the invention illustrated in FIG. 1 is closed so that the same corresponds to a two telephone number system, the programmer, assuming that the system has not been previously programmed or is to be completely reprogrammed, would again hit # sign at the DTMF pad followed by a 1 or a 2 to define the next telephone number being entered, and thereafter will depress a digit key between 1 and 8 to specify the frequency of the answerback tone to be responded to for this next telephone number. All of this information is entered at the DTMF pad for the activated telephone set and will be conveyed through an appropriate one of the conductors $30_1$–$30_8$ to the DTMF filter means for subsequent application and analysis by the processor means 20 in precisely the manner set forth above for the initial telephone number. Upon completion of the entry of this predicate information, the second telephone number, which again may include up to eleven digits, is entered and as each digit is entered, the nature of the digit is analyzed and stored as a 2/8 code together with an indication of the total number of digits present in the second telephone number being received. At this juncture, the programmer has completed entry of the telephone number information to be selectively outpulsed by the automatic calling system according to the present invention, and has additionally specified an answerback tone to be received upon the completion of outpulsing of each telephone number to be entered.

The programmer now must enter appropriate billing code information at the telephone set for each of the telephone numbers which have been defined to the system. This is accomlished by the initial depression at the DTMF pad of the * key followed by a key having one of the numbers 1–6 thereon, wherein the depression of the * key defines to the system that billing code information is about to be entered, while the depression of a digit 1-6 will define which of six possible billing codes are to be entered. It should be noted that billing codes 1-3 are automatically assigned to the first telephone number inserted while billing codes 4-6 are automatically associated by the system with the second telephone number entered. Assuming the system was being initially programmed or completely reprogrammed by the user, it would normally be assumed that the six billing codes, or whatever number of billing codes were to be entered, would normally be entered in sequence, and hence, under these circumstances, it may assumed that both the * and the 1 keys would be depressed.

When the * and 1 keys are depressed at the DTMF pad, this information will be again conveyed through an appropriate one of the conductors $30_1$-$30_8$ from the activated channel connector and subsequently applied through the input multiplexer means 11 to the DTMF generator means 18. Signal information associated with the high and low frequency of each tone there entered will be separated by the DTMF filter means 14 and separately applied to the conductors 53 and 55 whereupon through the selective releasing of the clear level at each of flip-flops 54 and 56, the processor means 20 may sample the period of each tone at the output of the NOR gate 65 and analyze the period of each tone in the manner described above. The presence of a depression of the * key, followed by a digit key defining which billing code is about to be entered, as thus detected may serve, under program control, as a predicate for properly defining the storage location for the billing information which is about to be inserted.

The billing information may then be entered by the programmer by a depression of the digits associated therewith, and as each digit is entered, it is analyzed by the processor 20 and stored as a 2/8 code in a digit location assigned for the appropriately numbered billing code. At the completion of the entry of the last digit of the billing code, the total number of digits within the billing code is additionally stored, it being noted that each billing code entered may comprise up to eight digits.

After the programmer has completed entry of the initial billing code, the entry of succeeding billing codes may occur in the same manner described above, it being noted that the key at the DTMF pad bearing an * followed by a key bearing a number from 1 to 6, must be depressed prior to the entry of each billing code to define the same as a particular biling code. In a two telephone number system, wherein it is desired to have only one billing code for each telephone number entered, this would involve the entry of two billing codes wherein the first billing code entered would have a code location specified by one of the digits 1-3, while the second billing code would be identified by a predicate digit of from 4-6. Of course, if greater segregation between calls made from several departments were desired, more than one billing code would be entered for each telephone number provided for the system.

After all billing code information desired has been entered by the programmer, the programming routine would be simply terminated by the programmer's simply placing the activated telephone set back in an on hook condition. This condition, as now will be readily appreciated by those of ordinary skill in the art, would remove the voltage dropped across an appropriate three of the diodes $D_1$-$D_5$ for an activated channel, and hence, extinguish an illuminated one of the light-emitting diodes $LED_1$ and $LED_2$. Whichever one of phototransistors $PT_1$ and $PT_2$ had been conducting would then be turned off so that this condition would be conveyed through an appropriate one of conductors $24_1$-$24_8$ being monitored by the processor 20 on the conductor 42. When this event is detected by the processor means 20, the flip-flop 92 will be reset by the placement of a clear level on conductor 95 and exiting from the program routine, in a manner to be described in greater detail below, will occur under program control.

Once the automatic calling system according to the present invention has been programmed, it may be simply employed by any user having access thereto through the user's placing a telephone set connected to any of the channels 1-8 in an off hook condition and providing a designated row or column tone to the system through the simultaneous depression of a pair of keys at the DTMF pad thereof within a predetermined interval. Of course, should the system not be properly programmed, entry of a service tone at an activated telephone set cannot result in a proper operation of the system wherein an outpulsing operation is completed. However, to avoid a situation where a user would mistake an unprogrammed system for a system wherein a row and column tone is inserted which has not had an appropriate telephone number and billing code defined therefor, the system is provided as shall be seen below with an outpulsing mode of response calculated to apprise the user that the system has not be properly programmed for receipt of the tone information inserted. This response, while capable of taking any set of beep tones desired which may be outpulsed from the DTMF generator means 18, has been selected to take the form of an outpulsing of a simple song, such as "Mary Had a Little Lamb" or the like. In this manner the user will not confuse the response condition for a condition where the system is acknowledging proper activation and is requesting further information through outpulsing of alternating beep tones. This is simply achieved, under program control, as a portion of the main loop or executive routine or a subroutine called thereby by the placement by the processor 20 of appropriate row and column tones on conductors 76-83 to cause the desired song or other response condition to be outpulsed on an appropriate one of conductors $30_1$-$30_8$ and applied to the activated telephone set through the conductors $R_1$, $T_1$.

However, assuming that the system has been properly programmed, a user desiring to access the system will simply lift the receiver at the telephone set provided to him and insert a row or column tone which corresponds to his assigned billing code for the particular long-distance subscriber service to be accessed. In this regard, it should be noted by those of ordinary skill in the art that the speed of the processor means 20 is such that while outpulsing may only occur at one channel at a time, delays in service even when all eight channels are being accessed, are relatively minimal and it should be noted that usage histories of such systems plainly indicate it is highly unusual that simultaneous requests for service are received. However, when such simultaneous requests for service are received, the processor means 20 can accommodate such requests without noticeable delays except where outpulsing of telephone number or billing code information is required, and here some delays will be experienced. The assignment conventions established under program control for the use of the instant invention is such that entry of row tones 2, 3 and 4 define a request for outpulsing of the first telephone number with the first, second and third billing codes, respectively, while the insertion of column tones 1, 2 or 3 define a service request for outpulsing of the second telephone number programmed, together with the fourth, fifth and sixth billing codes inserted, respectively. Thus, for instance, if the user's department was assigned billing code 1 for the first telephone number and billing code 6 for the second telephone number, a service request for outpulsing of the first telephone number with the user's assigned billing code would be implemented by the user's placing the telephone set off hook and simultaneously depressing two keys in row 2 through either the simultaneous depression of keys bearing numbers 4 and 5, 4 and 6, or 5 and 6.

Similarly, should this user desire to access the second subscriber service, he would depress two keys in column 3, i.e., any of the keys bearing the digits 3, 6 and 9, to enter the appropriate column tone in to the system for accessing the second telephone number and the sixth billing code which has been assigned to him. Furthermore, as shall be seen below, this must be done within an interval of approximately eight seconds or else the system assumes that the set has gone off hook for purposes of the user making a normal telephone call for which the automatic calling system, according to the instant invention, is not to be accessed. Under these circumstances, the activated channel is treated as inactive.

More particularly, as shall be discussed in greater detail below, each channel of the system which is monitored has assigned thereto in RAM a service location in which the current status of the channel is indicated so that when such channel is periodically checked under program control by the microprocessor, such status can be readily ascertained and a next programming step of operation can be appropriately implemented therefor, assuming such action is indicated. In the case of the assignment of an interval within which a service request must be received, it will be noted that an appropriate integer such as 127, or other suitable integer, is written into the service location and this value is decremented each time the channel is inspected by the processor to ascertain if an appropriate service tone has been received. If no service tone is received, the service location is decremented during each inspection and the processor continues cycling through its executive program, and during such cycling each channel is periodically inspected and serviced on a need-for-service basis. At any rate, once the channel has been inspected 127 times from the time it initially went off hook, a zero location will reside in the service location. Thereafter, the presence of such zero location will indicate to the system that no further inspection of the channel is required. In this way, channels which are off hook during the course of a conversation and the like will not be continuously inspected.

At any rate, if it is assumed that an appropriate row or column tone has been entered by the user within an appropriate interval, the signals representing this tone will be applied through an appropriate one of the conductors $30_1$–$30_8$ to the input multiplexer means 11 and thereafter through the automatic gain control amplifier 47 to the input of the DTMF filter means 14. As an off hook indication from that channel will have been previously monitored by the microprocessor means 20, the microprocessor means 20 will have already detected this latched condition and in succeeding cycles of the executive routine will be inspecting the activated channel for the receipt of an appropriate row or column tone. This will be achieved, as now will be appreciated by those of ordinary skill in the art, by the periodic inspection of the output of the NOR gate 65 upon selective removal of the clear conditions from the flip-flops 54 and 56. Thus, in this manner previously described above, the output of the NOR gate 65 will be inspected on a periodic basis and 16 samples of the period of signals which are appearing at the output of the flip-flops 54 and 56 will be obtained, compared with a table and one another and the appropriate row tone or column tone involved ascertained. Of course, if both a row and column tone are obtained upon the sampling of the output of the NOR gate 65, upon selective removal of the clear levels on the conductors 61 and 62, the processor 20 will have determined that the user who has activated the channel is making an ordinary telephone call, and hence, the automatic calling system according to the instant invention is not to be activated. Thus, under these conditions, a zero condition will be written into a service location of the respective channel, as aforesaid. However, if it is assumed that an appropriate row or column tone has been entered at the set calculated to initiate a service routine and that the microprocessor means 20 has been programmed to outpulse an appropriate telephone number and billing code in response to the tone being received, the service request will be recognized by the system.

Upon a detection of an appropriate row or column tone requesting service, the processor means 20 will appropriately address the output multiplexer means 12 through the conductors 38–40 and the DTMF generator means 18 through the row and column conductors 76–83, in the manner described above, to cause a beep tone to be outputted on the conductors $30_1$–$30_8$ associated with the active channel. This will be continued until eight beeps have been generated by alternating actual beep tones with pauses so that the user is advised that the system has responded to the generated service request.

While beep tones are being applied to an appropriate one of the conductors $30_1$–$30_8$ through the operation of the DTMF generator means 18, the processor means 20 will additionally act to look up the telephone number defined by the row or column tone received as a service request signal and write the number of digits therein as well as the address of the first digit therein.

Upon completion of the issuance of beep tones to the user, the telephone number for the selected subscriber system is outpulsed under processor control. More particularly, while beep tones were being issued by the system, the processor would have looked up the address of the first digit for the telephone selected, as well as having stored the number of digits in the telephone number selected.

Therefore, when the program next returns to servicing the active channel, the processor will place appropriate row and column designations on conductors 76–83 to cause the outpulsing of a pause, to enable the select lines 38–40 so that the input of the multiplexer means 12 on conductor 44 is coupled to the activated channel requesting service, and place a strobe on the conductor 89 to cause the firing of the one shot flip-flop 90. This will cause, as will be readily appreciated by those of ordinary skill in the art, the outpulsing of a pause and the same will continue until the one shot is reset and generates an interrupt, whereupon the dialing sequence is continued. However, this time the row and colum coordinates of the first digit of the telephone number will be accessed and applied to the row and column conductors 76–83, and coupled through the output multiplexer means 12 to the enable channel. Again, a strobe level is placed on conductor 89 to fire the one shot 90 and the restister holding the count of the number of digits to be dialed is decremented. The processor then returns to normal operations until an interrupt is again generated on the conductor 88.

Upon a generation of an interrupt on conductor 88, the microprocessor means 20 initiates an outpulsing of a pause in the same manner previously described until an interrupt is again generated on the conductor 88. When this interrupt is generated, the next digit in the telephone number selected is addressed, applied to conductors 76–83 whereupon the DTMF generator means 18 will generate the appropriate tone pair for this digit and apply the same through the output multiplexer means 12 to an appropriate one of the conductors $30_1$–$30_8$. Again, a strobe level will be applied to the conductor 89 to fire the one shot 90 and the digit register holding the number of remaining digits to be dialed is again decremented.

When an interrupt is next generated, a pause will be again outpulsed in the manner previously described and this mode of operation will continue in a fashion where digits of the phone number are interleaved with pauses until the digit register has been decremented to zero. At this time, the processor has completed the outpulsing function associated with the selected phone number, it being noted that outpulsing is performed under the hardware control associated with the one shot 90 so that, in effect, the processor means 20 is not tied down during the entire telephone number outpulsing operation, but instead merely issues appropriate address information on conductors 76–83 and 38–40 to allow the DTMF generator means 18 to perform the outpulsing function. Thereafter, the microprocessor means 20 can return to other program routines until such time as an interrupt is generated on the conductor 88 whereupon it again returns to the outpulsing function.

After the outpulsing function associated with the telephone number has been completed, the service location for the channel receiving the outpulsing function has a character written therein indicative that the outpulsing of telephone number information for the particular telephone number selected has been completed. Thereafter, when the microprocessor operating within the main routine returns to servicing this activated channel, inspection of the service location will reveal that it must next monitor the conditions appearing on the activated one of the conductors $30_1$–$30_8$ to ascertain the presence of a specified response frequency, as entered during the programming mode, in association with the telephone number. Accordingly, the appropriate one of the conductors $30_1$–$30_8$ is connected through the input multiplexer means 11 and the AGC amp 47 to the input 50 of the comparitor means 15, while the processor means 20 acts to remove the clear level on conductor 72 so that any shaped output from the comparitor means 15 will cause a setting of the flip-flop 71 and the subsequent provision of a low at the output of the NOR gate 65 on conductor 65. When this low appears, the flip-flop 71 is again cleared and this periodic monitoring function is performed in precisely the same manner as was described for the outputs of the flip-flops 54 and 56 so that a detection of frequencies being received on the telephone line for the active channel is provided at the output of the flip-flop 71 and the NOR gate 65 whereupon the processor means 20 may calculate the precise frequency of the tone being received in the same manner as was described for the various tone information output from the DTMF filter means.

Upon detection of an appropriate response tone, the character written into the service location for channel is changed to indicate that outpulsing of the billing code should be initiated when the processor returns to servicing the active channel. Accordingly, when the processor means 20 returns to servicing this channel, the address for the first digit code for the billing code selected is stored together with the number of digits in the digit code defined. Thereafter, the microprocessor means 20 will perform the outpulsing function for each digit of the billing code defined in the same manner as was described for the outpulsing function associated with the telephone number selected, except that three pauses are outpulsed prior to the initiation of outpulsing of any digit number information to allow the responding computer at the subscriber site sufficient time to respond to receipt of initial digit information representing the billing code. The outpulsing function associated with pauses and digit information issued by the DTMF generator means 18 is performed in precisely the same manner described above by the processor means 20 functioning under directions of the hardware control exercised by the one shot 90. Thus, outpulsing in the described manner is continued until all digits of the billing code number have been issued.

Upon completion of the issuance of billing code information on to the line, the automatic calling system according to the instant invention, has essentially completed servicing of this channel and the operator hearing the silence on the line may then enter the area code and the telephone number of the ultimate location which he is desirous of contacting. The processor means 20, at this time, will have entered an appropriate character into the service location to indicate that it has completed servicing this channel, and hence, will not return to any function associated with this channel except for the inspection of the contents of the service location, until an on hook indication for the channel is received, at which time the service location is cleared.

Thus, it will be appreciated by those of ordinary skill in the art that the automatic calling system, according to the present invention as illustrated in FIG. 1, is easily and readily programmable by the user so that the system may be initialized and from time to time modified to accept new telephone number and billing code information without an intervention of factory personnel. Conversely, in use, a user need only enter an appropriate row or column tone to define both the telephone number and a desired billing code to be outpulsed to a computer which is to be contacted and provided with billing code information. Thereafter, the user need only enter the appropriate area code and local telephone number for the final destination which it is desired to contact so that, in effect, no more effort is required in employing a long-distance telephone subscriber service in conjunction with the instant invention than is required in using conventional dialing techniques mandated by the telephone companies, while at the same time, the marked cost savings obtained through using such subscriber systems are achieved.

MUTING CIRCUIT EMBODIMENT

Figure 2:
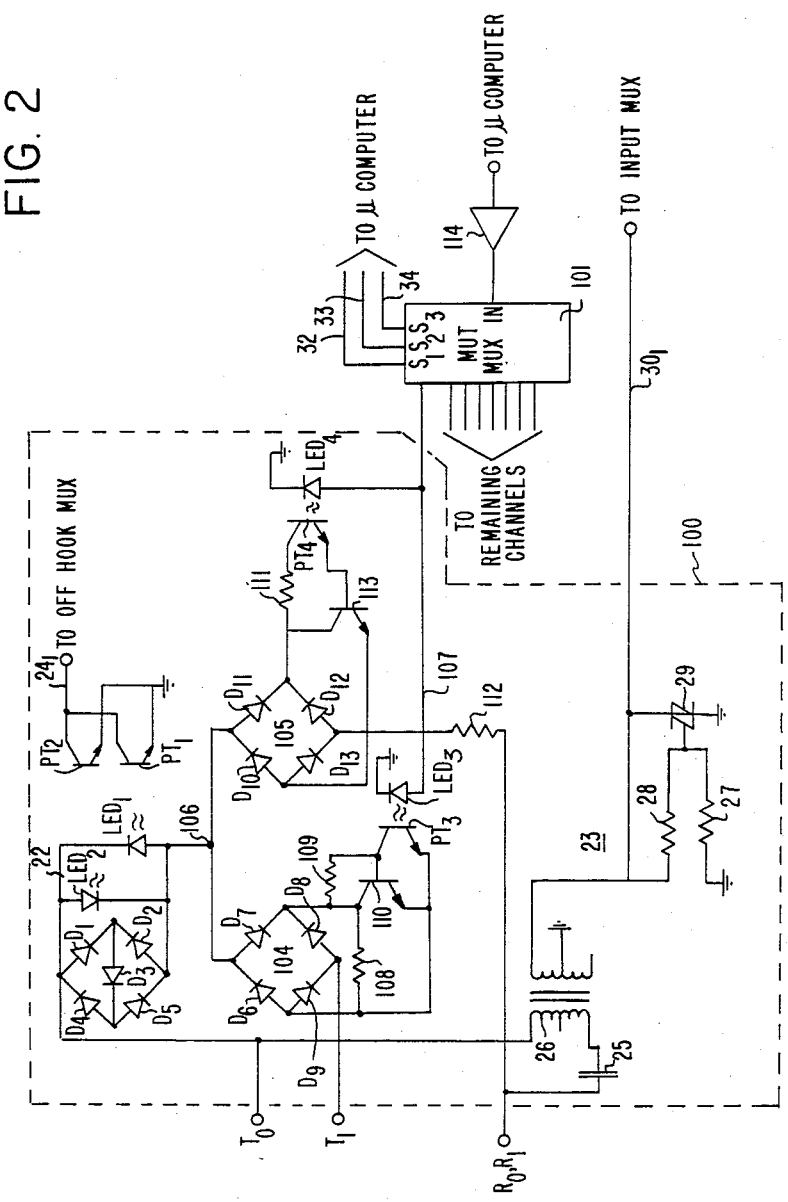
FIG. 2 is a block diagram schematically showing an alternate embodiment of a channel connector employing an exemplary muting circuit which may be substituted in the embodiment of the invention illustrated in FIG. 1.

Referring now to FIG. 2, there is shown a block diagram schematically illustrating an embodiment of a channel connector employing a muting circuit which may be added to the embodiment of the invention illustrated in FIG. 1. The exemplary muting is advantageous since it has been found that for applications of the instant invention which do not involve PBX installations, it is frequently desirable to speed handshaking functions between the automatic calling system, according to the instant invention, and users thereof by effectively removing power from the DTMF pad associated with an activated telephone set once the service request tone generated from the set has been received by the system.

More particularly, it will be recalled that once a user accesses the system through the simultaneous depression of an appropriate pair of row or column keys to generate the requisite row or column tone, the system initially provides a beep tone to the user to advise the user that he has properly accessed the system. The purpose of the beep tone in acknowledging the service request signal is effectively to cause the user to release the pair of DTMF pad keys depressed so that an actual outpulsing of DTMF information corresponding to the selected telephone number may begin.

In this regard, it has been noted that typical users will not release the pair of keys which had been simultaneously depressed until such time as the beep tone is heard, and often there is some delay between when the beep sequence is completed and actual release of the depressed keys by the user wishing to access the system. As will be readily appreciated by those of ordinary skill in the art, a mode of accessing the dialing system wherein two keys are simultaneously depressed at the DTMF pad to cause the generation of only a single row or column tone is highly advantageous because while such a single tone may be readily detected by the automatic calling system, according to the instant invention, the same tone is transparent to the telephone system to which each channel is connected, and hence, will not result in a loss of dial tone. Thus, as far as telephone company switching equipment is concerned, nothing has occurred on the telephone line which has gone off hook until such time as outpulsing by the automatic calling system, according to the instant invention, takes place.

However, it will be readily appreciated by those of ordinary skill in the art that should outpulsing begin prior to the release of the pair of keys depressed by a user, it is entirely conceivable that more than a DTMF tone pair will be initially introduced on to the telephone line as the accessing row or column tone will effectively constitute a third frequency on the line. Thus, should outpulsing begin before the user releases the pair of keys depressed, it is entirely feasible that the initial digit issued by the automatic calling system, according to the present invention, may be misconstrued by the local telephone system through which the call to the subscriber system is being completed.

To insure that this does not occur, embodiments of the invention such as shown in FIG. 1 should provide a sufficient number of beeps and a delay between the termination of the beep code and the outpulsing function associated with the first digit of the telephone number to be outpulsed to insure that the user accessing the system has released the pair of row or column keys which were depressed in order to access the system. As an alternative, however, in non-PBX applications, it is also possible to selectively mute the set so that, in effect, power is removed from the DTMF pad whereupon outpulsing of the initial digit of the phone number by the automatic calling system, according to the present invention, may begin at a time determined by the program rather than some arbitrary interval calculated to insure that the accessing keys have been released. Thus, in effect, the actuation of the muting circuit will remove the tone from the line regardless of whether the user has released the keys. Obviously, when the user discerns that telephone number information is being outpulsed, the accessing keys will be released and certainly this release will occur prior to the completion of the outpulsing of information associated with the telephone number.

The embodiment of the invention employing the exemplary muting circuit illustrated in FIG. 2 comprises a channel connector circuit 100, which would function as a direct replacement for the channel connector circuits 1–8 illustrated in FIG. 1, and a muting multiplexer means 101 which would be added to the circuit of the automatic calling system illustrated in FIG. 1 for purposes of gating on, in a manner to be further described below, selected components within the channel connector circuit 100. In addition, it should be noted, that the functional flow diagrams set forth in FIGS. 3–15 and the program attached hereto as an Appendix, will be fully applicable to the embodiment of the invention illustrated in FIG. 1 in the form therein illustrated or as modified so as to incorporate the muting circuit illustrated in FIG. 2.

It should additionally be noted that the exemplary muting circuit illustrated in FIG. 2 is also viewed as highly advantageous in that the same acts, in a manner to be further seen below, to optimize the impedance of an actuated telephone set with respect to the telephone line to thus avoid variations between set impedances as often occurs among various manufacturers, as well as different telephone set types provided by the same manufacturer. Hence, when the embodiment of the muting circuit illustrated in FIG. 2 is incorporated within the invention set forth in FIG. 1 for normal telephony applications, a number of advantages are achieved.

The channel connector circuit indicated by the dashed block 100 is connected to the tip $T_0$ and ring $R_0$ of the telephone line and returns tip $T_1$ and ring $R_1$ lines to the telephone set in precisely the same manner described in connection with FIG. 1. For this reason, commonly annotated terminals $T_0$, $T_1$ and $R_0$, $R_1$ have been illustrated in FIG. 2 as connecting to the channel connector circuit indicated by the dashed block 100. Furthermore, the exemplary muting circuit illustrated in FIG. 2 employs virtually the same off hook detection circuit means 22 and AC coupling circuit means 23 as was discussed in connection with FIG. 1, and for this reason, each of these circuits, as well as the components present therein, have been annotated with the same reference numerals relied upon in conjunction with FIG. 1 to indicate their corresponding function. Thus, in essence, the off hook detection circuit means 22 includes a bridge circuit containing five diodes $D_1$–$D_5$ to provide a three diode drop in the voltage supplied from the tip connector from the phone line $T_0$ for purposes of illuminating one of the light-emitting diodes $LED_1$ or $LED_2$, depending upon the polarity of the applied voltage when a telephone set goes off hook.

Whichever light-emitting diode $LED_1$ or $LED_2$ is thus illuminated, the same will act to place its associated, optically coupled photoconductive transistor means $PT_1$ or $PT_2$ in an on condition so that an appropriate off hook signal is placed on conductor $24_1$. In fact, the only difference thus far in the circuit described is that in returning this signal to the handset at the terminal annotated $T_1$, the same is placed through a muting circuit 104 for purposes, to be described below.

In similar manner, the AC coupling circuit 23 comprises a capacitor 25, a center tapped transformer 26 and a window circuit formed by the resistors 27 and 28, as well as the bipolar silicon switch 29. The output of this circuit is supplied through a conductor $30_1$ directly to the input multiplexer means 11 in the manner plainly indicated in FIG. 1. Here again, the only difference in the AC coupling circuit is that coupled AC information is detected between the $T_0$ terminal and the $R_0$–$R_1$ terminal rather than the $T_1$ and $R_0$–$R_1$ terminal so that AC coupling of information through the muting circuit 104 does not take place.

In addition to the portions of the circuit already described in connection with FIG. 1, the exemplary muting circuit illustrated in FIG. 2 comprises a muting circuit 104 and a hold circuit 105. The muting circuit 104 is normally in a low impedance state so that the telephone set responds in a normal manner for purposes of placing outgoing, normal calls from a DTMF pad located thereat, or alternatively, for placing a service tone, as aforesaid, to the automatic calling system according to the instant invention. However, when the muting circuit 104 is actuated by the processor means 20 after the same has determined that a service request on the channel is present, the same will assume a high impedance state so as to establish a high impedance condition in series with the telephone set connected to terminal $T_1$. This effectively removes power from the DTMF pad present thereat so that the same may not effectively place tone information on the telephone line. Of course, muting is removed by the processor means 20 after the completion of outpulsing to restore the set to a normal condition.

The hold circuit 105 normally is in a high impedance state and is established in parallel between the tip and ring inputs $T_0$ and $R_0$ of the telephone line and the set connected to the terminals $T_1$ and $R_1$. The hold circuit is actuated, as shall be seen below, at the same time that the muting circuit is actuated, and when actuated assumes a low impedance state so that a low impedance path is established between the tip and ring inputs from the telephone line to maintain the circuit connection therebetween when the telephone set is muted.

Both the muting circuit 104 and the hold circuit 105 comprise four diodes $D_6$–$D_9$ and $D_{10}$–$D_{13}$ arranged in a bridge configuration, a photoresponsive transistor $PT_3$ and $PT_4$, and a light-emitting diode $LED_3$ and $LED_4$, each of which is arranged in an optically coupled relationship. Both of the light-emittng diodes $LED_3$ and $LED_4$ are connected through a conductor 107 to one output of the muting multiplexer means 101, it being noted that the remaining seven outputs thereof would be connected to corresponding conductors in the channel connector circuits employed for the remaining seven channels in an eight-channel system. In addition, the muting circuit 104 includes a first and second resistors 108 and 109 and a bipolar transistor which is normally in an on condition. Conversely, the hold circuit includes first and second resistors 111 and 112 and a bipolar transistor 113 which is normally in an off or non-conductive condition.

The muting circuit, as will be appreciated by those or ordinary skill in the art, is effectively connected between the output of the off hook circuit 22 indicated by junction 106 which has modified the potential at terminal $T_0$ by three diode drops, as aforesaid, and the tip terminal $T_1$ which is returned to the set. Conversely, the hold circuit 105 is connected between the output of the off hook circuit at 106 and the ring terminal $R_0$, $R_1$ so that, in effect, the hold circuit is effectively in parallel across the tip $T_0$ and ring $R_0$. Due to the condition of the transistor 113, the hold circuit 105 is in a normally open state. The muting circuit 104 is effectively in series between the terminals $T_0$ and $T_1$, and hence, in series with the telephone set. The muting circuit 104 is normally in a low impedance state due to the conductive condition of the bipolar transistor 110. The resistors 108, 109 and 111 are employed for normal biasing purposes while the resistor 112 is a 1K$\Omega$ resistor which is effectively placed in parallel across tip and ring when the bipolar transistor 113 is rendered conductive in a manner to be described below to provide an appropriate characteristic impedance across the line.

The muting multiplexer means 101 may take precisely the same form of multiplexer means described in association with the multiplexer means 10–12 described in connection with FIG. 1, and as will be seen upon an inspection of FIG. 2, receives the same select inputs from the microprocessor means 20 are as applied to the off hook multiplexer means 10 and the input multiplexer means 11. This means that whenever an off hook condition is ascertained and the processor means 20 is monitoring the AC coupling circuit for receipt of a service request row or column tone through the input multiplexer 11, the output of the muting multiplexer means 101 connected to the activated channel, is also selected. The input to the muting multiplexer means 101 is connected through a conventional amplifier 114 in the manner indicated, to an output of the processor means 20 illustrated in FIG. 1 so that an output signal may be selectively gated from the processor means 20 to the line 107.

In operation, once the processor has determined that a selected channel has gone off hook, as indicated by an output on conductor $24_1$, it will monitor the AC receiving circuit output on conductor $30_1$ to ascertain whether or not the user has inserted an appropriate service request signal in the form of a row or column tone at the telephone set in the manner described in connection with FIG. 1. During this time, the set is effectively connected from the terminal $T_1$ to the terminal $T_0$, and hence, to the primary of the transformer 26 within the AC coupling circuit 23 through the low impedance path established by diodes $D_6$ and $D_7$ or $D_8$ and $D_9$ of the muting circuit 104, the normally coonductive transistor 110, the junction point 106 and the bridge circuit of the off hook circuit formed by the diodes $D_1$–$D_5$. Conversely, the hold circuit 105 is now in an open circuit condition due to the non-conductive state of the transistor 105 which, in effect, precludes a path between the junction point 106 and the resistor 112.

Once, however, the processor means 20 has ascertained that the user has inserted an appropriate row or column tone, in the manner aforesaid, and has initiated an outpulsing of beeps to the operator, a signal will also be applied from the processor means 20 through the amplifier means 114, and the multiplexer means 101 to the conductor 107. This signal will energize both of the light-emitting diodes $LED_3$ and $LED_4$ so that their associated, optically-coupled phototransistors $PT_3$ and $PT_4$ will be placed in an on condition. When this occurs, the bipolar transistor 110 will be placed in a high impedance state while the bipolar transistor 113 will be driven into conduction. Thus in this state, it will be seen that a very low impedance circuit is established between the junction 106 and the resistor 112 so that, in effect, the resistor 112, which may take the form of a $1K\Omega$, 1 watt resistor, is placed in parallel across the terminals $T_0$ and $R_0$, $R_1$ to thus place a 1K shunt across the tip and ring to hold the circuit established when the telephone set was placed in an off hook condition.

Similarly, when the light-emitting diode $LED_3$ is energized and its corresponding optically-coupled phototransistor $PT_3$ is placed in an on condition as a result thereof, the transistor 110 is driven into a high impedance state to effectively place a high impedance in series between the terminals $T_0$ and $T_1$. Thus it will be seen that when this occurs, the potential applied from the line at terminals $T_0$, $R_0$ is effectively dropped across the high impedance circuit established by the bipolar transistor 110 so that effectively most of the voltage is removed from the DTMF pad associated with the set. This means that any tone information being generated at the DTMF pad thereof will automatically terminate, regardless of whether or not the operator releases the keys.

Therefore, once a muting level is applied on the conductor 107, outpulsing of the requested telephone number may be initiated immediately by the processor means 20 without awaiting an appropriate interval for the operator to release the pair of keys generating the selected service tone. As the operator will perceive the muting of the telephone set if the keys at the DTMF pad remain depressed by the audible termination of the row or column tone produced, this function per se could be employed to advise the operator that the system has been accessed without use of beep tone, should the same be desired. However, the outpulsing function for telephone information and the like is conducted under the auspices of the processor means 20, will still be discernable to the user.

Thus, the exemplary embodiment of the muting circuit effectively cuts off the user's action at the enabled telephone set once it has ascertained that a service request is being generated and does not rely upon a prompt response to the beep tone. Should it be desired to build all embodiments of the instant invention with a muting circuit such as is disclosed in FIG. 2, it will be apparent to those of ordinary skill in the art that the muting function may be removed for purposes of use on PBX systems or the like by placement of a jumper connection between junction 106 and the tip return terminal $T_1$.

The embodiment of the exemplary muting circuit illustrated in FIG. 2 is viewed as highly advantageous in selected applications as such muting circuit optimizes the load, renders the circuit independent of impedance, and essentially avoids impedance variations which occur among conventional telephone sets. Furthermore, it renders the operation of the automatic calling system, according to the instant invention, essentially independent of operator's response time in that the operator need not promptly respond to the beep signal provided by the automatic calling system. Thus, with the muting circuit illustrated in FIG. 2 in place, the set is effectively cut off once a service request signal is received and in this manner outpulsing of telephone number information may be initiated without awaiting a user's reaction.

THE OPERATING SYSTEM

Figure 5:
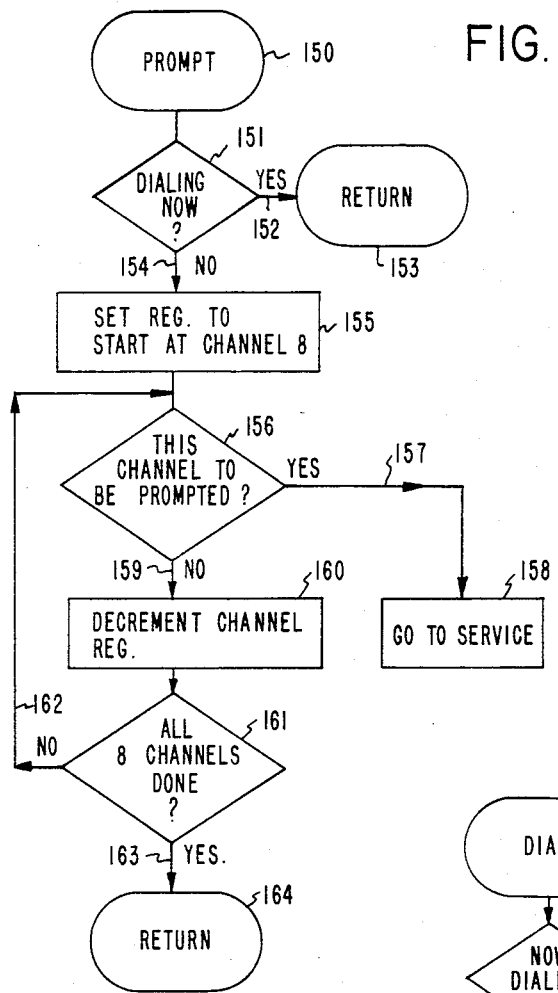
FIG. 5 is a functional flow diagram illustrating the details of an exemplary Prompt subroutine called by the Main program routine illustrated in FIG. 3.

The actual processing of signals within the automatic calling system illustrated in FIG. 1 may be best appreciated upon a detailed review of the flow charts set forth in FIGS. 3–5. These flow charts have been provided and will be hereinafter discussed in order that the basic functions involved in the main routine and the principal subroutines which are called within the automatic calling system, as well as the manner in which they are implemented, may be readily understood. The reader should note, however, that the flow charts which are hereinafter described, are simplified to a great degree, consistent with the usage of flow charts as relied upon by those of ordinary skill in the art.

Referring now to FIG. 3, there is shown a functional flow diagram illustrating the operation, according to an exemplary main program routine, of the embodiment of the invention shown either in FIG. 1 per se or as modified in accordance with the muting embodiment illustrated in FIG. 2. The main program routine illustrated in FIG. 3 is entered, as shall be seen below, at the completion of any subroutine which has been called either by the main program routine per se or subroutines which have been called as part of a branch or interrupt mode of operation from a previous subroutine wherein no return to the calling subroutine is required. Additionally, the main routine is entered at the completion of a resetting operation which occurs, as shall be appreciated by those or ordinary skill in the art, when the system is initially powered up, a power failure has occurred, under the auspices of a manually inserted reset command, or as a periodic function of certain subroutines which may be entered from time to time such as the program subroutine.

While the reset subroutine has not been illustrated per se, the same involves, as will be readily appreciated by those of ordinary skill in the art, a configuring of the IO ports of the processor means 20, a determination of whether or not standby power, in the form of a battery power pack, is operative, and if the same is operative, all channels are set active which involves setting a value corresponding to 127 in the service location for each channel corresponding to the number of times the channel is to be inspected. If the battery standby power pack has failed, it will be appreciated that prior to setting all channels active, a default code will be set in storage to apprise the operator that while the system is operative, the same must be programmed. Such default code may take the form of the playback of jingle or a specified beep routine which is sufficient in nature to apprise an operator that the system must be programmed. After all chanels have been rendered active, the main program loop, illustrated in FIG. 3, is entered.

When the main routine is entered in the manner indicated by the oval flag 120 annotated main loop, the program acts, in essence, to call a series of subroutines whose purpose, as shall be seen in much greater detail below in connection with the individual subroutines listed, is to ascertain if a form of service within the system is required or if a condition is to be ascertained. Thereafter, as each determination is made, the subroutine called or subsidiary subroutines act to provide such service or to test for the condition required.

Once the main routine has been entered, the initial subroutine called, as indicated by the rectangle 121, is the off hook test. This program acts, as shall be seen in greater detail in connection with FIG. 4, to look at the service location associated with each channel to ascertain if service is required. As aforesaid, each channel upon resetting or the initiation of an off hook condition has the value of 127 set into the service location or register therefor and the value therein is decremented each time the channel is looked at by the program so that a specified interval, normally corresponding to approximately eight seconds, is established for receipt of a service request. If the service request is received before the value 127 is decremented to zero, the channel is promptly serviced under program control; however, if the same is decremented to zero, it is assumed that the same has been employed for purposes of a normal telephone call, and hence, the channel is treated as inactive until the same again is placed on hook to allow a subsequent resetting of initial conditions.

Figures 11, 12:
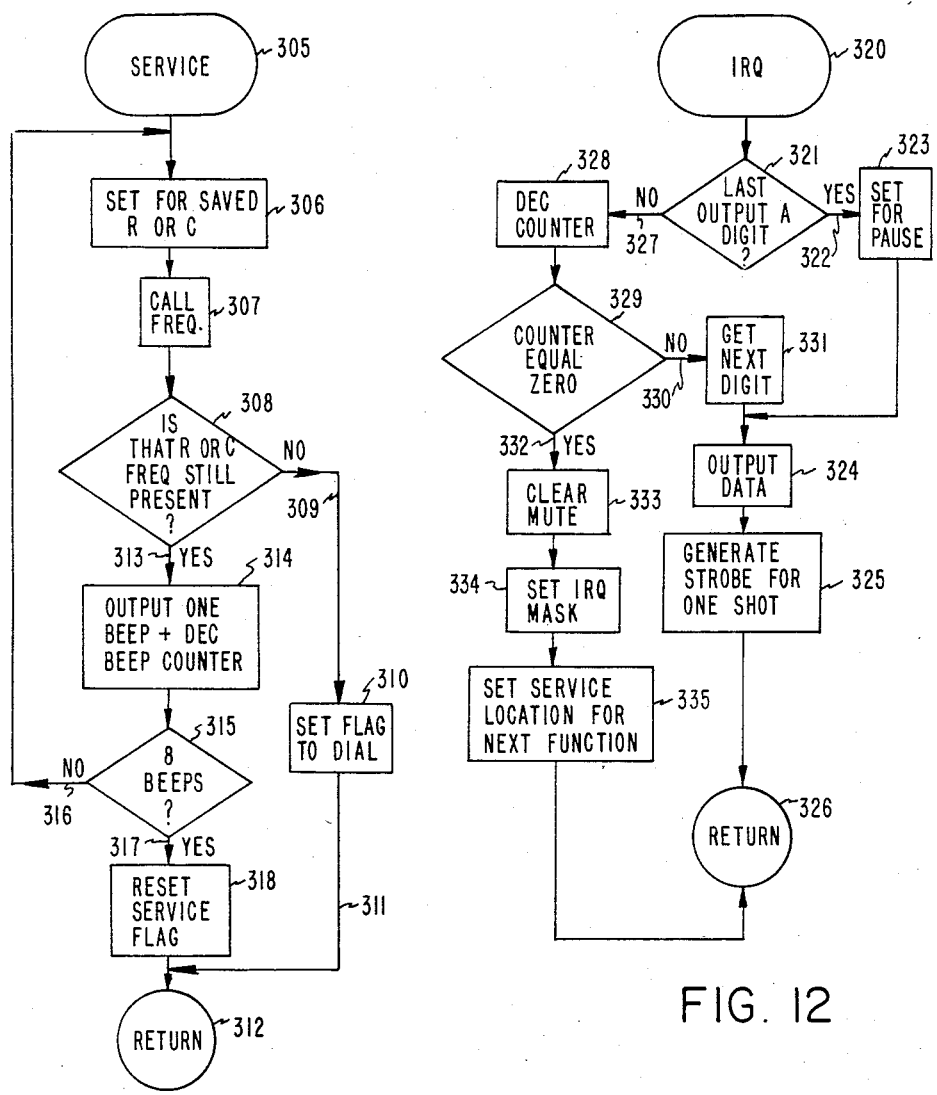
FIG. 11 is a functional flow diagram illustrating the details of an exemplary Service subroutine as called by the Prompt subroutine illustrated in FIG. 5.
FIG. 12 is a functional flow diagram illustrating the details of an exemplary IRQ, interrupt routine controlling selected outpulsing functions in the embodiment of the invention illustrated in FIG. 1.

Subsequent to a calling of the off hook test, as indicated by the rectangle 121, and a return therefrom in the manner which shall be described in connection with FIG. 4, the prompt subroutine is called in the manner indicated by the rectangle 122. The prompt subroutine, as will be described in greater detail in connection with FIG. 5, is employed to provide a series of beep tones to a user, if the user has effectively signalled the system for service, and such service request has been received. Thus, in essence, when the prompt subroutine is called, in the manner illustrated in FIG. 5, the status of the system is checked to ascertain if dialing is now taking place. Thereafter, the channel is checked to ascertain if the same is to be prompted. If prompting is required, a service routine as described in connection with FIG. 11, is initiated wherein prompting actually takes place whether or not a muting version of the system is being employed. If a particular channel is not to be prompted, the next channel is tested in sequence until all eight channels have been tested. Thereafter, the subroutine illustrated in FIG. 5 returns to the main routine.

When a return to the main routine occurs subsequent to a calling of the prompt routine indicated by the rectangle 122, the dial routine is called in the manner indicated by the rectangle 123. The dial routine will be described in greater detail in connection with FIG. 6; however, it is here sufficient to appreciate that when the same is called, the routine initially tests to determine if the automatic calling system, according to the instant invention, is presently outpulsing a telephone number or billing code information on any channel. If this is not occurring, each channel is checked in turn to ascertain if dialing of either telephone number or billing code information is required. Should such outpulsing be required, an outpulsing sequence is initiated, while if no dialing is required, the next channel is checked in turn until all channels have been checked for a requirement for outpulsing. Subsequent to the initiation of an outpulsing sequence, or alternatively, after all channels have been checked to ascertain that no outpulsing is required, the main routine is returned to in the manner indicated in FIG. 3.

Upon return from the dial routine indicated by the rectangle 123, the main routine then acts in the manner indicated by the rectangle 124 to call test 400 Hz. This subroutine, as described in greater detail in connection with FIG. 7, acts, in essence, to ascertain if a 400 Hz response tone, or any other response tone which has been specified in programming the device, should be received on any channel which has been serviced to a point where telephone number information for contacting a subscribing system has been outpulsed. If the servicing which has transpired on a particular channel has progressed to a point where the system should be looking for a response tone, the subroutine acts to ascertain if the same is present. If no response tone is required for the channel being checked, the next channel is checked in sequence and this is continued until all eight channels have been checked.

Thereafter, a return to the main loop or calling routine is coducted whereupon the program tests, in the manner indicated by the diamond 125 to ascertain whether or not the program flag is set. The program flag is set, as will be appreciated, whenever the program switch 94, as illustrated in FIG. 1, is depressed to indicate the initiation of a program mode of operation. If the program has been set in the manner indicated by the arrow 126 annotated Yes, the main routine acts to call the program subroutine in the manner indicated by the rectangle 127. The program routine is described in much greater detail in connection with FIG. 8 and thus, it is here sufficient to appreciate that in essence, the system awaits the receipt of predetermined information on any active channel in the format required for programming telephone number, response tone and billing code information therein in a maner which was described above. If the same is received, the same is appropriately stored for future accessing and the like.

If the program flag is not set, in the manner indicated by the arrow 128 annotated No, a return to the initial portions of the main routine occurs where the main routine acts as an executive to again call each of the principal subroutines of the instant invention in turn so that each channel again is monitored to ascertain if any particular form of service is required. If such service is required, be it by way of outpulsing, monitoring or the like, the same is provided under program control.

Accordingly, it will be appreciated by those of ordinary skill in the art, that the main program routine illustrated in FIG. 3 acts as a system executive routine to cause the automatic calling system to call each of a plurality of principal subroutines in turn, and each subroutine acts, in essence, to monitor each of the eight channels to determine their condition thereof, and if the same is active, to determine if servicing is required. If service is required, the designated service associated with that subroutine is rendered; while if no servicing is required, the subroutine returns the system to the appropriate location in the main routine or system executive so that the next subroutine may be called in sequence. Thus, it will be appreciated by those of ordinary skill in the art that the main program routine for the system, as illustrated in FIG. 3, causes the automatic calling system, according to the present invention, to call each of the principal service routines in turn and loops back upon itself so that this action is continued unless a programming operation is called for. Under these circumstances, branching to a program subroutine is initiated. The details of the principal subroutines called, as well as the subsidiary subroutines which are relied upon therein, will be better appreciated in conjunction with the particular flow chart in which the same is set forth.

OFF HOOK TEST

Referring now to FIG. 4, there is shown a functional flow diagram illustrating the details of an exemplary off hook test subroutine called by the main program routine illustrated in FIG. 3. The off hook subroutine, as initially called by the main program routine, acts to look at the service location associated with each channel and if the same is positive, indicating that the eight second window in which a service request must be received has not yet timed out, checks the channel to ascertain if the same requires service. If service is required, this action is initiated, while if service is not required, the remaining ones of the eight channels are checked in a similar manner prior to a return to the main or calling routine.

More particularly, the off hook subroutine, as indicated by the oval flag 130, initially acts, as indicated by the rectangle 131, to set the pointer register employed to maintain the location of this routine to channel 8 which, in actuality, initiates the writing of a seven therein as the program deals with channels 0 through 7, rather than 1 through 8. Once the beginning location of the program has been established by the step indicated by the rectangle 131, the program then checks in the manner indicated by the diamond 132 to ascertain whether or not the particular channel at which the pointer location for the routine is located, is in an on hook condition. This is done by calling a minor subroutine, called cradle, which has not been illustrated herein. Essentially, the cradle routine acts when called to monitor the off hook multiplexer means 10 for the channel being pointed to by the pointer register to ascertain whether or not the same is in an off hook condition. If an on hook condition is indicated, the service location is set to a count of 127, while if an off hook condition obtains, the Z bit is set to 0 in the condition code register. Thus, in the test associated with the diamond 132, the condition of the Z bit in the condition code register is monitored. If the Z bit in the condition register is set to 1, the result of the test indicated by the diamond 132 is affirmative, and therefore, as indicated by the arrow 133 annotated Yes, the pointer or channel register is decremented by one count in the manner indicated by the rectangle 134 and thereafter the subroutine tests in the manner indicated by the diamond 135 to ascertain if all eight channels have been tested for an off hook condition.

The test indicated by the diamond 135 is accomplished by testing the state of the pointer to ascertain whether the same is negative. If a negative value is set in the pointer register, the program is assured that the off hook subroutine has been run for each of the eight channels in the system. Therefore, as indicated by the arrow 136 annotated Yes, a return to the main or calling routine in the manner indicated by the circular flag 137 obtains. However, if the test indicated by the diamond 135 is not indicative that all eight channels have been completed, in the manner indicated by the arrow 138 annotated No, the program loops back upon itself in the manner indicated by the arrow 138 to an initial portion thereof wherein each of the tests noted above may again be performed for the remaining ones of the channels involved.

If the test indicated by the diamond 132 is negative indicating that the channel is off hook, the program next tests in the manner indicated by the diamond 140 to ascertain whether or not the channel is active. An inactive channel, as aforesaid, is a channel wherein the count of 127, as initially set in the service location therefor, has been decremented to zero or to a negative value. Thus, should the channel be inactive, it will be appreciated by those or ordinary skill in the art that the eight second window in which an operator may request service, has expired so that the system may assume that an ordinary telephone call has been made on this channel. Therefore, as indicated by the arrow 141 annotated No, the system again acts to decrement the channel register or pointer in the manner indicated by the rectangle 134, determines if all channels have been tested in the manner indicated by the diamond 135, and thereafter returns to the initial portion of the routine for testing of further channels. If all channels have been completed, as indicated by the arrow 136 annotated Yes, a return to the calling routine or main routine occurs in the manner indicated by the circular flag 137.

If the channel being tested is active in the manner indicated by the arrow 142 annotated Yes, the row or column tone test is called in the manner indicated by the rectangle 143. The row or column test subroutine indicated as called by the rectangle 143 will be described in greater detail in connection with FIG. 9 below. Here, however, it is sufficient to appreciate that this subroutine in essence causes the processor means 20 to test the outputs of the DTMF filter means 14 and to determine the frequency of any outputs produced thereby so that, in fact, it is determined whether or not an appropriate row or column tone service request frequency has been determined at the set by the user. Thus, in the manner indicated by the diamond 144, the results of the row or column tone test called in accordance with the step indicated by the rectangle 143 are evaluated in the manner indicated by the diamond 144 to ascertain whether or not a tone corresponding to rows 2, 3 or 4 or columns 1, 2 or 3 has been entered at the keyboard. In this regard, it will be recalled that entry of a row 2, 3 or 4 tone designates that a first telephone number is to be outpulsed, together with the first, second or third billing code entered into the system; while column tones 1, 2 or 3 indicate that the second telephone number entered, together with billing codes 4, 5 or 6, respectively, are to be outpulsed. Row 1 tones are reserved within the exemplary embodiment for a programming mode of operation.

If the results of the test indicated by the diamond 144 is negative in the manner indicated by the arrow 145 annotated No, the count within the service location for the channel being tested is decremented in the manner indicated by the rectangle 146. Thereafter, the channel register is again decremented in the manner indicated by the rectangle 134 and tested to ascertain if all channels have been completed. If all channels have not been completed in the manner indicated by the arrow 138, a return to the initial portion of this subroutine occurs; while if the subroutine has completed testing all channels in the manner indicated by the arrow 136, a return to the calling routine occurs. This result obtains since, until the eight second window associated with the particular channel times out, the system cannot determine whether failure of the user to insert a row or column tone for purposes of requesting service is indicative that no service is being requested, as an ordinary telephone call is being made, or the user simply has had insufficient time to insert the requisite tone.

If the test associated with the diamond 144 is affirmative, as indicated by the arrow 147 annotated Yes, the program has determined that, in fact, a tone requesting a specified form of service has been ascertained. Under these circumstances, as indicated by the rectangle 148, the row or column frequency determined by the row or column test conducted, is saved and the channel is set in the manner indicated by the rectangle 149 to be serviced. This is done by writing a $F0 flag into the service location which initially held the 127 count, and this particular flag format is indicative that the service next required in the channel is that associated with the prompting routine. Similarly, a $E0 flag is indicative that the telephone number must be next outpulsed, a $C0 flag indicates that the system must next look for an appropriate response tone from the system, and a $80 flag is indicative that the system must next dial a particular billing code. At any rate, once the channel is set to be serviced in the manner indicated by the rectangle 149, the pointer is decremented in the manner indicated by the rectangle 134, and thereafter, the system next determines whether all channels have been completed and then either returns to the initial portion of this routine or to the calling routine.

Thus, it will be seen that the off hook subroutine acts to test each channel in sequence to ascertain whether or not the same is off hook, if it is active, and if an active status is ascertained, will call the row or column tone test routine to ascertain if a service request has been received. If no service request has been received, the service location is decremented, and thereafter, checking of additional channels or a return to the calling routine occurs to await retesting in a subsequent cycle through the off hook routine to ascertain whether or not a service request signal has been received. This will continue through subsequent calls to the off hook routine by the main routine until such time as either a service request has been received or the eight second window in which a service request must be made has timed out. If the presence of an appropriate row or column frequency requesting service has been ascertained, the channel is set to be serviced, and thereafter, processing within this routine continues.

THE PROMPT ROUTINE

Referring now to FIG. 5, there is shown a functional flow diagram illustrating the details of an exemplary prompt subroutine called by the main program routine illustrated in FIG. 3. The prompt routine illustrated in FIG. 5 is entered from the main routine after the off hook routine illustrated in FIG. 4 has been called and completed. The function of the prompt routine is to ascertain whether the automatic calling system, according to the instant invention, is now in an outpulsing mode, and if no outpulsing mode is established, to check each channel to ascertain if prompting by way of supplying eight beep tones to the operator is required. If the same is required, the routine branches to the service routine described in greater detail in connection with FIG. 11, which acts to cause actual outpulsing of eight beep tones. If the channel now being checked does not require prompting, the next succeeding channel is checked and this continues until all channels have been checked. Upon the completion of this routine, a return to the calling main routine is initiated.

The prompt routine, as indicated by the oval flag 150, initially acts, in the manner indicated by the diamond 151, to ascertain whether or not the system is now in an outpulsing mode. Since only a single DTMF generator 18 is present, prompting by such generator may not take place if the same is presently engaged in another task. It will be recalled that each time outpulsing for telephone number or billing code information is to be performed, a register is set with a number of digits for which outpulsing for that telephone number or billing code is to be required, and thereafter, this register is decremented each time a tone pair corresponding to a digit of the telephone number or billing code is outpulsed. Thus, the test indicated by the channel 151 merely involves testing the count condition in the register containing the number of digits to be outpulsed. If the same is in a fully decremented state, i.e., zero or negative, the system is assured that the DTMF generator means 18 is not occupied by an interrupt-driven outpulsing function and may be employed for purposes of prompting the user. However, if the results associated with the test indicated by the diamond 151 are affirmative in the manner indicated by the arrow 152 annotated Yes, a return to the calling routine occurs in the manner indicated by the oval flag 153 since outpulsing cannot now occur under any circumstances. In this regard, it should be noted that as any requirement for a prompting mode of operation in any channel is effectively latched due to the presence of the flag written into the service location for that channel, it is not especially important whether prompting takes place during an initial or succeeding pass through the prompt subroutine illustrated in FIG. 5, as the same is periodically called by the main routine.

If no dialing subroutine is now occurring in the manner indicated by the arrow 154 annotated No, the pointer for this subroutine is set to start at channel 8 in the manner indicated by the rectangle 155, and thereafter, processing within the prompt routine occurs. More particularly, as indicated by the diamond 156, the program initially checks, in the manner indicated by the diamond 156, to ascertain whether or not this channel is to be prompted. This is simply accomplished by checking the condition of any flag present in the service location for the channel being checked. If that flag is in a condition other than the $F0 state set by the step indicated by the rectangle 149 within the off hook subroutine illustrated in FIG. 4, no prompting will be required. However, if the $F0 flag is present, the channel being checked has been set to be serviced through the provision of eight beep tones to the operator to indicate an acknowledgement of the service request generated at the handset.

In this regard, it should further be noted that while the instant exemplary program provides an approach whereupon beep tone acknowledgement is provided to a user regardless of whether or not a muting version of this invention is being utilized, under the assumption that such acknowledgement is useful, should it be desired to avoid such acknowledgement, the provision of the muting circuit could be treated as an option wherein a flag other than $F0 could be written into the service location in the off hook mode. Under these circumstances, while the prompt routine would still be provided as a part of the program, the test indicated by the diamond 156 would never provide an affirmative result.

If the test indicated by the diamond 156 is affirmative, in the manner indicated by the arrow 157 annotated Yes, the subroutine illustrated in FIG. 5 branches to the service routine which is described in detail in connection with FIG. 11. Here it is sufficient to appreciate that when the subroutine is called, a series of eight beep tones are caused to be generated by the DTMF generator means 18. These beep tones comprise only a single frequency rather than a DTMF tone pair so that no loss of dial tone occurs upon their issuance.

If the test indicated by the diamond 156 is negative, in the manner indicated by the arrow 159 annotated No, it will be apparent that the service location has not been set to a value of $F0 so that prompting for the channel being tested is not required. Therefore, as indicated by the rectangle 160, the channel is decremented, and thereafter, the system tests, in the manner indicated by the diamond 161, as to whether or not all eight channels have been tested to ascertain if prompting is required. If a negative result is obtained in the manner indicated by the arrow 162 annotated No, a return to the test indicated by the diamond 156 occurs for testing of the channel now pointed to by the pointer register. Of course, if all of the channels being inspected within the purview of the prompt subroutine have been completed in the manner indicated by the arrow 163 annotated Yes, a return to the main routine in the manner indicated by the oval flag 164 occurs.

THE DIAL SUBROUTINE

Figure 6:
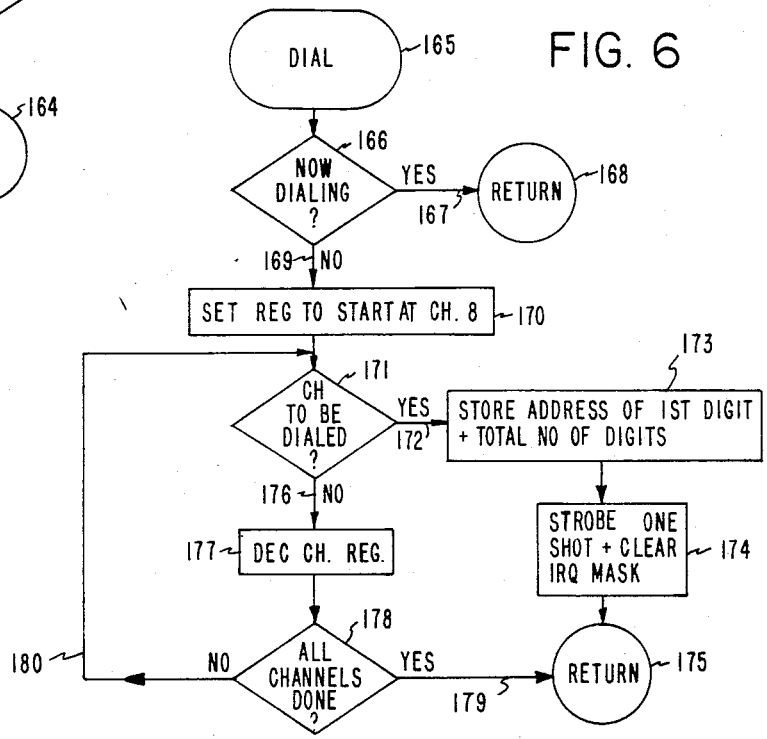
FIG. 6 is a functional flow diagram illustrating the details of an exemplary Dial subroutine called by the Main routine shown in FIG. 3.

Referring now to FIG. 6, there is shown a functional flow diagram illustrating the details of an exemplary dial subroutine called by the main routine shown in FIG. 3. The dial routine is called by the main routine illustrated in FIG. 3 after this routine is returned to upon the completion of the prompt subroutine or any subsidiary routines, such as service, which may have been called thereby. The dial routine, when called, acts in essence, to determine if the automatic calling system according to the instant invention is currently involved in an outpulsing operation occupying the DTMF generator means 18. If none is present, the system then checks each channel service location in sequence to ascertain whether or not a dial telephone number $E0 or billing code $80 flag has been written therein. If either flag is present, an outpulsing operation is required and is initiated by this routine. If no outpulsing operation is required, succeeding channels are checked and upon the completion of checking of all channels, a return to the calling routine is initiated.

The dial subroutine, as indicated by the oval flag 165, initially acts in the manner indicated by the diamond 166 to test whether or not the automatic calling system, according to the present invention, is currently involved in an outpulsing operation. This is done in precisely the same manner explained in connection with the same test indicated by the diamond 151 in FIG. 5 in that the value of the M register, containing the number of digits to be outpulsed, is tested to ascertain whether that state thereof is negative indicating that no digits remain to be outpulsed by the DTMF generator means 18. If a negative state is ascertained, the program is assured that the automatic calling system, according to the present invention, is not currently engaged in an outpulsing operation. However, if a zero or positive result is present in this register, as indicated by the arrow 167 annotated Yes, a return to the main routine occurs in the manner indicated by the circular flag 168. Again however, as the condition of any channel which requires dialing is effectively latched in its service location, appropriate servicing within the dial routine may properly occur in succeeding cycles through this subroutine as initiated by succeeding cycles through the main program routine illustrated in FIG. 3.

If the automatic calling system, according to the present system, is not currently engaged in an outpulsing operation, as indicated by the arrow 169 annotated No, the pointer is initially set to start at channel 8 in the manner indicated by the rectangle 170. Thereafter, this subroutine starts to process on a per channel basis in the manner previously described in association with the prompt and off hook subroutines. After the pointer register has been set to start at channel 8, the program initially tests in the manner indicated by the diamond 171 to determine whether or not the current channel being pointed to by the pointer register is to be dialed. This is done by checking the service location for that channel to ascertain whether a $E0 flag, corresponding to the dialing of a telephone number, or a $80 flag, corresponding to the dialing of a billing code, has been written therein. Under either condition, an outpulsing operation of appropriate information is required, and for any other condition, no servicing of that channel within the dialing routine need occur.

Thus, if either of the dial flags are present in the service location, in the manner indicated by the arrow 172 annotated Yes, the address of the first digit of the appropriate phone number or billing code is stored and the total number of digits within that telephone number or code is written into the M register in the manner indicated by the rectangle 173. This is achieved by initially inspecting the flag written into the service location to ascertain if a telephone number or billing code is specified. Once this information is determined, the row or column frequency saved during the course of the off hook test illustrated in FIG. 4, as indicated by the rectangle 148, is read to determine, in the case of a telephone number, whether telephone number 1 or 2 is to be outpulsed; or in the case of a billing code, whether billing codes 1-6 are to be outpulsed. Once the appropriate telephone number or billing code is thus ascertained, the address of the first digit for that code is read from memory together with the total number of digits present therein. The address is then stored, in the manner indicated by the rectangle 173, and the total number of digits to be outpulsed is loaded into the M register.

After the address of the first digit to be outpulsed has been stored, and the total number of digits to be outpulsed has been written into the M register in the manner indicated by the rectangle 173, the one shot 90, illustrated in FIG. 1, is strobed and the interrupt mask associated with the processor 20 is cleared. Upon the occurrence of the interrupt generated at the end of the duty cycle of the one shot 90, outpulsing will be initiated in accordance with the interrupt routine described in conjunction with FIG. 12. As the entire outpulsing of telephone phone number information or billing code information is controlled by the periodic generation of interrupts by the one shot 90, the program per se may now return to the calling routine in the manner indicated by the circular flag 175. Thus, as shall be seen in greater detail below, once the dial routine has ascertained that a dialing operation is required by a particular channel and has caused the address of the first digit, as well as the total number of digits to be stored, the mere clearing of the interrupt mask and strobing of the one shot 90 will result in the outpulsing operation being performed under hardware control so that the processor means 20 is not tied down awaiting the completion of an outpulsing operation. In this manner, the processor means 20 is freed to continue system servicing within the main routine, as well as within subroutines called thereby. However, service which involves functions of the DTMF generator means 18 may not be provided under software control as the same is fully occupied in the output function specified for a particular channel and relegated to the control of the interrupts generated by the one shot 90.

Should no outpulsing function be required for the channel then being tested, in the manner indicated by the arrow 176 annotated No, the channel pointer is decremented in the manner indicated by the rectangle 177. Thereafter, the system again tests in the manner indicated by the diamond 178 to ascertain if testing of all channels has been completed. If the results of the test indicated by the diamond 178 are affirmative, in the manner indicated by the arrow 179 annotated Yes, a return to the main routine occurs in the manner indicated by the circular flag 175. However, if the results of the test indicated by the diamond 178 are indicative that a test of all channels has not been completed, the subroutine loops back in the manner indicated by the arrow 180 to check the service location of the next channel in sequence. Thus, in this manner, the dial routine illustrated in FIG. 6 initially acts to ascertain if the DTMF generator means 18 is presently occupied in a dialing operation. If the same is occupied, a return to the calling routine occurs as the need for a dialing operation is latched and can be handled in subsequent loops through the main program routine which result in branching to the dial subroutine illustrated in FIG. 6. If no outpulsing operation is presently in progress, the subroutine again starts at channel 8 and acts to check the service location to ascertain if any dialing or outpulsing operation is required. If such an outpulsing operation is required for the channel, the interrupt mask is removed, the total number of digits to be outpulsed together with the address of the first digit, is stored, and the one shot 90 is strobed so that outpulsing is completed upon an interrupt basis controlled by the duty cycle of the one shot 90. When no dialing or outpulsing function for a particular channel is required, each succeeding channel is checked and after all channels have been checked and/or serviced, a return to the calling routine is initiated.

TEST ACKNOWLEDGEMENT TONE SUBROUTINE

Figure 7:
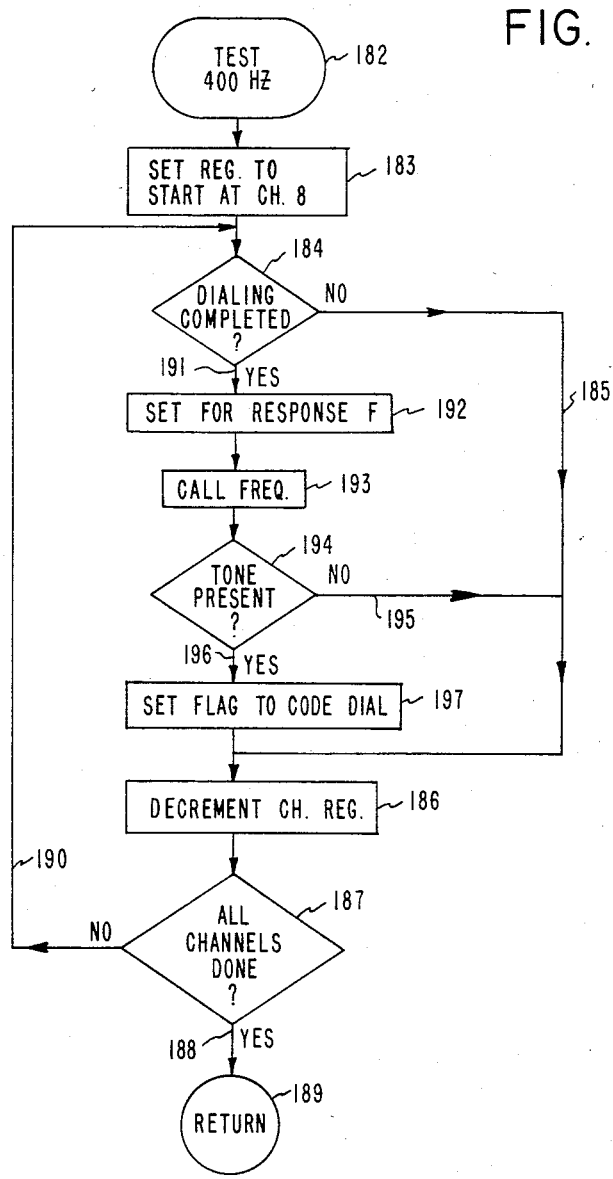
FIG. 7 is a functional flow diagram illustrating a portion of the operation of the embodiment of the invention illustrated in FIG. 1, under program control, showing the details on an exemplary Test 400 Hz subroutine as called by the Main routine illustrated in FIG. 3.

Referring now to FIG. 7, there is a shown a functional flow diagram illustrating a portion of the operation of the embodiment of the invention illustrated in FIG. 1 under program control, showing the details of an exemplary test 400 Hz or acknowledgement tone subroutine. The test 400 Hz subroutine illustrated in FIG. 7 is called by the main routine illustrated in FIG. 3 after the dial subroutine has been executed and a return to the main routine has occurred. The purpose of the test 400 Hz subroutine is to ascertain whether or not the acknowledgement tone which is generated by the computer, at a dialed subscriber service location is present, so that outpulsing of appropriate billing code information may begin. While this subroutine has been arbitrarily entitled test 400 Hz, it should be recalled that the instant automatic calling system will have programmed with the telephone number a precise response or acknowledgement code to be detected which may vary from 360 Hz to 500 Hz in 20 Hz increments. Thus, it is this precise response frequency which the test 400 Hz subroutine seeks out upon the active channel which has already been serviced to the extent of having a defined telephone number outpulsed thereon. When the appropriate response tone has been detected by this subroutine, outpulsing of billing code information is appropriate. It should also be noted that this subroutine is of relatively high priority, and hence, if it is assumed that the same is applicable to a particular channel being serviced, the same is not held in abeyance pending the completion of other functions. This can be readily implemented since the automatic calling system according to the present invention is configured so that a listening for an event on a particular activated channel may occur while other functions are being performed by the system.

When the test 400 Hz subroutine, as indicated by the oval flag 182 is entered, it initially acts, in the manner indicated by the rectangle 183, to set the pointer register to start at channel 8 in the manner employed in previously described subroutines so that processing within this subroutine is initiated at the highest numbered channel. After the pointer register is set to begin at channel 8, the program initially tests, in the manner indicated by the diamond 184, to determine whether or not a dialing function for this channel has been completed. This may be most readily accomplished by again looking at the service location for that channel to determine if a $C0 flag is written therein indicating that the call 400 test program is the next channel function to be performed and that the outpulsing of telephone number information has been completed.

If the results of the dialing completed test indicated by the diamond 184 are negative, in the manner indicated by the arrow 185 annotated No, the program next proceeds to decrement the pointer register in the manner indicated by the rectangle 186 and thereafter to test in the manner indicated by the diamond 187 whether processing for all channels has been completed. This is accomplished by testing the condition of the pointer register to see if the same is set at zero. If a zero result is obtained in the manner indicated by the arrow 188 annotated Yes, a return to the main or calling routine occurs in the manner indicated by the circular flag 189. However, if testing of all channels has not been completed, as indicated by the arrow 190 annotated No, a return to the beginning portions of the subroutine occurs so that the dialing completed test indicated by the diamond 184 may be initiated for the next succeeding channel.

If the test associated with the diamond 184, for purposes of determining whether dialing has been completed, is affirmative, in the manner indicated by the arrow 191 annotated Yes, the frequency of the specified acknowledgement tone is set in the manner indicated by the rectangle 192. More particularly, it will be recalled that in the programming of the instant invention, a response tone of from 360 to 500 Hz was specified in 20 Hz increments with each phone number entered. Therefore, as the system has already determined the telephone number to be outpulsed and has, in fact, completed the outpulsing thereof, the response tone associated with this telephone number is merely read and set in a register for use by the frequency subroutine which, as shall be seen below, effectively acts to ascertain the precise frequency of any tone received on the telephone line connected to a channel being monitored.

Once the desired response frequency is set, the frequency subroutine is called in the manner indicated by the rectangle 193. The frequency subroutine will be discussed in detail in connection with FIG. 10; however, it is here sufficient to appreciate that when called, the frequency subroutine acts to determine what frequency is present on the telephone line and to compare the same with the frequency response set in association with the step indicated by the rectangle 192. Thereafter, the Z bit within the condition register is set to either a zero or one, depending upon whether or not the frequency ascertained on the channel being monitored corresponds to that set in response to the step indicated by the rectangle 192.

After the frequency subroutine has been called, in the manner indicated by the rectangle 193, the program next acts in the manner indicated by the diamond 194 to ascertain whether or not the desired acknowledgement tone is present. This may be done, as will now be apparent to those of ordinary skill in the art, by merely testing the condition of the Z bit in the condition register, and more particularly, whether the same is set to a one or a zero. If a negative result obtains in the manner indicated by the arrow 195 annotated No, the program proceeds, in the manner indicated by the rectangle 186 and the diamond 187, to again decrement the channel pointer and test to determine if all of the channels present have been completed. If a positive result obtains, a return to the main routine occurs in the manner indicated by the circular flag 189; however, if all the channels have not been completed, a return to the initial portions of this subroutine occurs in the manner indicated by the arrow 190 annotated No.

If the desired tonal response is present in the manner indicated by the arrow 196 annotated Yes, the flag in the service location for that channel is set to code dial in the manner indicated by the rectangle 197. This is simply done, as now will be appreciated by those of ordinary skill in the art, by setting a $80 flag in the service register for this location so that the next time the dial routine is entered, a testing of the service location for this channel will result in an initiation of an outpulsing of a specified billing code for the telephone number already produced.

Once the dial code flag has been set, servicing of this channel within this subroutine has been completed. Therefore, the pointer register will be decremented in the manner indicated by the rectangle 186 and the system will again test to ascertain if servicing of all channels has been completed in the manner indicated by the diamond 187. Upon completion of servicing of all channels within this subroutine, a return to the main routine will be initiated in the manner indicated by the circular flag 189.

THE PROGRAM ROUTINE

Figure 8:
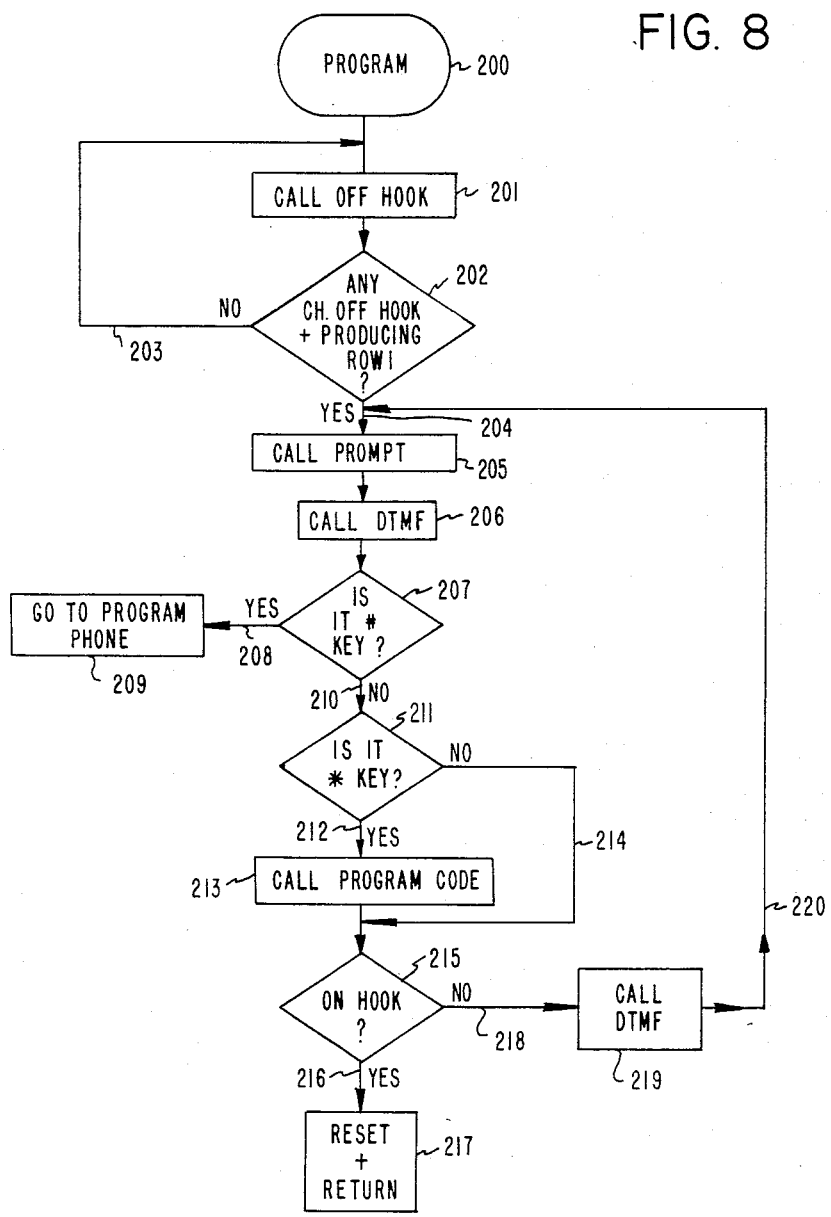
FIG. 8 is a functional flow diagram illustrating the details of an exemplary Program subroutine called by the Main subroutine in FIG. 3.

The program routine shown in FIG. 8 is entered after the main routine illustrated in FIG. 3 has ascertained that the program button 94 has been depressed, and hence, branching to the program routine in the manner indicated by the diamond 125 and the arrow 126 is appropriate. The program routine acts, in essence, to seek the presence of an active channel wherein a row 1 tone has been produced. Thereafter, it awaits receipt of a # key tone pair or an * key tone pair for purposes of calling an appropriate subroutine to cause programming of telephone number or billing code information. The program subroutine stays in this loop until an on hook signal is received to indicate an end of the programming mode of operation, whereupon resetting and a return to the main routine occurs.

When the program subroutine, indicated by the oval flag 200 is entered, the program initially acts to call the off hook routine, in the manner indicated by the rectangle 201. From a description of FIG. 4, it will be recalled that this subroutine acts to determine the presence of any channel which has gone off hook, received a row or column tone, and additionally acts to save the row or column tone ascertained. Thus, calling of the off hook subroutine in the manner indicated by the rectangle 201 will determine for the automatic calling system, according to the instant invention, each channel which has gone off hook, produced a row or column tone, and will store any row or column tone produced in register means associated with each channel for purposes of subsequent use.

Once the off hook subroutine has been called in the manner indicated by the rectangle 201, the program subroutine acts to test in the manner indicated by the diamond 202 whether any channel which has gone off hook has received a row 1 tone which, it will be recalled, corresponds to the first step of the programming sequence which must be initiated by supervisory personnel subsequent to a depression of the program key 94, and an activation of a particular channel upon which programming is to take place. Should the results of the test indicated by the diamond 202 be negative in the manner indicated by the arrow 203 annotated No, the program simply loops back to the initial portion of the program and effectively will sit in this loop until such time as an appropriate indication is received that a channel has gone off hook and has received a row 1 tone due to a simultaneous depression of two of the keys having the digits 1, 2 and 3 scribed thereon.

Once an affirmative result from the test indicated by the diamond 202 is received, in the manner indicated by the arrow 204 annotated Yes, the prompt subroutine described in connection with FIG. 5, is called in the manner indicated by the rectangle 205. This routine, it will be recalled, effectively acts in consort with the service routine to provide eight beep tones to a user to acknowledge that a service request has been received and is being responded to by the system. Here, the prompt subroutine acts in precisely the same manner but this time is acknowledging a recognition by the system that the initial handshaking steps associated with programming the automatic calling system, according to the instant invention, have been initiated.

Once prompting has been completed, the subroutine next acts in the manner indicated by the rectangle 206 to call the DTMF subroutine. This subroutine is described in greater detail in connection with FIG. 13; however, it is here sufficient to appreciate that the DTMF subroutine here acts to identify column and row tones inserted upon a depression of any of the twelve keys present on a conventional DTMF pad. This subroutine is periodically called within the instant program routine and subroutines called thereby so that digit information being entered by a programmer at the DTMF pad may be properly identified and stored as a 2/8 code so that not only is the actual telephone number and billing code information properly identified and stored, but in addition, the various predicate information entered in association with such information is also properly recognized and responded to. Thus, for instance, it will be recalled that in the programming mode, the operator after having hit the program button and gone off hook, must insert a row 1 key as part of the handshaking function, whereupon eight beep tones are returned. Thereafter, the programmer will hit the # sign key and, assuming two services are present, will enter a 1 or 2 key code to define which telephone number is being inserted. This is followed by an entry of a number between 1 and 8 to specify the frequency of the acknowledgement tone to be received. Then the appropriate first or second telephone number may be entered. Upon entry of both telephone numbers and their assigned response or acknowledgement tones if two are to be programmed, the operator will hit the key with the * thereon, followed by a 1-6 digit key to define a DTMF tone pair for designating which billing code is about to be inserted. This is followed by entry of the desired billing code. Thus, it will be apparent that significant amounts of DTMF information is entered at the DTMF pad of the activated telephone set and analyzed by the automatic calling system, according to the present invention.

After the DTMF subroutine is called in the manner indicated by the rectangle 206, the system next tests in the manner indicated by the diamond 207 to ascertain whether or not the key on the DTMF pad having a # sign thereon has been depressed. If this test is affirmative, in the manner indicated by the arrow 208 annotated Yes, the system, is advised that the programmer is about to specify which telephone number is to be entered, the response tone therefor which is to be received from an answering computer, and finally the telephone number per se. Thus, when an affirmative result is present, as indicated by the arrow 208, a branch operation to the program phone subroutine as indicated by the rectangle 209 is initiated. While the program phone subroutine will be described in substantial detail in connection with FIG. 15, it should here be appreciated that this subroutine acts, in essence, to receive the one or two DTMF digit code from the keyboard which defines the telephone number to be inserted, the digit information between 1 and 8 specifying the answerback or acknowledgement tone to be received, and the actual telephone number for each telephone number to be inserted, and causes the same to be properly stored for future accessing purposes.

If the test indicated by the diamond 207 results in a negative condition, as indicated by the arrow 210 annotated No, it will be apparent that telephone number information is not about to be entered. Therefore, the system acts in the manner indicated by the diamond 211 to test the results of the DTMF program called in association with the rectangle 206 to ascertain if the key having the * thereon has been depressed. If an affirmative result is obtained, in the manner indicated by the arrow 212 annotated Yes, it will be apparent that digit information defining the number of the billing code to be inserted, as well as the billing code per se, should next be entered by the operator at the DTMF pad. Therefore, under these conditions, a subroutine called program code will be called in the manner indicated by the rectangle 213. The program code subroutine will be described in greater detail in connection with FIG. 14. However, here it should be appreciated that the same acts to properly interpret and store input information entered from a DTMF pad for purposes of specifying which billing code is being inserted, as well as the billing code per se.

Should the results of the DTMF subroutine called in association with the step indicated by the rectangle 206 indicate that neither a DTMF pair corresponding to the # key, nor a DTMF pair corresponding to the * key, has been received, in the manner indicated by the arrow 214, the program next tests to ascertain whether or not the active channel identified has been placed on hook in the manner indicated by the diamond 215. This also results subsequent to a calling of the program code in the manner indicated by the rectangle 213. An on hook condition, it will be recalled, is determinative that the program subroutine which has been entered has been terminated, and hence, if the results of the test indicated by the diamond 215 are affirmative, in the manner indicated by the arrow 216, a resetting operation as aforesaid and a return to the main calling routine are initiated in the manner indicated by the rectangle 217. Conversely, if the test indicated by the diamond 215 is negative, it being noted that this test is performed by calling the cradle routine described aforesaid, the system remains in the program loop. Thus, as indicated by the arrow 218 annotated No, the DTMF subroutine is again called in the manner indicated by the rectangle 219 so that any additional DTMF information inserted at the DTMF pad may be analyzed. Thereafter, a return to the initial portion of the routine occurs so that the user may be prompted to insert the requisite information and the remaining steps of the routine are repeated. This looping within the lower portion of the program routine will continue until such time as an on hook condition is detected.

ROW OR COLUMN FREQUENCY TEST

Figure 9:
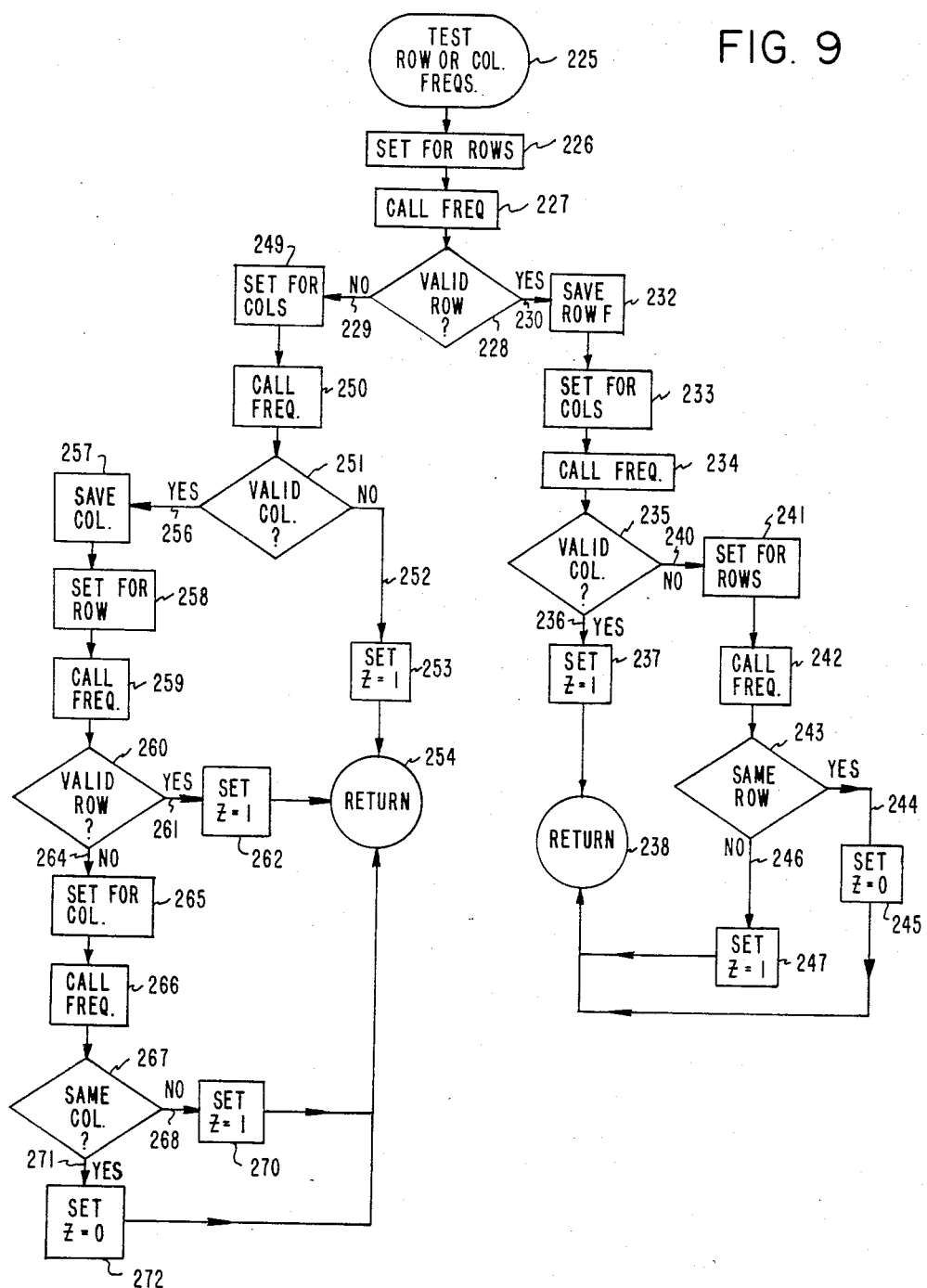
FIG. 9 is a functional flow diagram illustrating the details of an exemplary Test Row or Column Frequency subroutine called by the Off Hook subroutine illustrated in FIG. 4.

Referring now to FIG. 9, there is shown a functional flow diagram illustrating the details of an exemplary test row or column frequency subroutine which, it shall be recalled, is called by the off hook subroutine illustrated in FIG. 4 for purposes of determining whether or not a predetermined service request signal in the form of a tone corresponding one of rows 2–4 or one of columns 1–3 has been entered at an activated set for specifying outpulsing of one of two possible telephone numbers, as well as one of six attending billing codes.

Figure 10:
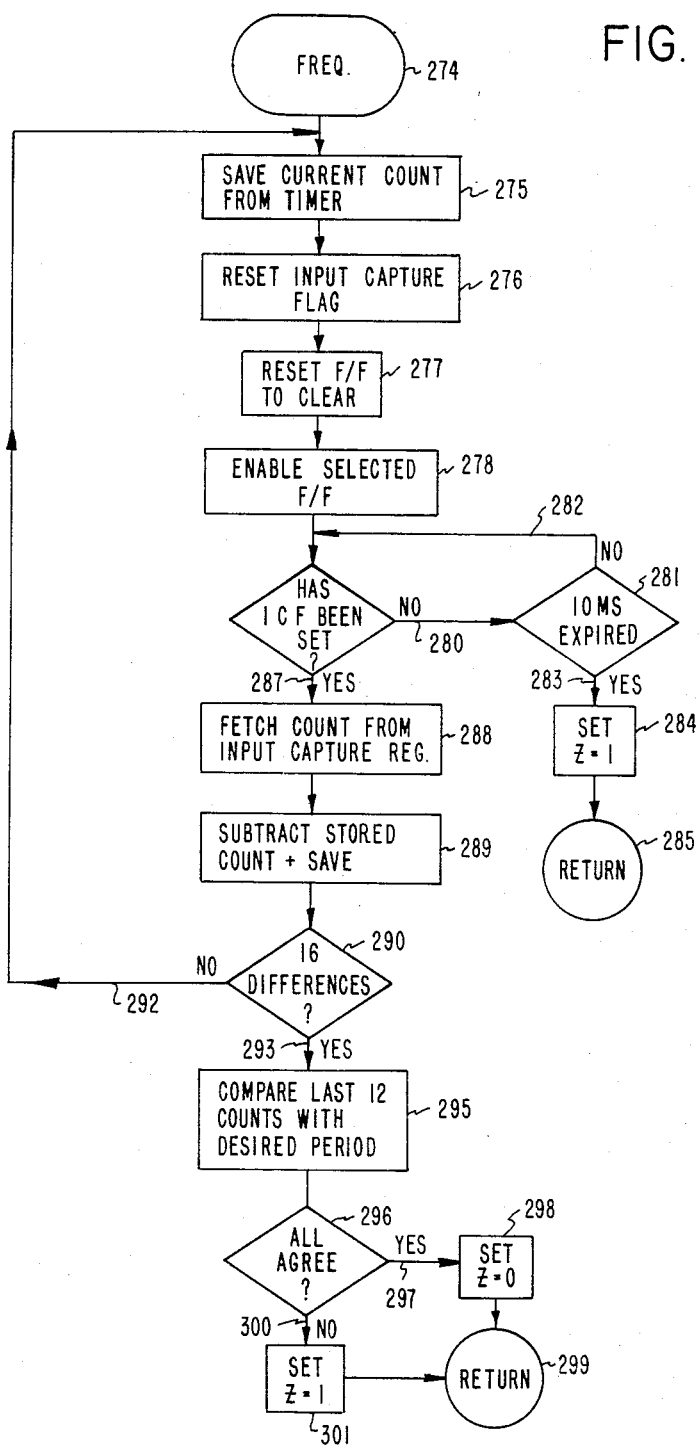
FIG. 10 is a functional flow diagram illustrating the details of an exemplary Frequency subroutine as called by many of the exemplary subroutines set forth herein for purposes of determining the period of signals being received.

The test row or column frequency subroutine, as indicated by the oval flag 225, is entered when the same is called by the off hook routine illustrated in FIG. 4. When called, the program initially acts in the manner indicated by the rectangle 226 to set up in memory the four frequencies associated with the four rows on a DTMF pad, i.e. a 697 Hz frequency, a 770 Hz frequency, a 852 Hz frequency, and a 941 Hz frequency, corresponding to rows 1–4, respectively. Once these frequency standards are established in memory, the frequency routine which is described in detail in connection with FIG. 10, is called in the manner indicated by the rectangle 227 to establish the actual frequency of any input tone which is being received. This is achieved, as now will be appreciated by those of ordinary skill in the art, by testing the row output of the DTMF filter means 14, as shown in FIG. 1, and calculating sixteen periods for any tonal response output on the conductor 55 as sampled at the output of NOR gate 65. The last twelve of the periods calculated are compared to ascertain if the same correspond, within plus or minus 32 microseconds for high frequencies, and plus or minus 64 microseconds for low frequencies, and if the last twelve periods calculated so correspond, they are compared to the four row frequencies stored in memory in association with the rectangle 226.

Once the frequency routine called ascertains the presence of a tone on the active channel, the program acts in the manner indicated by the diamond 228 to ascertain whether that tone corresponds to one of the frequencies for a row as stored in memory in the manner aforesaid. If no valid row is present in the manner indicated by the arrow 229 annotated No, the subroutine will seek to ascertain whether or not there is a tone present on the active channel which corresponds to a column. Conversely, if the test associated with the diamond 228 is indicative that a valid row tone is present as indicated by the arrow 230 annotated Yes, a test for a column tone is again initiated so that the system may determine whether the row tone present corresponds to a valid service signal, or in fact, it is one portion of a DTMF tone pair placed on the line by a user who is seeking to employ the telephone set connected to the active channel to make an ordinary telephone call where such user performs the outpulsing function.

More particularly, when the test associated with the diamond 228 is affirmative, in the manner indicated by the arrow 230 annotated Yes, the presence of a valid row tone has been confirmed. Accordingly, as indicated by the rectangle 232, the frequency of the row tone ascertained is saved in memory and the routine is then set for column determinations in the manner indicated by the rectangle 233 by either storing the four column tones corresponding to 1209 Hz, 1336 Hz, 1477 Hz and 1633 Hz in memory, or storing the addresses of memory locations where these frequently used frequencies are permanently stored. Thereafter, as indicated by the rectangle 234, the frequency routine is again called, this time for purposes of ascertaining frequencies present on the active channel as monitored at the output of the DTMF filter means 14 connected to the conductor 53, which, of course, corresponds to the high frequency portion of such filter means where the column frequencies would be found if the same are present.

Once the frequency subroutine had been called, the program next acts in the manner indicated by the diamond 235 to ascertain whether a valid column frequency has been detected by the frequency subroutine called in association with the rectangle 234. This is done, as will be appreciated by those of ordinary skill in the art, by comparing any frequency developed by the frequency routine with the specific frequency set for columns in association with the step indicated by the rectangle 233. If the presence of a valid column frequency is ascertained in the manner indicated by the arrow 236 annotated Yes, it is clear that both a row and column frequency are present on the active channel, and hence, the user is not signalling for service but instead has depressed digit keys on the DTMF pad at the activated set for purposes of making a normal telephone call or the like. Under these conditions, as indicated by the rectangle 237, the Z bit in the condition register is set to 1 to indicate that service is not required. Thereafter, a return to the calling routine which, in this case, would be the off hook subroutine, would occur in the manner indicated by the circular flag 238.

If a valid column signal is not present, as indicated by the arrow 240 annotated No, the system has confirmed that a valid row tone was present but that when a test for a column tone was subsequently performed, no column tone was present. This could mean that either the user had depressed a normal digit key at the DTMF pad for purposes of making a normal telephone call but had released such key prior to this subroutine's conducting a test for columns, or that a valid row signal has been entered for purposes of making a service request for the first telephone number and one of the three billing codes associated therewith. Under these latter conditions, the row tone will persist, while if the user had merely depressed a single key at the DTMF pad and released the same before the test for column frequencies had been conducted, the row tone originally detected by this subroutine will no longer be present. Thus, to determine which case is present, the subroutine acts in the manner indicated by the rectangle 241 to set the memory locations for rows in the precise manner described in association with the rectangle 226. Thereafter, the frequency routine is called in the manner indicated by the rectangle 242 so that any frequency response now being produced at the output of the DTMF filter means 14 on conductor 55 will again be determined.

After the frequency subroutine has been called, the program now tests in the manner indicated by the diamond 243 to ascertain whether or not the same row tone previously detected in the initial portion of this subroutine is still present. If an affirmative response is present in the manner indicated by the arrow 244 annotated Yes, it is clear that the persistent presence of the single row tone detected is a service request, and hence, the condition of the Z bit in the condition register is set to 0 in the manner indicated by the rectangle 245. Thereafter, a return to the calling routine occurs in the manner indicated by the circular flag 238. However, if the test for a corresponding row tone conducted as indicated by the diamond 243 yields a negative result as indicated by the arrow 246 annotated No, it is plain that a common row tone does not persist, and hence, no service request is being signalled. Therefore, under these circumstances, the Z bit in the condition register is set to 1 in the manner indicated by the rectangle 247 and a return to the calling routine occurs in the manner indicated by the circular flag 238.

If the test for a valid row tone in association with the diamond 228 was negative in the manner indicated by the arrow 229 annotated No, the program next tests to ascertain if a valid column frequency is being received. Thus, as indicated by the rectangle 249, a register is set for the four column tones in precisely the same manner explained in association with the rectangle 233, and thereafter, the frequency subroutine is called in the manner indicated by the rectangle 250. This will cause the output of the DTMF filter means 14 on the conductor 53, corresponding to the high frequency output to be monitored for purposes of ascertaining whether or not a valid column frequency is present in precisely the same manner described in association with the rectangle 234. Thereafter, the subroutine tests in the manner indicated by the diamond 251 to determine whether a valid column frequency is present by comparing the frequency ascertained by the frequency subroutine with the frequencies established for columns in association with the step indicated by the rectangle 249.

If no column tone is present in the manner indicated by the arrow 252 annotated No, the Z bit within the condition register is set to 1 in the manner indicated by the rectangle 253. Thereafter, a return to the calling routine occurs in the manner indicated by the circular flag 254.

If a valid column response is determined in the manner indicated by the arrow 256 annotated Yes, the column tone detected is saved by placing the same in memory in the manner indicated by the rectangle 257, and thereafter, testing for the presence of a row tone is initiated. This is done, as aforesaid, since while no row frequency was determined during the initial portion of this routine, subsequent detection of a column tone may indicate that a normal digit key on the DTMF pad was depressed. Due to the characteristics of certain of such DTMF pads in that the same do not simultaneously generate each of the tone pairs, it may be that while no row frequency was initially present, the subsequent column frequency detected was part of a DTMF tone pair so that the detected column tone will be followed by a row frequency as the tone pair was produced in an overlapping but not simultaneous relationship.

Thus, a register is set for the four row frequencies in the manner indicated by the rectangle 258 and the frequency subroutine illustrated in FIG. 10 is called in the manner indicated by the diamond 259. Once this has been done, the program then tests in the manner indicated by the diamond 260 to ascertain if a valid row tone is present. If an affirmative response is received in the manner indicated by the arrow 261 annotated Yes, it is clear that a normal key on the DTMF pad was, in fact, depressed and that no service signal is being generated. Accordingly, under these circumstances, the Z bit in the condition register is set to 1 in the manner indicated by the rectangle 262 and a return to the calling routine occurs in the manner indicated by the circular flag 254.

If no valid row tone is ascertained, in the manner indicated by the arrow 264 annotated No, the system next tests to ascertain whether the column tone detected still persists. Thus, as indicated by the rectangle 265, a register is set for the column tones which may be present, the frequency subroutine is called in the manner indicated by the rectangle 266, and thereafter, the recovered frequency, if any, is compared to the column tone saved in association with the step indicated by the rectangle 257 as indicated by the diamond 267.

If the same column tone is not present, in the manner indicated by the arrow 268 annotated No, the Z bit in the condition register is set to 1 in the manner indicated by the rectangle 270 and a return to the calling routine occurs in the manner indicated by the circular flag 254. However, if the test conducted in association with the diamond 267 is indicative that the same column persists, in the manner indicated by the arrow 271 annotated Yes, the Z bit in the condition register is set to 0 in the manner indicated by the rectangle 272. Thereafter, a return to the calling routine occurs in the manner indicated by the circular flag 254. Thus, whenever the test row or column frequency subroutine illustrated in FIG. 9 is called, the same will act to determine the presence of a service request signal in the form of a row tone corresponding to rows 2–4 or a column tone in the form of columns 1—3, and will set the Z bit in the condition register to 0 if the same is present. Conversely, the Z bit is set to 1 if a valid service request signal is not detected.

THE FREQUENCY SUBROUTINE

Referring now to FIG. 10, there is shown a functional flow diagram illustrating the details of an exemplary frequency subroutine, as called by many of the exemplary subroutines set forth herein, for purposes of determining the period of the signals being received. In essence, the frequency subroutine, when called, will act to determine the presence of a specific frequency and will return to the calling routine with the value of such frequency, as well as setting the condition of the Z bit to indicate that a valid frequency has been ascertained.

The frequency subroutine, as indicated by the oval flag 274, initially acts in the manner indicated by the rectangle 274 to save the current count from the timer in the processor means 20. More particularly, if as stated above, it is assumed that a Motorola MC6801 or MC68701 microcomputer is employed for purposes of the processor means 20, it will be recalled that the same includes a 16 bit free running counter in the form of a programmable timer. Additionally, the same includes a 16 bit read-only register employed to store the current value of the free running counter when an appropriate flag occurs as an input, and a 16 bit output compare register which may be employed to store the value of the free running counter at a particular time. Thus, through the use of the free running counter and the input capture and output compare registers that timing of the periods of input signals provided to the microprocessor 20 from the output of the NOR gate 65 are performed.

This period timing function employs a process wherein the state of the count of the free running counter in the microcomputer 20 is initially stored in the output compare register, one of the flip-flops 54, 56 or 71 is selectively enabled to cause the output of the NOR gate 65 to go low on a positive transition corresponding to the beginning or end of a single period of an input tone being monitored. The transition at the output of the NOR gate 65 is employed to generate an input capture flag which causes the current count of the free running counter to be loaded into the input capture register within the processor 20. Thereafter, the value of the period of the frequency being monitored is simply obtained by comparing the state of the count in the input capture register with the state of the count in the output compare register which corresponds to when the period began. Thus, the initial step of the frequency subroutine, as indicated by the rectangle 275, is to save the current count from the 16 bit counter in the microcomputer so that a value when timing began is available as a function of the step in the program indicated by the rectangle 275.

After saving the count from the timer in the manner indicated by the rectangle 275, the input capture flag is reset in the manner indicated by the rectangle 276 so that this flag may be set when the output of a monitored one of the flip-flops 54, 56 and 71 in FIG. 1 goes low to, in effect, cause the loading of the current count of the timer into the input compare register within the microcomputer 20. Once this has been done, the processor 20 is conditioned to monitor and time inputs on the conductor 66 corresponding to the output of the NOR gate 65 and hence, an enabled one of the flip-flops 54, 56 and 71 illustrated in FIG. 1.

To establish appropriate initial conditions, a clear level supplied to each of the flip-flops 54, 56 and 71 in the manner indicated by the rectangle 277. Then a selected one of these flip-flops is enabled in the manner indicated by the rectangle 278. Thus, if column tones are to be monitored, the flip-flop 54 is enabled, if row tones are to be monitored, the flip-flop 56 is enabled, while if response or acknowledgement tones are to be monitored, the flip-flop 71 is enabled. It will be recalled that, enabling as indicated by the rectangle 278, is a removal of the clear level on the conductors 61, 62 or 72 associated with the flip-flop whose output is to be monitored.

Once this has been done, the program merely sits and waits for the output of the NOR gate 65 as applied to the processor 20 on conductor 66, to go low and set the input capture flag (ICF) which causes the current count of the counter to be loaded into the input capture register. Thus, as indicated by the diamond 279, the program merely tests the condition of this flag, as reset in the step associated with the rectangle 276, to ascertain whether or not the same has been set in response to a low generated at the output of the NOR gate 65 corresponding to the flip-flop 54, 56 or 71 being monitored, being placed in a set condition.

If the input capture flag has not been set in the manner indicated by the arrow 280 annotated No, the subroutine will, in essence, sit in a loop until the flag is either set or a predetermined interval corresponding to 10 milliseconds has expired. The 10 millisecond interval is arbitrarily selected as a period which is sufficient to indicate that if nothing has happened within such period, no frequency of interest is present on the channel being monitored. Thus, when the input capture flag is not set, in the manner indicated by the arrow 280 annotated No, the subroutine acts in the manner indicated by the diamond 281 to test whether or not a 10 millisecond period has expired with respect to the current value of the timer saved in accordance with the step indicated by the rectangle 275. If a 10 millisecond interval has not yet expired, the program merely loops back, in the manner indicated by the arrow 282 annotated No, to again test whether the input capture flag is set, in the manner indicated by the diamond 279, and this continues until either the flag is set or a 10 millisecond interval has expired.

When a 10 millisecond interval has expired in the manner indicated by the arrow 283 annotated Yes, the Z bit within the condition register is set to 1, in the manner indicated by the rectangle 284, and thereafter, a return to the calling routine occurs in the manner indicated by the circular flag 285. Under these circumstances, it has been determined that no frequency which is of interest of any of the programs herein is present on the channel being monitored.

When the input capture flag is set, in the manner indicated by the arrow 287 annotated Yes, it will be appreciated that the current state of the timer will have been latched into the input capture register. Therefore, as indicated by the rectangle 288, this count is fetched and thereafter, in the manner indicated by the rectangle 289, is subtracted from the value of the timer which was saved in association with the step indicated by the rectangle 275. This results in a count corresponding to the period of the input frequency being monitored at the output of one of the flip-flops 54, 56 or 71. This count, as also indicated by the rectangle 289, is thus saved.

Thereafter, as indicated by the diamond 290, the program tests to ascertain if 16 counts representing periods as obtained through the step indicated by the rectangle 289, have been saved. If less than 16 differences have been saved, in the manner indicated by the arrow 292 annotated No, a return to the beginning portion of the program occurs so that additional period counts may be determined and stored. Once 16 difference counts have been calculated and stored, the program is in a position to determine the period of the input frequency being monitored.

This is done as indicated by the arrow 293 annotated Yes, by comparing the last 12 counts of the 16 difference counts stored with one another and with a desired period, in the manner indicated by the rectangle 295. The desired period or periods, for that matter, will be specified to the frequency subroutine by the calling routine in the manner previously discussed. For instance, in connection with the flow diagram for the test row and column frequency subroutine discussed in association with FIG. 9, it was pointed out how the program was initially set for the row or column frequencies being sought. In addition, the comparison is such that the last 12 period counts and the desired period count must compare with one another within plus or minus 32 microseconds for high frequencies, and within plus or minus 64 microseconds for low frequencies. Thus, row frequencies monitored at the output of the flip-flop 56, as well as response tone information monitored at the output of the flip-flop 71, must compare with one another and the desired frequency within 64 microseconds, while column tones monitored at the output of the flip-flop 54 must compare with one another and a desired column tone or tones within plus or minus 32 microseconds.

Once the comparison indicated by the rectangle 295 is performed, the program tests in the manner indicated by the diamond 296 to ascertain whether all of the counts agree. If all of the counts agree in the manner indicated by the arrow 297 annotated Yes, the Z bit within the condition register is set to 0 in the manner indicated by the rectangle 298. Thereafter, a return to the calling routine occurs in the manner indicated by the circular flag 299. However, if no comparison is obtained in the manner indicated by the arrow 300 annotated No, the Z bit in the condition register is set to 1 in the manner indicated by the rectangle 301 and a return to the calling routine occurs in the manner indicated by the circular flag 299.

Thus, it will be seen that whenever the frequency subroutine illustrated in FIG. 10 is called, the same will act to calculate 16 counts corresponding to the period of the input tones being monitored and the calling routine specifies the tone or tones being sought. At the completion of the routine, the Z bit in the condition register will be set to 0 if a valid tone of the frequency or frequencies specified has been found, while the Z bit is set to 1 if no valid comparison has occurred. The actual frequency found by this subroutine will have also been stored for purposes of comparison so that the same is otherwise available.

THE SERVICE ROUTINE

Referring now to FIG. 11, there is shown a functional flow diagram illustrating the details of an exemplary service routine. This routine, it will be recalled, is called by the prompt subroutine illustrated in FIG. 5, and actually acts to output eight beep frequencies or tones to the operator to acknowledge a service request or call for a programming function.

The service routine illustrated in FIG. 11, as indicated by the oval flag 305, initially acts to ascertain whether or not the original service request signal is still present. If the same is present, the outputting of individual beep tones is initiated until eight beeps are output, or alternatively, the service signal in the form of a predetermined row or column tone is terminated. Furthermore, it will be appreciated by those of ordinary skill in the art that in embodiments of the instant invention, employing the muting circuit illustrated in FIG. 2, the automatic calling system according to the instant invention, effectively acts through energization of the muting circuit to terminate the service requesting row or column signal, and hence, assuming a promptly acting detection of the service signal, no beeps will be output by the service routine.

When initially entered, the service routine illustrated in FIG. 11 first acts in the manner indicated by the rectangle 306 to set a register for the actuating row or column frequency previously determined as present and saved during the off hook routine in the manner indicated by the rectangle 148 illustrated in FIG. 4. Thereafter, as indicated by the rectangle 307, the frequency routine described in association with FIG. 10, is called to ascertain if that frequency is still present. Upon a completion of the frequency routine, the system then tests in the manner indicated by the diamond 308 to ascertain if the row or column frequency originally detected and saved is still present. This test, it will now be appreciated, is simply performed by checking the condition of the Z bit in the condition register as the frequency routine will set this bit to 0 if a frequency has been found corresponding to the frequency set in accordance with the rectangle 306, while a 1 condition will be present if that frequency is not present.

If the frequency routine called in association with the step indicated by the rectangle 307 has indicated that the service requesting row or column tone is no longer present, as indicated by the arrow 309 annotated No, it is clear that no prompting is required as the user has already released the pair of row or column keys depressed, or alternatively, the muting circuit illustrated in FIG. 2, has already acted to remove power from the DTMF pad. Therefore, under these conditions, the flag in the service location is set to dial, i.e. $E0. Thereafter, as indicated by the arrow 311, a return to the calling routine is initiated in the manner indicated by the circular flag 312.

If, however, the test indicated by the diamond 308 is affirmative, as indicated by the arrows 313 annotated Yes, operator prompting in the form of the outputting of beep tones is required until either eight beep tones are returned to the user or the DTMF keys are released by the operator or are otherwise cut off. Therefore, under these circumstances, the program acts in the manner indicated by the rectangle 314 to output one beep and decrement the beep counter. This action is performed, in a manner which now will be readily appreciated by those of ordinary skill in the art, by the placement of an appropriate level on one of the conductors 76–83 so that a single tone will be generated by the DTMF generator 18. A single tone, rather than a DTMF pair, will be employed as it is not desirable to output a DTMF tone pair on the active channel as the same would cause the loss of dual tone on the line and the prompting function here being performed is solely for use in advising the operator that his service request signal is acknowledged.

The beep counter is a software counter established as a part of this routine and the duration of the beeping interval may be controlled by the one shot 90 through strobing actions and interrupts generated thereby in precisely the same manner as was discussed for outpulsing functions, or alternatively, a different beeping interval may be selected and controlled under the auspices of a software timer. The beep counter is also decremented in the manner indicated by the rectangle 314, and thereafter, as indicated by the diamond 315, the state of the beep counter is checked to ascertain whether or not the same has been decremented to 0. The beep counter, it should be noted, will be set at an eight count level when this subroutine is called.

If the test indicated by the diamond 315 is negative, in the manner indicated by the arrow 316 annotated No, a return to the beginning portions of this subroutine occurs in the manner indicated so that beeps are output on a continued basis until either the operator releases the keys which have been simultaneously depressed to generate a service request row or column frequency, the service request is otherwise terminated or alternatively, eight beep frequencies have been output by the system.

As software timing for the beep mode of operation is here preferred, the timing the beeps is such that 75 milliseconds are preferably left as a silent interval between beeps, and the beeps may have a corresponding duration if desired. Furthermore, an interval of 50 milliseconds may be provided in association with the delay accorded the last beep output since unless the operator releases the pair of row or column keys depressed by this time, the system will reset the service location and afford no service as the user has exceeded the predetermined interval alloted for him to complete handshaking requirements for the system. At any rate, after eight beeps have been output by the system, as indicated by the arrow 317 annotated Yes, the service flag is reset in the manner indicated by the rectangle 318, and thereafter, a return to the calling routine occurs in the manner indicated by the circular flag 312.

Accordingly, it will be seen that the service flag acts to output beeps to an operator who has inserted a service request signal on an active channel to assure the operator that the system is properly responding. If a muting circuit is employed, a deadening of the receiver at the activated set will achieve the same function, and hence, typically no beep acknowledgement will be provided to the operator as indicated by the arrow 309. If no muting circuit is provided, beeps will be output until the operator has released the pair of row or column keys employed to request service. If release does not occur within the interval required to output eight beeps, the service flag for that channel will be reset. At the completion of the service routine, a return to the calling routine is initiated.

INTERRUPT SUBROUTINE

Referring now to FIG. 12, there is shown a functional flow diagram illustrating the details of an exemplary interrupt subroutine for controlling selected outpulsing functions in the automatic calling system according to the instant invention. The interrupt subroutine indicated by the oval flag 320, is responsive to interrupts generated by the one shot 90 to supply information in the form of a 2/8 code to the DTMF generator means 18 in FIG. 1, and to set the select outputs of the output multiplexer means 12 to cause DTMF tone pairs to be supplied to the telephone line connected to an active channel once an outpulsing mode has been determined. As the one shot 90 has a duty cycle of approximately 75 milliseconds, and the outpulsing function is normally achieved by interleaving pauses with tone pairs, it will be seen that normally the outpulsing function is interrupt-driven by the one shot flip-flop 90 and timed thereby so that tone pairs and pauses of equal duration are applied to an active channel. However, in the outpulsing of billing code information, three pauses are initially output in order to provide the answering computer with ample time to respond to the initial digit in the billing code which is output as a DTMF pair.

When the interrupt subroutine is initially entered in response to the generation of an interrupt by the one shot flip-flop 90 when the mask is cleared, the subroutine initially tests in the manner indicated by the diamond 321 to ascertain whether the last output of the subroutine was a digit. If a digit was last produced, the next code to be output will constitute a pause. Conversely, if the last output was not a digit, the current output produced is to be a digit in the form of a DTMF tone pair defined by a 2/8 code. Accordingly, if the test indicated by the diamond 321 is affirmative, in the manner indicated by the arrow 322 annotated Yes, it will be apparent that the next setting for the DTMF generator means 18 will be a pause. Therefore, as indicated by the rectangle 323, a register is set for a pause, i.e. zeros on all of the row and column inputs connected to conductors 76–83, and thereafter, this information is output to the DTMF generator means 18 in the manner indicated by the rectangle 324. Additionally, if the output multiplexer means 12 has not already had its select inputs set for the appropriate channel being serviced, this step would also here be performed. Therefore, as the processor means 20 has already completed its outputting requirements for this step of the outpulsing mode associated with the DTMF generator means 18, it merely acts, in the manner indicated by the rectangle 325, to apply a strobe pulse to the one shot 90 through the conductor 89 and may then return to the routine which was interrupted at the last completion of the duty cycle of the one shot 90. Thus, a return to an interrupted routine is indicated by the circular flag 326.

Should the test associated with the diamond 321 indicate that the last output was not a digit, in the manner indicated by the arrow 327 annotated No, this routine conversely will output a digit. The test associated with the diamond 321 is performed by monitoring a flag which is set each time digit information is output to the DTMF generator means 18 and reset each time pause information is supplied thereto.

Once it has been ascertained that the last output was not a digit, in the manner indicated by the arrow 327 annotated No, the program acts, in the manner indicated by the rectangle 328, to decrement the counter which is employed for purposes of maintaining the number of digits in the phone number or billing code which is to be output. This counter is maintained as the M register which was previously described.

After the M register is decremented in the manner indicated by the rectangle 328, the state of the count therein is tested, in the manner indicated by the diamond 329 to indicate whether or not the same is equal to 0. If the state of the digit counter is not equal to 0 in the manner indicated by the arrow 330 annotated No, the next digit is read from memory in the manner indicated by the rectangle 331. Thereafter, this 2/8 code is output on the row and column inputs to the DTMF generator means 18 in the manner indicated by the rectangle 324. A strobe is then generated for the one shot 90 in the manner indicated by the rectangle 325 and a return to the calling routine occurs in the manner indicated by the circular flag 326.

If the test indicated by the diamond 329 is affirmative in the manner indicated by the arrow 332 annotated Yes, it is apparent that the last digit in the sequence to be outpulsed has already been output by the DTMF generator means 18. Therefore, the muting condition is cleared in the manner indicated by the rectangle 333, and the interrupt mask is set in the manner indicated by the rectangle 334. The step of clearing the muting function, as indicated by the rectangle 333, is written into every program regardless of whether the muting option is present in a particular device as the presence of the particular option does not justify the provision of a separate program. If the option is not present, the multiplexer associated with muting will be absent, and hence, the release of the input thereto will merely be reflected as an action at an output terminal of the processor means 20. The step of resetting the interrupt mask, indicated by the rectangle 334, acts, as will be appreciated by those of ordinary skill in the art, to prevent further interrupts which might be generated by the output of the one shot 90 from interrupting the system until such time as an outpulsing function is again required. Once this has been done, as indicated by the rectangle 355, the service location for the active channel is set for its next function, and thereafter, a return to the interrupted routine takes place in the manner indicated by the circular flag 326. Thus, if the interrupt routine which has just occurred served to cause an outpulsing of a telephone number, the $E0 character written into the service location would be replaced by a $C0 character in the step associated with the rectangle 335 to indicate that the next function would be to seek a reply tone. Similarly, if the last character present in the service location was a $80 code, indicating that an outpulsing of a billing code had just occurred, a 000 character would be written into the service location to indicate that all service routines for that channel had been completed, and hence, the channel was inactive.

Thus, it will be seen that the manner in which the interrupt subroutine illustrated in FIG. 12 achieves its outpulsing function under the control of the one shot 90, and upon interrupt driven basis allows the processor means 20 to tend to other functions and merely turn its attention to an outpulsing mode of operation when an appropriate interrupt is generated.

THE DTMF SUBROUTINE

Figure 13:
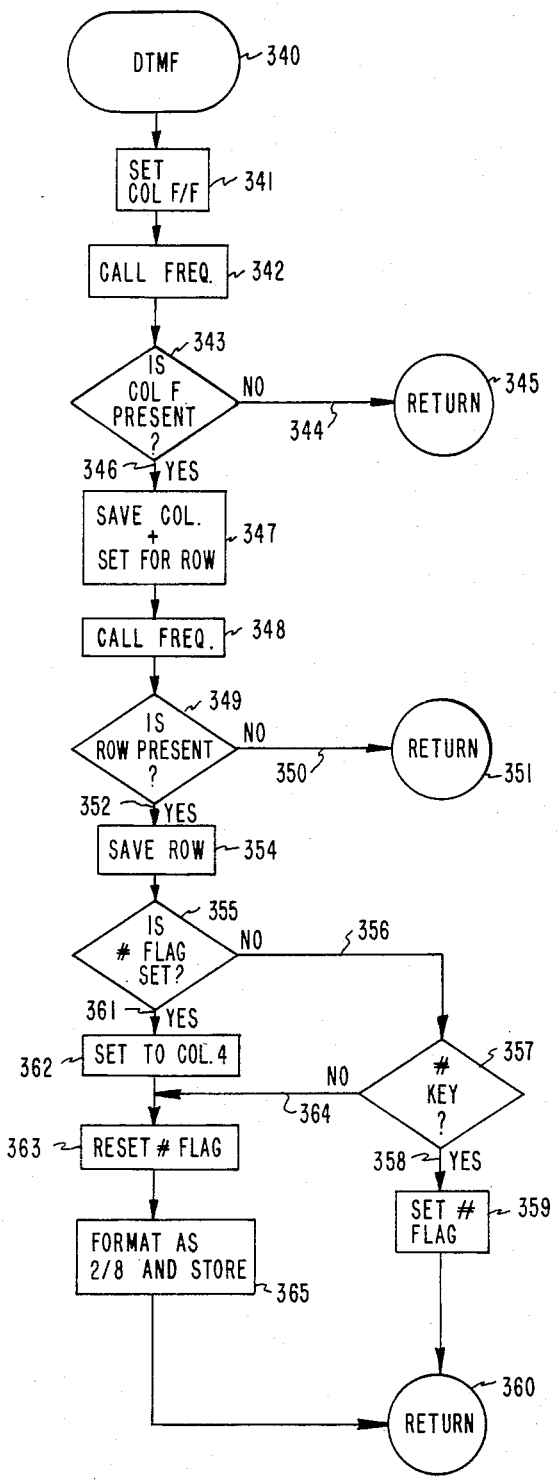
FIG. 13 is a functional flow diagram illustrating the details of an exemplary DTMF subroutine called by the Program subroutine illustrated in FIG. 8.

Referring now to FIG. 13 there is shown a functional flow diagram illustrating the details of an exemplary DTMF subroutine called by the program subroutine illustrated in FIG. 8. The purpose of the DTMF program is to listen to what is occurring on an active channel when a programming mode of operation has been designated, and to pick up the digit information in the form of DTMF tone pairs which are being entered by the programmer.

When called by the program routine illustrated in FIG. 8, the DTMF subroutine, as indicated by the oval flag 340, acts initially in the manner indicated by the rectangle 341 to set the column flip-flop to enable column tones. These column tones are provided at the output of the DTMF filter means 14 on conductor 53 and are monitored at the output of the flip-flop 54 applied to NOR gate 65. Additionally, the four frequencies of the four column tones which may be present are read from memory and loaded in registers so as to be available for comparison purposes in the frequency subroutine. Thereafter, as indicated by the rectangle 342, the frequency subroutine is called so that the presence of any column frequency on an active channel in which programming has been initiated can be ascertained. The result obtained from the frequency subroutine is then tested, as indicated by the diamond 343, to ascertain if a column frequency is present. This is done by testing the condition of the Z bit in the condition register, as set by the frequency subroutine, as aforesaid.

If no column frequency is present as will be indicated by the Z bit being set to 1, in the manner indicated by the arrow 344 annotated No, a return to the calling subroutine occurs in the manner indicated by the circular flag 345. This action results since the DTMF subroutine is looking for digit information defined by a row and column DTMF pair. Therefore, if no column frequency is present, it is clear that no DTMF tone pair which defines a digit by row and column frequency, is present on the active channel.

If a column frequency is present, as indicated by the arrow 346 annotated Yes, the column frequency is saved and thereafter the row flip-flop is set, together with registers defining the row frequencies in the manner indicated by the rectangle 347, so that a corresponding test to that just completed for column information may be initiated. Thereafter, as indicated by the rectangle 348, the frequency subroutine is again called to ascertain if any row is present. The condition of the Z bit in the condition register is then tested in the manner indicated by the diamond 349 to ascertain if an appropriate row tone was found by the frequency subroutine. If no row tone is present, in the manner indicated by the arrow 350 annotated No, a return to the calling routine occurs in the manner indicated by the circular flag 351.

However, if a row tone has been ascertained by the test indicated by the diamond 349, in the manner indicated by the arrow 352 annotated Yes, it is indicative that a DTMF tone pair corresponding to a 2/8 code has been received. Therefore, the row frequency ascertained is saved in the manner indicated by the rectangle 354.

Once it has been determined that a valid column and row frequency is present, the program next tests in the manner indicated by the diamond 355 to ascertain if the # flag has been set. This flag is set in a succeeding portion of this routine, in a manner which will be described below and is significant for several purposes. One such purpose is that entry of the # key DTMF code by a programmer during a programming operation is a predicate to the insertion of digit information defining which telephone number (one of two) is to be inserted, the response or acknowledgement code (one of eight) which is to be sought by the system by way of a response, as well as entry of the actual digits of the telephone number per se. Thus, if the program routine illustrated in FIG. 8 is reviewed, it will be seen that in the test associated with the diamond 207 the program seeks to ascertain if the # key has been depressed and it will now be clear that this may be done by detecting if the # flag was set by the DTMF routine which was previously called.

If the flag is set as indicated by the arrow 208 annotated Yes in FIG. 8, the program branches to the program phone routine. There, as shall be seen in connection with FIG. 15, the flag is reset and the remaining digit information detected and stored for future use. However, insertion of the DTMF tone pair associated with the # key serves a second purpose within the instant invention in that the same may be employed for purposes of encoding digits of a billing code to be stored.

More particularly, the DTMF routine allows billing code digits to be encoded if the same are preceded by a DTMF tone pair associated with the # key so that such codes are transformed into a code having the same row tone as the digit entered, but a column tone which corresponds to column 4. This is provided as an additional safety feature since most DTMF pads found on telephone sets are not equipped with a fourth column, but instead comprise either a 3 by 4 array or a 3 by 3 array additionally provided with the 0 key. Thus, when billing codes are encoded in the foregoing manner, users of the system in possession of the appropriate telephone number and billing code information cannot employ the system for their own purposes at a telephone outside of the employer's business centers since they cannot forward digits corresponding to the proper billing code unless a specialized telephone is obtained. Thus, the test associated with the diamond 355 is present so that the system may ascertain if the programmer is signalling that an encoding function for billing code entry is to be performed.

If the # flag is not set, in the manner indicated by the arrow 356 annotated No, the system next tests in the manner indicated by the diamond 357 to ascertain if the DTMF tone pair represented by the row and column frequencies saved in association with the steps indicated by the rectangles 347 and 354 corresponds to the DTMF tone pair of the # key. If the test indicated by the diamond 357 is affirmative, in the manner indicated by the arrow 358 annotated Yes, the # flag is set in the manner indicated by the rectangle 359, so that it may be subsequently employed to indicate entry of telephone number information or an encoding function. Thereafter, as indicated by the circular flag 360, a return to the calling routine takes place. Thus, it will be seen that if a detection of the insertion of the # key tone pair just described, resulted from a call for the DTMF subroutine by the program subroutine in the step associated with the rectangle 206, the # flag would be set and be available for the test indicated by the diamond 207, whereupon a branch to the program phone routine would immediately occur wherein the # flag here set would be immediately reset.

If it is now assumed, however, that the # key flag was previously set and detected by the test indicated by the diamond 355, an encoding function associated with the insertion of billing code digit information would be appropriate. Thus, as indicated by the arrow 361 annotated Yes, the value saved for the column tone previously detected would be reset to a column 4 frequency, corresponding to 1633 Hz, in the manner indicated by the rectangle 362. This would effectively encode whatever digit was inserted when the flag was set to a two of eight DTMF code which had the row frequency assigned to the digit detected, but a column frequency corresponding to column 4. Once this is done, the # flag would be reset in the manner indicated by the rectangle 363 and this portion of the loop is also reentered, in the manner indicated by the arrow 364 annotated No, whenever the test for the # key indicated by the diamond 357 is negative. Accordingly, once any encoding which may have been required due to a possible setting of the # flag is performed, the # flag is reset in the manner indicated by the rectangle 363. The resulting row and column information which is not stored, is formatted into a 2/8 code and stored in the manner indicated by the rectangle 365. Thereafter, a return to the calling routine occurs as indicated by the circular flag 360.

Thus, it will be seen that the DTMF subroutine illustrated in FIG. 13 acts when called to determine the nature of the DTMF tone information on an active channel and to cause the same to be formatted as a 2/8 code and stored. Furthermore, this subroutine will act, whenever the DTMF code associated with the # key is detected to cause a flag to be set. This flag may then be employed by the program routine illustrated in FIG. 8 to cause a branch operation to the program phone subroutine, or alternatively, when the same is intended to act as a predicate for an encoding of billing information, to cause the DTMF tone pairs associated with a following digit of a billing code to be transformed into a DTMF code bearing the row number of the digit entered and a column 4 tone.

THE PROGRAM CODE SUBROUTINE

Figure 14:
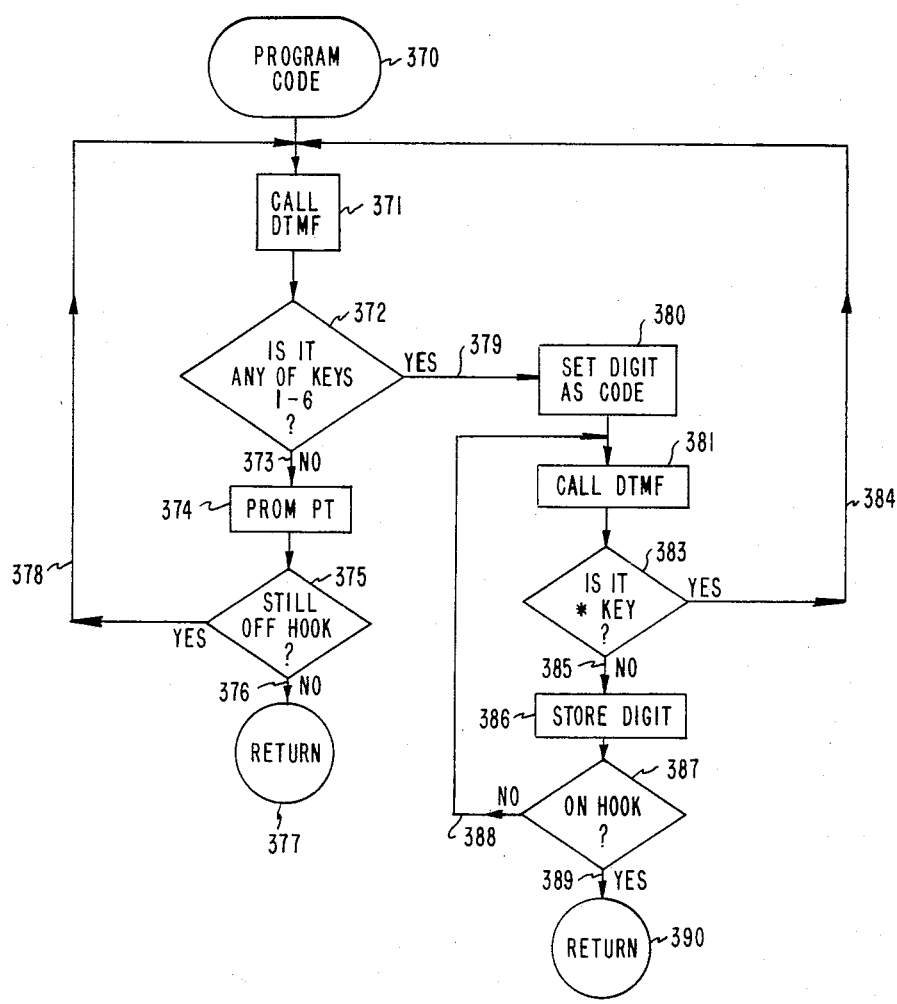
FIG. 14 is a functional flow diagram illustrating the details of an exemplary Program Code subroutine called by the Program subroutine illustrated in FIG. 8.

Referring now to FIG. 14, there is shown a functional flow diagram illustrating the details of an exemplary program code subroutine called by the program subroutine illustrated in FIG. 8 whenever user billing code information is being entered by a programmer. Billing code information is entered during a program mode of operation, it will be recalled, in a sequence wherein the programmer has previously inserted appropriate telephone number designating information, response tone information and the telephone numbers per se, and initiated the insertion of such telephone number information by depressing the # key at the DTMF pad. Thereafter, for purposes of entering billing code information per se, the programmer must depress the * key at the DTMF pad, a key between 1 and 6 to define which billing code is to be inserted, followed by the digits of the actual billing code. This sequence is continued until all billing codes which are desired to be programmed are entered. Additionally, it will now be apparent that any time the programmer is desirous of encoding a particular digit in a billing code, such encoding can be simply performed within the purview of the DTMF program by entering the DTMF code associated with the # key prior to the digit which is to be encoded, whereupon the code which will be stored for such digit will correspond to the row tone normally associated with that digit and a column 4 tone.

The program code routine illustrated in FIG. 14 is called by the program routine illustrated in FIG. 8 once this program has detected the presence of the DTMF code associated with the * key as indicated by the test associated with the diamond 211 in FIG. 8. The actual presence of the DTMF tone pair associated with a depression of the * key will have been determined by the DTMF program routine illustrated in FIG. 13 when the same was called by the program routine illustrated in FIG. 8 in association with the rectangle annotated 206.

When the program code subroutine, as indicated by the oval flag 370 is entered, it initially acts to call the DTMF subroutine illustrated in FIG. 13 in the manner indicated by the rectangle 371. It will be recalled that the program routine per se has already ascertained that the DTMF tone pair associated with the * key has been inserted, and hence, at this juncture the program code routine illustrated in FIG. 14 will be seeking the entry of a digit between 1 and 6 on the active channel to indicate which of six possible billing codes is to be entered, followed by the actual billing code per se.

Once the DTMF subroutine has been called in the manner indicated by the rectangle 371, the 2/8 code stored thereby will be tested in the manner indicated by the diamond 372 to ascertain whether or not the same corresponds to a DTMF digit code between 1 and 6 as the insertion of such a code to specify which billing code will subsequently be entered is a mandatory part of the programming operation following the entry of a DTMF code corresponding to a depression of the * key. If the entry ascertained by the test associated with the diamond 372 is negative in the manner indicated by the arrow 373 annotated No, branching to the prompt routine in the manner indicated by the rectangle 374 takes place to advise the programmer through a beep sequence that appropriate information must be entered at this time. Thereafter, the program tests in the manner indicated by the diamond 375 to ascertain whether or not the active channel for which a programming sequence has been initiated is still in an off hook condition. This is the only manner in which the program will allow itself to be taken out of this loop once a programming sequence has been initiated, and the * code, serving as a predicate for the insertion of billing code information, has been ascertained. Thus, if the active channel is no longer in an off hook condition, as indicated by the arrow 376 annotated No, a return to the calling routine will be initiated in the manner indicated by the circular flag 377. However, if the active channel on which programming has been initiated is still in an off hook condition, as indicated by the arrow 378 annotated Yes, a return to the initial portion of the program routine occurs. In this manner, testing of the active channel for the insertion of appropriate information continues until the same is inserted or the system is placed on hook.

When the test associated with the diamond 372 results in an indication that a digit between 1 and 6 has been inserted, in the manner indicated by the arrow 379 annotated Yes, it is apparent that an appropriate digit code defining the number or storage location of the billing code about to be inserted has been received. Therefore, as indicated by the rectangle 380, the digit received is set as a code to define the storage location for the billing code information about to be received as billing code 1, 2 or 3 associated with the first telephone number, or billing code 4, 5 or 6 associated with the second telephone number.

Once this has been done, the subroutine assumes that DTMF information corresponding to the digits of the defined billing code will next be inserted at the set of the active channel. Therefore, in the manner indicated by the rectangle 381, the DTMF subroutine will be again called so that each digit inserted may be converted into an appropriate 2/8 code and subsequently stored. As each digit received is encoded into a 2/8 code and stored by the DTMF subroutine called in association with the rectangle 381, the digit received is tested in the manner indicated by the diamond 383 to ascertain whether or not the same corresponds to the 2/8 code associated with the * key or, in fact, is another DTMF tone pair which may properly serve as a digit of the billing code to be stored.

If a 2/8 code associated with the * key is received, it will be appreciated that the programmer has previously completed the entry of whatever billing code was defined by the digit in the range of 1–6 found by the test associated with the diamond 372, and that entry of a new billing code sequence is being defined. Therefore, as indicated by the arrow 384 annotated Yes, a return to the initial portion of the program code subroutine is initiated so that a new digit between 1–6 may be ascertained for purposes of defining the next succeeding billing code to be entered.

However, if the results associated with the test indicated by the diamond 383 are negative, in the manner indicated by the arrow 385 annotated No, the program has confirmed that the 2/8 code ascertained by the DTMF subroutine called in association with the rectangle 381 is, in fact, a digit of a billing code presently being inserted. Therefore, this digit code is stored in the next available address for the billing code information previously defined in the manner indicated by the rectangle 386. Once the digit has been appropriately stored in the manner indicated by the rectangle 386, the program next tests in the manner indicated by the diamond 387 to ascertain if the channel has gone on hook. If the channel remains off hook, in the manner indicated by the arrow 388 annotated No, the program loops back in the manner indicated to the portion of the routine starting with the step indicated by the rectangle 381 so that succeeding digits in the billing code being inserted in the 1–6 location already defined occurs. In this manner, remaining ones of the digits may be classified and stored or a new entry of a billing code may be identified by the insertion and detection of an * code. However, if the system has gone on hook in the manner indicated by the arrow 389 annotated Yes, a return to the calling routine occurs in the manner indicated by the circular flag 390.

Accordingly, it will be appreciated by those of ordinary skill in the art that the program code subroutine illustrated in FIG. 14 is called by the programming routine illustrated in FIG. 8 as soon as it is ascertained that an * code identifying the subsequent entry of billing code information has been received. Once the program code subroutine is entered, it will await receipt of a digit between 1 and 6 to identify the appropriate order for the billing code about to be inserted and will stay in a loop awaiting the insertion of a DTMF code corresponding to a digit between 1 and 6 until the same is received or the channel becomes inactive. After, an appropriate digit between 1 and 6 is received, this digit is employed to define which billing code is to be inserted and thereafter succeeding entries of DTMF tone pairs are stored as digits of the billing code defined unless the same correspond to an * code. If an * code is received, branching to the beginning of the subroutine occurs so that a new sequence number for subsequent billing code information may be inserted, together with digit information corresponding to the billing code per se.

THE PROGRAM PHONE SUBROUTINE

Figure 15:
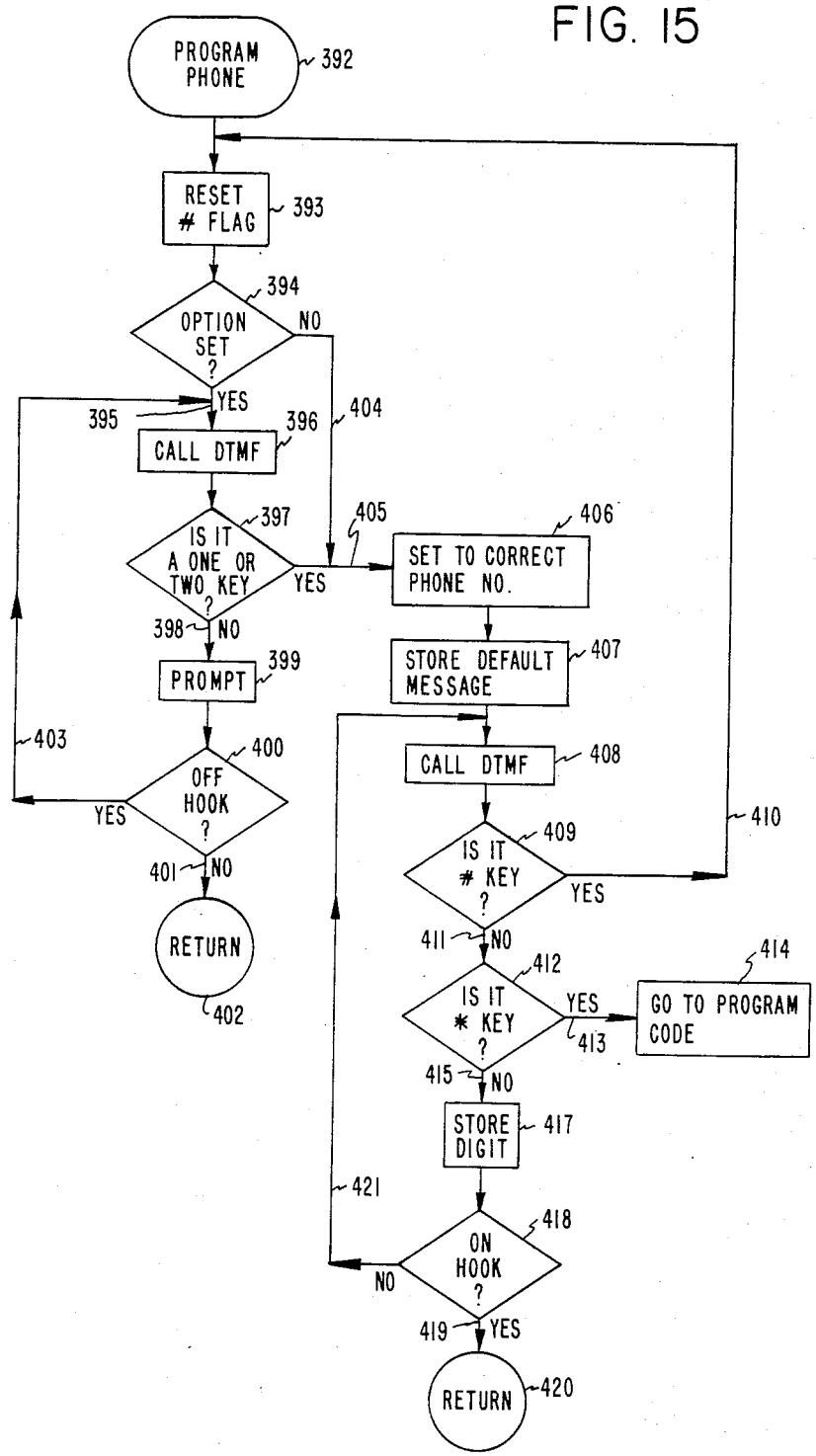
FIG. 15 is a functional flow diagram illustrating the details of an exemplary Program Phone subroutine called by the Program subroutine illustrated in FIG. 8.

Referring now to FIG. 15, there is shown a functional flow diagram illustrating the details of an exemplary program phone subroutine called by the program subroutine illustrated in FIG. 8. The program phone subroutine illustrated in FIG. 15 is called by the program subroutine after it has been determined, in the manner indicated by the diamond 207 in FIG. 8, that a DTMF code associated with the depression of the # key has been received and the # flag has been set by the DTMF routine. Accordingly, when entered, the program phone subroutine illustrated in FIG. 15 may anticipate the receipt of a 1 or 2 DTMF code to define which telephone number is about to be inserted, a DTMF code between 1 and 8 to define the response tone to be received from a computer at a site responding to an outpulsing of the telephone number defined, and the telephone number per se. Furthermore, receipt of a second # code is indicative that this same information will again be inserted for the remaining telephone number, while the receipt of an * code will be indicative that the programmer has completed entry of telephone number information and is about to begin the portion of the programming sequence in which billing code information is to be inserted.

When the program phone subroutine, indicated by the oval flag 392 is entered, it initially acts in the manner indicated by the rectangle 393 to reset the # code flag which was set, it will be recalled, during the DTMF subroutine. This is done, as will now be appreciated by those of ordinary skill in the art, as no specialized column encoding is desired when telephone number information is being programmed. Thereafter, as indicated by the diamond 394, the program tests to ascertain whether or not this particular embodiment of the automatic calling system is to receive and selectively outpulse more than one telephone number. The presence of the option is established, as will be recalled, through the contacts associated with the switch 97 in FIG. 1, it being appreciated by those of ordinary skill in the art that apparatus and appropriate software for accepting both telephone numbers is present in every automatic calling system, according to the instant invention. However, when the switch 97 illustrated in FIG. 1 is not closed, the program is set, in a manner to be described below, so that the same will not accept more than one telephone number.

Assuming the option is set in the manner indicated by the arrow 395 annotated Yes, the subroutine must now look for a one or two DTMF code to define which telephone number is about to be input. Therefore, as indicated by the rectangle 396, the DTMF subroutine is called so that a 2/8 code corresponding to the key information which has now been received on the active channel, may be obtained and stored.

Once the DTMF routine is called in the manner indictated by the rectangle 396, the program tests in the manner indicated by the diamond 397 to ascertain whether the DTMF tone pair for a 1 or 2 key has been received. If the DTMF tone pair for a 1 or 2 key has not been received, in the manner indicated by the arrow 398 annotated No, the prompt subroutine is called in the manner indicated by the rectangle 399 in order to provide beep tones to the programmer and apprise the programmer that appropriate handshaking information required by the system must be entered. After the prompt routine has been called in the manner indicated by the rectangle 399, the system tests in the manner indicated by the diamond 400 to ascertain whether or not the active channel in which a program routine has been initiated remains in an off hook condition. This will be done, as now will be appreciated by those of ordinary skill in the art, by calling the cradle routine described aforesaid.

If the active set has been placed on hook, as indicated by the arrow 401 annotated No, a return to the calling routine takes place in the manner indicated by the circular flag 402. However, if the telephone set has not been returned to an on hook condition, in the manner indicated by the arrow 403 annotated Yes, the subroutine loops back, as indicated, to a calling of the DTMF subroutine in the manner indicated by the rectangle 396 to await insertion of appropriate information defining which of two possible telephone numbers is about to be inserted. Thus, once the program mode of operation has been entered and a # key depressed to indicate that telephone number information is about to be programmed, if the option for the automatic calling system is set, the program will sit in a loop awaiting the appropriate entry of DTMF information corresponding to a depression of the 1 or 2 key. Absent such entry an exiting from this loop may only occur if the telephone set is again placed in an on hook condition.

If the option is not set in the manner indicated by the arrow 404 annotated No, or the presence of a DTMF tone pair corresponding to a 1 or a 2 has been ascertained in the manner indicated by the arrow 405 annotated Yes, the system is set to receive either the first or second telephone number to be entered as defined by the predicate condition ascertained. This is indicated by the step of the program indicated by the rectangle 406. It is implemented in software, in effect, by setting a pointer or an address sequence to define a series of storage locations for accepting the next digit which defines the response tone to which the system is to respond for this telephone number, as well as the various digits of the telephone number per se.

Once the storage location for the response code and the telephone information to be inserted is defined in the manner indicated by the rectangle 406, a default message is stored therein for purposes of clearing this location to thus remove any previously stored information and ensure an outputting of the default message should it be attempted to initiate a service routine without properly storing a response code and telephone number. As aforesaid, such default message may take the form of a series of beeps or a relatively short tonal response in the form of a song, such as "Mary Had a Little Lamb" or the like.

Once this has been done, the subroutine is ready to accept response code and telephone number information inserted at the set. Thus, under these circumstances, the subroutine acts in the manner indicated by the rectangle 408 to call the DTMF subroutine so that any digit key depressed at the active set will be properly encoded into a 2/8 code and stored in the manner described in association with the DTMF program. Once the DTMF subroutine has been called, the system next tests in the manner indicated by the diamond 409 to ascertain whether or not the two of eight code received corresponds to that associated with the # key. If an affirmative indication occurs, in the manner indicated by the arrow 410 annotated Yes, a return to the initial portion of the subroutine takes place as it is clear that entry of information pertaining to the previously defined telephone number has been completed, and the programmer is now seeking to enter a new telephone number into the system.

If the two of eight DTMF code ascertained by the DTMF subroutine is not the code associated with the # key, the program next tests in the manner indicated by the diamond 412 to ascertain whether or not the code received is that associated with the * key. When a code defining the * key is received, in the manner indicated by the arrow 413 annotated Yes, it will be plain that the programmer is attempting to enter billing code information, and hence, as indicated by the rectangle 414, a branch to the program code subroutine illustrated in FIG. 14 is initiated so that such billing code information may be processed in the manner therein described.

If the code received is neither the DTMF code associated with the # key, nor the DTMF code associated with the * key, as indicated by the arrow 415 annotated No, it may be assumed that the digit received is either an initial digit of the sequence defining the response code or a subsequently inserted digit which acts to define an appropriate digit of the telephone number to be dialed. Accordingly, as indicated by the rectangle 417, the two of eight digit code thus developed by the DTMF subroutine is stored in the storage locations defined for this set of telephone number information in the order in which the same is received.

After the two of eight code for the digit received is stored in the manner indicated by the rectangle 417, the program assumes that the remaining digits of telephone number information will be entered, or the completion of this sequence of entry in the program mode will be signalled by the insertion of a code defining the # key, a code defining the * key, or a hanging up of the telephone. Therefore, since codes associated with the # key and * key will be disposed of in succeeding loops through this routine by the tests indicated by the diamonds 409 and 412, the program next tests in the manner indicated by the diamond 418 to ascertain whether or not the telephone set at the active channel has been placed on hook. If an affirmative response is received in the manner indicated by the arrow 419 annotated Yes, a return to the calling routine occurs in the manner indicated by the circular flag 420. However, when the test associated with the diamond 418 is indicative that the channel remains active, in the manner indicated by the arrow 421 annotated No, a return to the portion of the subroutine wherein the DTMF subroutine is called in the manner indicated by the rectangle 408 occurs so that the receipt and processing of further entries from the DTMF pad may occur.

Thus, it will be seen that once the program mode has been appropriately entered by a depression of a program key and entry of a row 1 tone at an active set, the entry of the DTMF code associated with the # key will cause the program routine to branch to the program phone subroutine illustrated in FIG. 15. This subroutine acts initially to reset the # flag so that no column 4 encoding will take place, and thereafter, determines whether or not the system being programmed is a one or two number system. If a two number system is present, the program illustrated in FIG. 15 will await receipt of a DTMF code corresponding to a 1 or 2 key to define the location for the telephone number information to be inserted. Once this is received, an appropriate set of storage locations therefor will be defined and a default message will be stored in the location defined to cause a clearing thereof. Thereafter, both response code and telephone number digit codes inserted at the telephone set will be decoded and stored in the order received, for subsequent use during service modes. Upon receipt of a subsequent DTMF code associated with the # key, the program routine illustrated in FIG. 15 is reinitiated so that telephone number information associated with a second telephone number may be programmed. Conversely, upon the detection of the entry of a DTMF tone pair corresponding to the * key, a branch to the program code subroutine illustrated in FIG. 14 will occur so that billing code information may be appropriately received and stored.

CONCLUSION

The embodiments of the automatic calling systems set forth herein greatly facilitate the use of subscriber leased line systems, or the like, which are operated through a switched line telephone network, and hence, require that initial contact by a user be initiated by a telephone call made to a designated location, and thereafter, the user identify itself by way of an application of an approved billing code. In fact, other than having a requirement that the user initiate a service routine which causes an automatic outpulsing of a selected telephone number, response tone information, and automatically outpulses a selected, approved billing code for the subscriber service dialed; the user need do little more than perform a dialing operation associated with contacting a selected remote location in the same manner as is done in placing a call using conventional telephone company services. Furthermore, the embodiments of the automatic calling system set forth herein are highly flexible in that they permit a subscriber adopting such systems to subscribe to a plurality of subscriber leased line systems, or the like, and additionally define different billing codes for each telephone number outpulsed as well as for different users of such systems so that billing costs may be allocated, if desired, among different departments of a user's organization. The flexibility of the automatic calling systems, according to the instant invention, are also enhanced due to the fact that the same are programmable on-site without the use of any specialized equipment, and hence, both the telephone numbers which are automatically outpulsed, the acknowledgement tones to be received, and the billing codes automatically output, are readily changeable at the user's site to facilitate changes in subscriber services which may be periodically selected, as well as subsequent refinements in billing code allocations among departments, to accommodate traffic patterns which arise with subsequent use.

The automatic calling system, according to the instant invention, is also highly advantageous in that while the same is entirely processor controlled, outpulsing functions are implemented by hardware on an interrupt basis so that the processor is free to perform other functions on a time-shared basis. Additionally, the automatic calling system, according to the instant invention, displays improved off hook detection and billing code information outpulsing characteristics so as to render the same wholly compatible with varying forms of telephone equipment as may be found in different locations or as a normal function of varying telephone systems. Various requirements, encountered among different subscriber systems located at different distances from a subscriber site, may also be readily accommodated. Furthermore, when embodiments of the instant invention are configured so as to employ muting, a further enhancement of operating characteristics is obtained as uniform system impedance, and response time to service requests is achieved.

Although the present invention has been disclosed in conjunction with rather specific embodiments thereof, various alternatives and modifications to the specific structure and modes of operation, as set forth herein, will be obvious to those of ordinary skill in the art. For instance, numerous modifications and variations in the specific structure, as well as the logic and programming techniques employed, will occur to those of ordinary skill in the art both from the standpoint of designing specific systems for specific applications, as well as utilizing cost effective approaches to the design of systems of varying sizes. Similarly, varying program techniques and modes of operation may be substituted for those disclosed herein for purposes of achieving design preferences of both the manufacturer and the user, as well as specifically tailoring the operational characteristics of the system to specific requirements. Additionally, in connection with the structure set forth, it will be appreciated that while specific reference has been made to certain off-the-shelf items for purposes of acquainting a reader with specific device information suitable for implementing a preferred embodiment of the instant invention, marked variations in the nature of the components designated may be made to suit the preferences of the designer, or more importantly, to accommodate use of new or varied devices which become available and are preferred due to their improved functional and/or cost characteristics.

Those of ordinary skill in the art will also appreciate that while an embodiment of the invention disclosed herein has been described in association with an eight-channel system, greater or fewer channels may be accommodated without deviating from the concepts of the invention which have been set forth. Similarly, through the selection of microprocessor or microcomputer apparatus having greater capability than that selected for purposes of discussion herein, systems which provide greater flexibility in terms of the number of telephone numbers automatically outpulsed, the number of billing codes which may be assigned and automatically outpulsed, or the speed with which lines requesting service are answered, may be readily enhanced. Furthermore, to this end, it will be appreciated that if it were desired to accommodate a substantially larger number of channels than are discussed herein, it would be entirely practical to add additional DTMF generator means so that, in effect, outpulsing may occur on more than one active channel at a given time. Undoubtedly, many other variations and adaptations of the instant invention will occur to a reader, especially under such circumstances as occur when specific applications are considered or the constraints imposed by differing design objectives are reviewed.

While the invention has been described in connection with several exemplary embodiments thereof, it will be understood that many modifications will be readily apparent to those of ordinary skill in the art; and that this application is to cover any adaptations or variations thereof. Therefore, it is manifestly intended that this invention be only limited by the claims and the equivalents thereof.

What is claimed is:

1. Automatic calling apparatus comprising:
a plurality of channel connector means for interconnecting a plurality of telephone sets to a plurality of telephone lines, each of said plurality of channel connector means connecting at least an associated one of said plurality of telephone lines to at least one of said plurality of telephone sets, each of said plurality of channel connector means including means for sensing an off hook condition of a telephone set connected thereto and signal means for conveying signal information between said telephone line and a telephone set connected thereto and for coupling and decoupling signal information to and from a connected telephone line and telephone set;
means for receiving signal information from said signal means present in any selected one of said plurality of channel connector means;
means for applying signal information to said signal means present in any selected one of said plurality of channel connector means;
means for receiving off hook condition information from said means for sensing in any selected one of said plurality of channel connector means; and
means for simultaneously monitoring for off hook condition information from said means for sensing and for signal information from said means for receiving signal information in any selected one of said plurality of channel connector means.

2. The automatic calling apparatus according to claim 1 additionally comprising:
means for separating DTMF row and column tones applied to any of said plurality of channel connector means into high and low frequency groups and presenting any tone information which may be present as grouped at separate high and low frequency outputs, said means for separating and presenting being connected to said means for receiving signal information; and means for selectively determining the frequency of any row and column tone information which may be present at said high and low frequency outputs.

3. The automatic calling apparatus according to claim 2 additionally comprising:

means for detecting predetermined acknowledgement tones which may be applied to any of said plurality of channel connector means from respective ones of said plurality of telephone lines connected thereto, said means for detecting being connected to said means for receiving signal information; and means for selectively ascertaining the frequency of any tone information which may be applied to said means for detecting.

4. The automatic calling apparatus according to claim 2 additionally comprising:

means for recognizing a frequency determined to be a DTMF row or column tone as present at one of said high and low frequency outputs as a predetermined service request signal if no DTMF column or row tone is present at a remaining one of said high and low frequency outputs; and means responsive to said predetermined service request signal for generating DTMF tone information corresponding to a telephone number represented by said predetermined service request signal, said means for generating providing said DTMF tone information through said means for applying to a signal means at a one of said plurality of channel connector means at which said service request signal was received.

5. The automatic calling apparatus according to claim 4 wherein said means for recognizing is responsive to differing frequencies, each of which is determined to be a DTMF row or column tone present at only one of said high and low frequency outputs as differing predetermined service request signals if no DTMF column or row tone is present at a remaining one of said high and low frequency outputs, and said means for generating being responsive to each one of said differing predetermined service request signals to generate differing DTMF tone information.

6. The automatic calling apparatus according to claim 3 additionally comprising:

means for recognizing a frequency determined to be a DTMF row or column tone as present at one of said high and low frequency outputs as a predetermined service request signal if no DTMF column or row tone is present at a remaining one of said high and low frequency outputs; and means responsive to said predetermined service request signal for generating DTMF tone information corresponding to a telephone number represented by said predetermined service request signal, said means for generating providing said DTMF tone information through said means for applying to a signal means at a one of said plurality of channel connector means at which said service request signal was received.

7. The automatic calling apparatus according to claim 6 wherein said predetermined service request signal additionally identifies a predetermined acknowledgement tone to be received by said means for ascertaining after DTMF tone information corresponding to a represented telephone number has been generated and said means for generating is additionally responsive to a detection of said predetermined acknowledgement tone by said means for ascertaining to further generate DTMF tone information corresponding to a billing code identified by said predetermined service request signal.

8. The automatic calling apparatus according to claim 7 wherein said means for recognizing is responsive to differing frequencies, each of which is determined to be a DTMF row or column tone present at only one of said high and low frequency outputs as differing predetermined service request signals if no DTMF column or row tone is present at a remaining one of said high and low frequency outputs, and said means for generating being responsive to each one of said differing predetermined service request signals to generate differing DTMF tone information.

9. The automatic calling apparatus according to claim 8 additionally comprising means for storing a plurality of telephone numbers and a plurality of billing codes, each of said differing predetermined service request signals representing a different combination of one of said plurality of telephone numbers and one of said plurality of billing codes for which DTMF tone information is to be generated by said means for generating.

10. The automatic calling apparatus according to claim 9 wherein each of said plurality of telephone numbers has a predetermined acknowledgement tone stored in association therewith.

11. The automatic calling apparatus according to claim 5 additionally comprising means for storing a plurality of telephone numbers and a plurality of billing codes, each of said differing predetermined service request signals representing a different combination of one of said plurality of telephone numbers and one of said plurality of billing codes for which DTMF tone information is to be generated by said means for generating.

12. The automatic calling apparatus according to claim 1 wherein each of said plurality channel connector means additionally comprises:

means for connecting with tip and ring in the telephone line connected thereto;

means for providing tip and ring outputs to each telephone set connected thereto; and means responsive to an off hook condition at a telephone set connected thereto and a detection of a predetermined service request signal generated by said telephone set for placing a first impedance across said means for connecting with tip and ring in said telephone line and a second impedance in series with said means for providing tip and ring outputs to each telephone set connected thereto.

13. The automatic calling apparatus according to claim 12 wherein said means responsive additionally comprises:

means for normally maintaining a low impedance condition between the connection to tip in said telephone line and the means for providing said tip outputs to a telephone set in an off hook condition connected thereto;

first circuit means responsive to muting signal information indicating that a service request signal has been received for placing said first impedance across said means for connecting with tip and ring in said telephone line; and second circuit means responsive to said muting signal information indicating that a service request signal has been received for placing said second impedance in series with said tip connection to said telephone line and said means for providing tip outputs to a telephone set to remove said low impedance condition normally maintained and mute said telephone set.

14. The automatic calling apparatus according to claim 13 additionally comprising means for applying muting signal information to said first and second circuit means present in any selected one of said plurality of channel connector means.

15. The automatic calling apparatus according to claim 14 wherein said first and second circuit means include optical coupling means for coupling muting signal information from said means for applying to said first and second circuit means present in a selected one of said plurality of channel connector means.

16. The automatic calling apparatus according to claim 13 wherein said first and second circuit means include diode bridge means.

17. The automatic calling apparatus according to claim 1 wherein said means for sensing an off hook condition of a telephone set connected thereto comprises a diode bridge providing three diode drops for any polarity tip signals applied from a telephone line to an off hook set interconnected through a channel connector means, and light-emitting diode means arranged to be energized by said three diode drops to indicate an off hook condition of a telephone set.

18. The automatic calling apparatus according to claim 2 wherein said means for sensing an off hook condition of a telephone set connected thereto comprises a diode bridge providing three diode drops for any polarity tip signals applied from a telephone line to an off hook set interconnected through a channel connector means, and light-emitting diode means arranged to be energized by said three diode drops to indicate an off hook condition of a telephone set.

19. The automatic calling apparatus according to claim 1 wherein said means for simultaneously monitoring includes processor means interconnected to said means for receiving signal information and to said means for receiving off hook condition information.

20. The automatic calling apparatus according to claim 19 additionally comprising:
DTMF tone generator means connected to said means for applying signal information, said DTMF tone generator means selectively acting to apply DTMF tones through said means for applying to said signal means present in selected ones of said plurality of channel connector means; and
tone decoder means for selectively decoding tone information applied to said means for receiving signal information from signal means present in any of said plurality of channel connector means, said DTMF tone generator means and said tone decoder means being interconnected to said processor means.

21. The automatic calling apparatus according to claim 20 wherein said decoder means includes means responsive to DTMF tone pair information received from signal means present in any of said plurality of channel connector means for separating said DTMF tone pair information into row and column tones and means responsive to acknowledgement tones for providing an output corresponding to the frequency of said acknowledgement tones.

22. The automatic calling apparatus according to claim 21 additionally comprising means for selectively sampling row tone, column tone and acknowledgement tone frequency information from said decoder means and applying said frequency information sampled to said processor means.

23. The automatic calling apparatus according to claim 22 additionally comprising monostable multivibrator means connected to said processor means, said monostable multivibrator means controlling the duration of DTMF tone information applied to said signal means by said DTMF tone generator means to cause the same to correspond to the duty cycle thereof, said monostable multivibrator means and said processor means being interconnected in such manner that said monostable multivibrator means is strobed each time DTMF tone information is to be generated by said DTMF tone generator means and at the termination of the duty cycle thereof generates an interrupt for terminating the DTMF tone information being generated.

24. The automatic calling apparatus according to claim 2 wherein said means for simultaneously monitoring includes processor means interconnected to said means for receiving signal information and to said means for receiving off hook condition information.

25. The automatic calling apparatus according to claim 24 additionally comprising:
means for detecting predetermined acknowledgement tones which may be applied to any of said plurality of channel connector means from respective ones of said plurality of telephone lines connected thereto, said means for detecting being connected to said means for receiving signal information; and
means for selectively ascertaining the frequency of any tone information which may be applied to said means for detecting.

26. The automatic calling apparatus according to claim 24 additionally comprising:
means for recognizing a frequency determined to be a DTMF row or column tone as present at one of said high and low frequency outputs as a predetermined service request signal if no DTMF column or row tone is present at a remaining one of said high and low frequency outputs; and
means responsive to said predetermined service request signal for generating DTMF tone information corresponding to a telephone number represented by said predetermined service request signal, said means for generating providing said DTMF tone information through said means for applying to a signal means at a one of said plurality of channel connector means at which said service request signal was received.

27. The automatic calling apparatus according to claim 26 additionally comprising:
DTMF tone generator means connected to said means for applying signal information, said DTMF tone generator means selectively acting to apply DTMF tones through said means for applying to said signal means present in selected ones of said plurality of channel connector means; and
tone decoder means for selectively decoding tone information applied to said means for receiving signal information from signal means present in any of said plurality of channel connector means, said DTMF tone generator means and said tone decoder means being interconnected to said processor means.

28. The automatic calling apparatus according to claim 27 wherein said decoder means includes means responsive to DTMF tone pair information received from signal means present in any of said plurality of channel connector means for separating said DTMF tone pair information into row and column tones and means responsive to acknowledgement tones for providing an output corresponding to the frequency of said acknowledgement tones.

29. The automatic calling apparatus according to claim 28 additionally comprising means for selectively sampling row tone, column tone and acknowledgement tone frequency information from said decoder means and applying said frequency information sampled to said processor means.

* * * * *

UNITED STATES PATENT AND TRADEMARK OFFICE
CERTIFICATE OF CORRECTION

PATENT NO. : 4,513,175
DATED : April 23, 1985
INVENTOR(S) : Fred J. Smith

It is certified that error appears in the above-identified patent and that said Letters Patent is hereby corrected as shown below:

Column 2, line 31, "rate" should read --site--.

Column 4, line 38, after "subroutine" insert --illustrated--.

Column 5, line 56, "angle" should read --single--.

Column 7, line 68, after "may" insert --be--.

Column 9, line 4, "apprecited" should read --appreciated--.

Column 11, line 52, delete "line".

Column 12, line 11, before "set" insert --telephone--.

Column 13, line 48, "thereof" should read --thereto--.

Column 14, line 40, "make" should read --may--.

Column 15, line 46, "29" should read --20--.

Column 29, line 5, "colum" should read --column--.

UNITED STATES PATENT AND TRADEMARK OFFICE
CERTIFICATE OF CORRECTION

PATENT NO. : 4,513,177
DATED : 4/23/85
INVENTOR(S) : Nishino et al.

It is certified that error appears in the above-identified patent and that said Letters Patent is hereby corrected as shown below:

| COLUMN | LINE | DESCRIPTION |
|---|---|---|
| 6 | 6 | Insert --level-- between "signal" and "$T_i$" |
| 9 | 22 | Delete "rate" insert --state-- |

Signed and Sealed this

Ninth Day of August, 1988

Attest:

DONALD J. QUIGG

Attesting Officer

Commissioner of Patents and Trademarks